United States Patent
Gologorsky

(10) Patent No.: US 7,554,455 B2
(45) Date of Patent: *Jun. 30, 2009

(54) METHOD AND APPARATUS FOR POWERING REMOTE DEVICES

(76) Inventor: Steven Phillip Gologorsky, 4 Deer Hill Dr., Montville, NJ (US) 07045

( * ) Notice: Subject to any disclaimer, the term of this patent is extended or adjusted under 35 U.S.C. 154(b) by 0 days.

This patent is subject to a terminal disclaimer.

(21) Appl. No.: 11/876,587

(22) Filed: Oct. 22, 2007

(65) Prior Publication Data

US 2008/0094234 A1    Apr. 24, 2008

Related U.S. Application Data

(63) Continuation of application No. 10/349,458, filed on Jan. 22, 2003, now Pat. No. 7,286,058.

(60) Provisional application No. 60/351,258, filed on Jan. 23, 2002.

(51) Int. Cl.
    *G08B 21/00* (2006.01)
(52) U.S. Cl. .................... 340/635; 340/657
(58) Field of Classification Search ............ None
    See application file for complete search history.

(56) References Cited

U.S. PATENT DOCUMENTS

| | | | | |
|---|---|---|---|---|
| 4,896,508 A | * | 1/1990 | Reinke, Jr. | ............ 60/648 |
| 5,854,803 A | * | 12/1998 | Yamazaki et al. | ............. 372/31 |
| 5,877,802 A | * | 3/1999 | Takahashi et al. | ............. 348/71 |
| 6,000,931 A | | 12/1999 | Tanabe et al. | |
| 6,239,888 B1 | * | 5/2001 | Willebrand | ................. 398/129 |
| 6,304,176 B1 | | 10/2001 | Discenzo | |
| 6,581,619 B1 | | 6/2003 | Christiani et al. | |
| 6,663,011 B1 | | 12/2003 | Entleutner | |

* cited by examiner

*Primary Examiner*—Julie Lieu
(74) *Attorney, Agent, or Firm*—DeMont & Breyer LLC

(57) ABSTRACT

A method and apparatus for powering one or more remotely-situated devices. In accordance with some embodiments of the invention, energy is added (at a convenient location) to a medium that the remotely-situated devices are associated with (e.g., a medium that the remotely-situated devices are sensing, controlling, alarming, etc). The energy is removed from the medium near to the remotely-situated devices. If required, the energy is converted to a form that is useable by the remotely-situated device. The removed energy is delivered to the remotely-situated devices and is used by them to perform an action that is associated with the medium (e.g., sensing a characteristic of the medium, controlling a characteristic of the medium, providing an alarm responsive to a value of a characteristic of the medium, etc.

15 Claims, 42 Drawing Sheets

Thermocouple Example

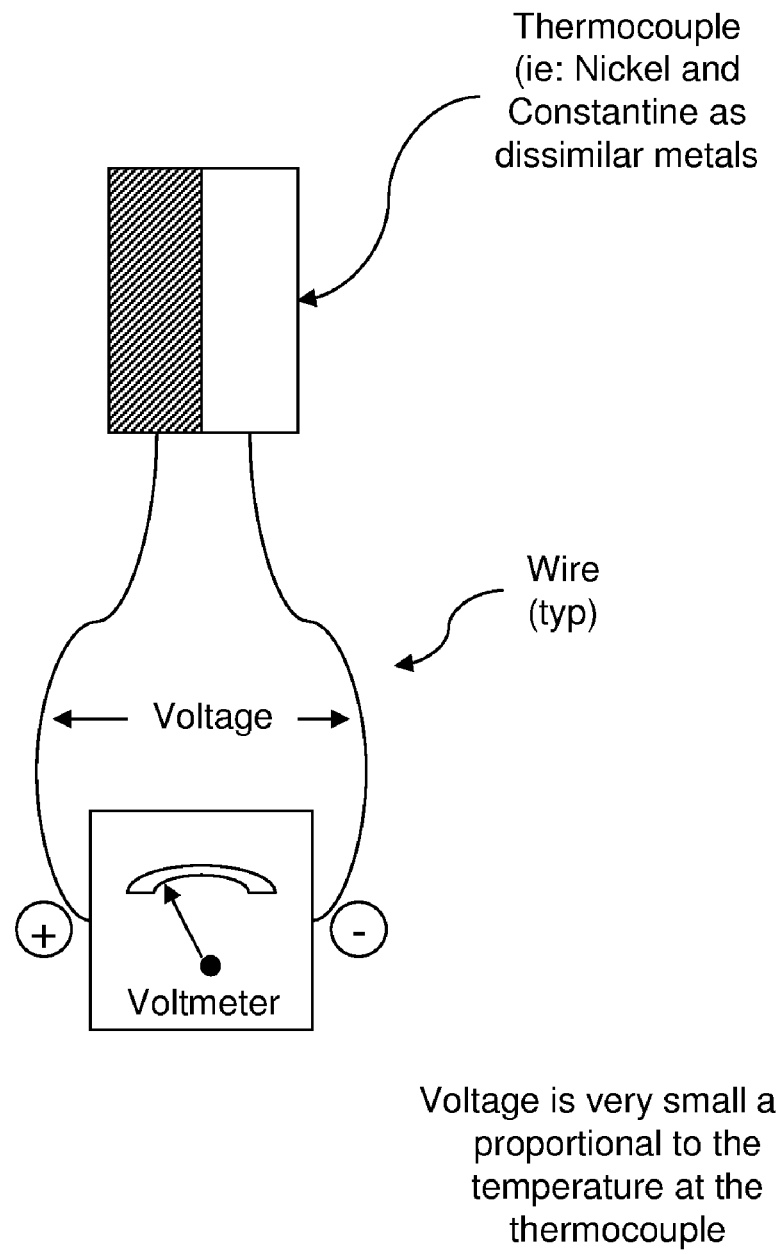
Figure 1- Thermocouple Example

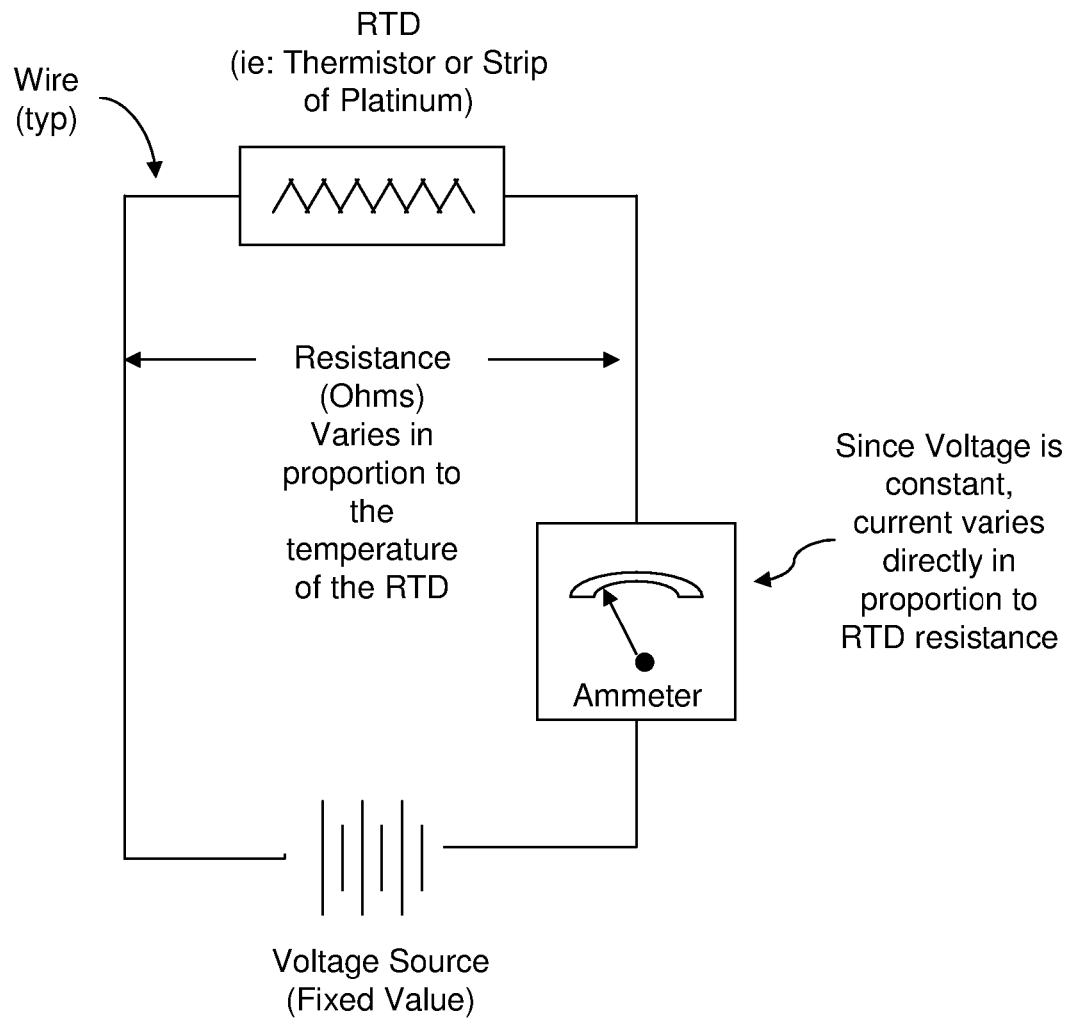
Figure 2- RTD Example

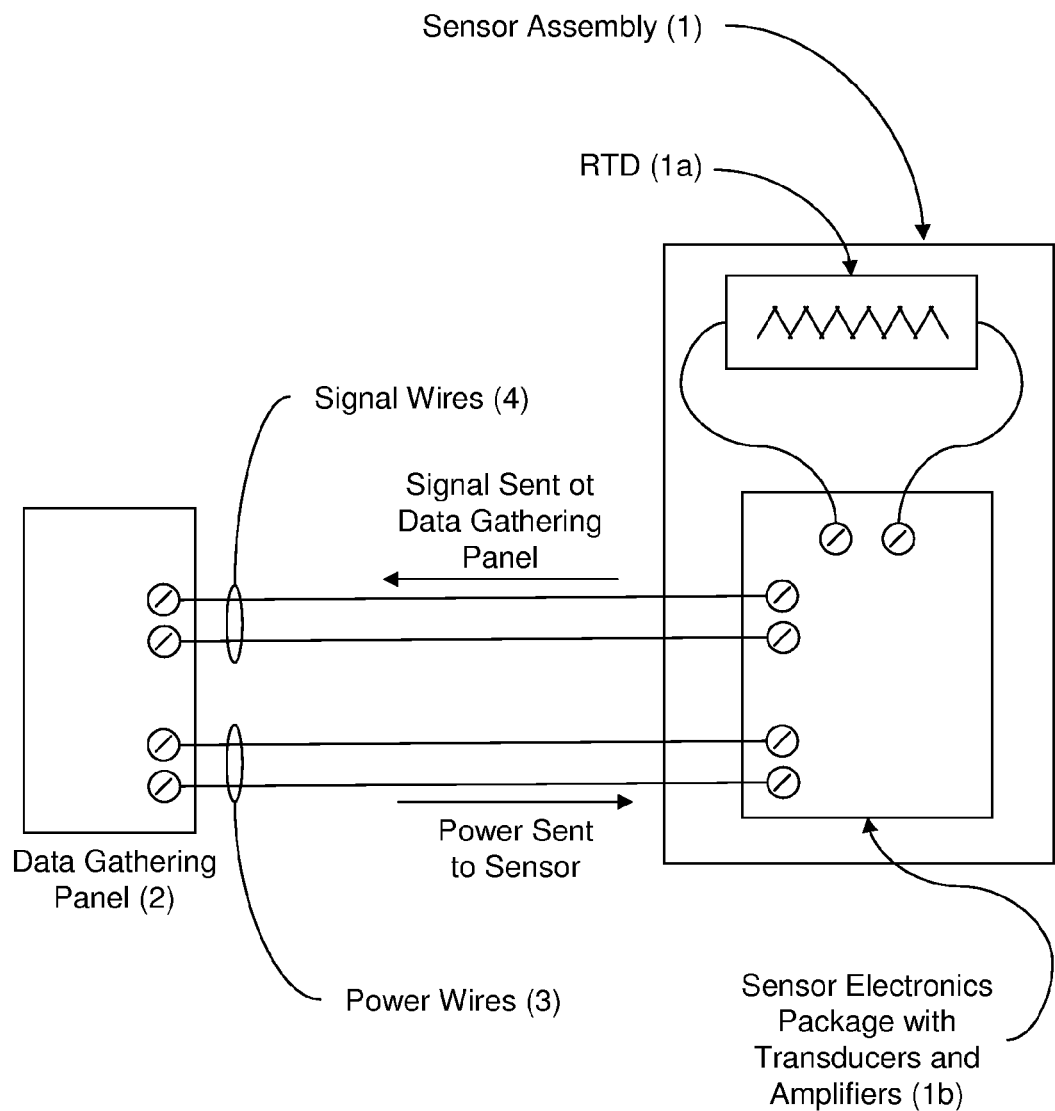
Figure 3 – Prior Art – Hard Wired Sensor

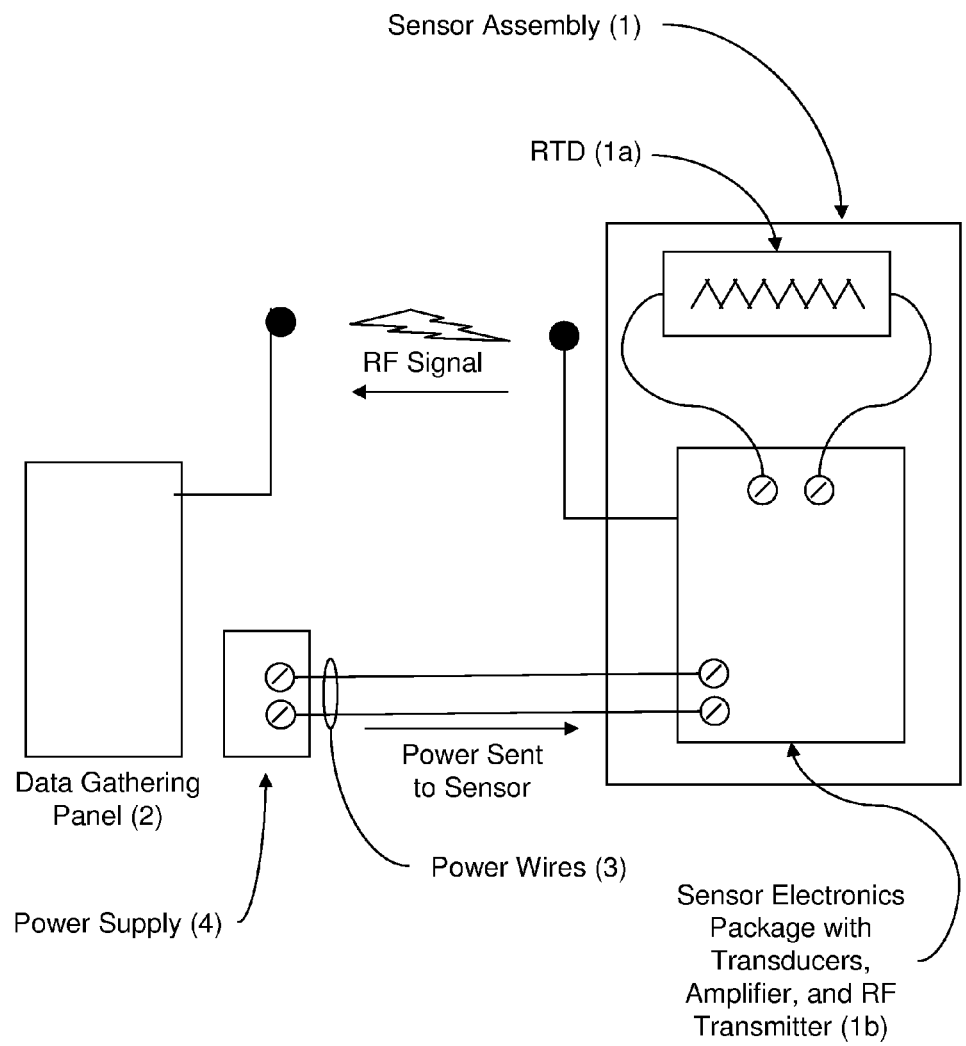
Figure 4 – Prior Art – Wireless Sensor w/Power Wires

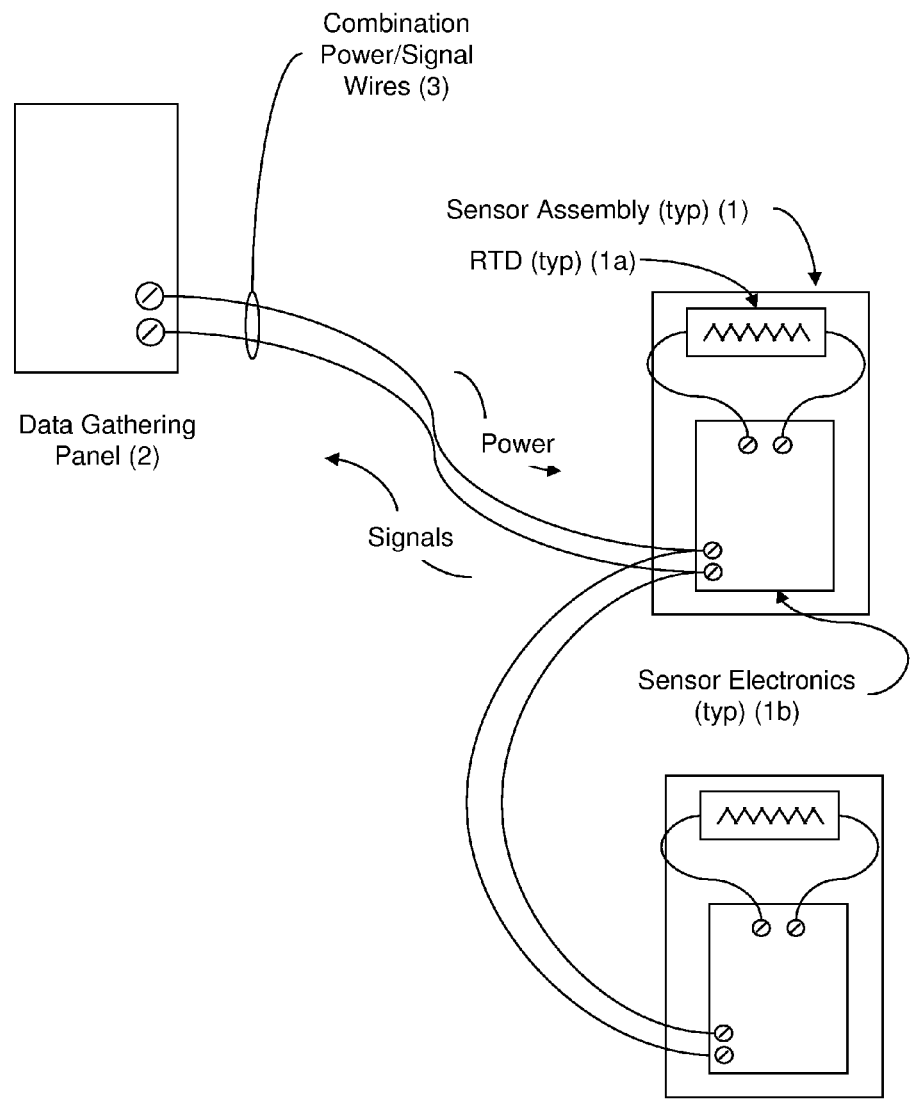
Figure 5- Prior Art – Sensor w/Multiplexed Power and Signal

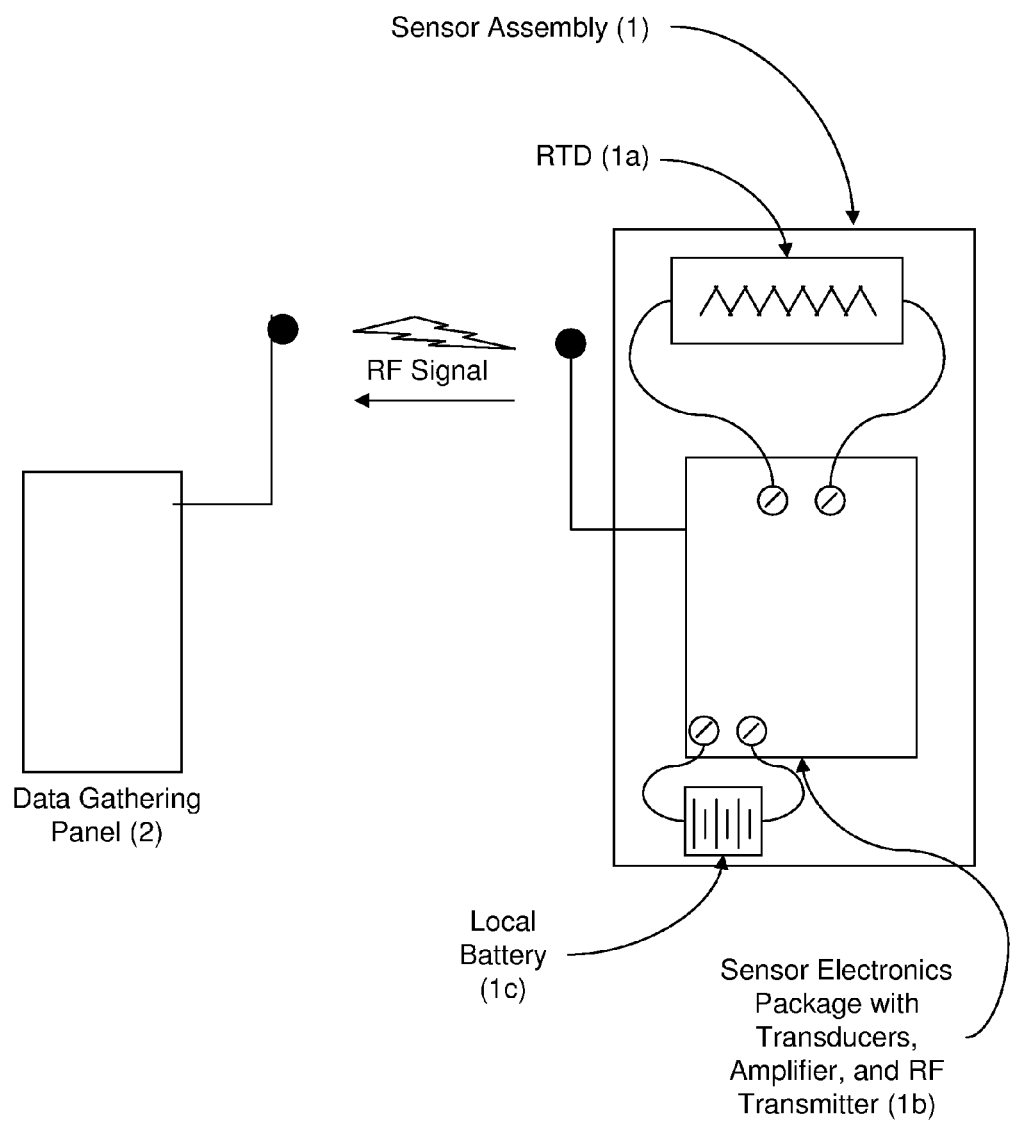
Figure 6- Prior Art – Wireless Sensor w/Local Battery

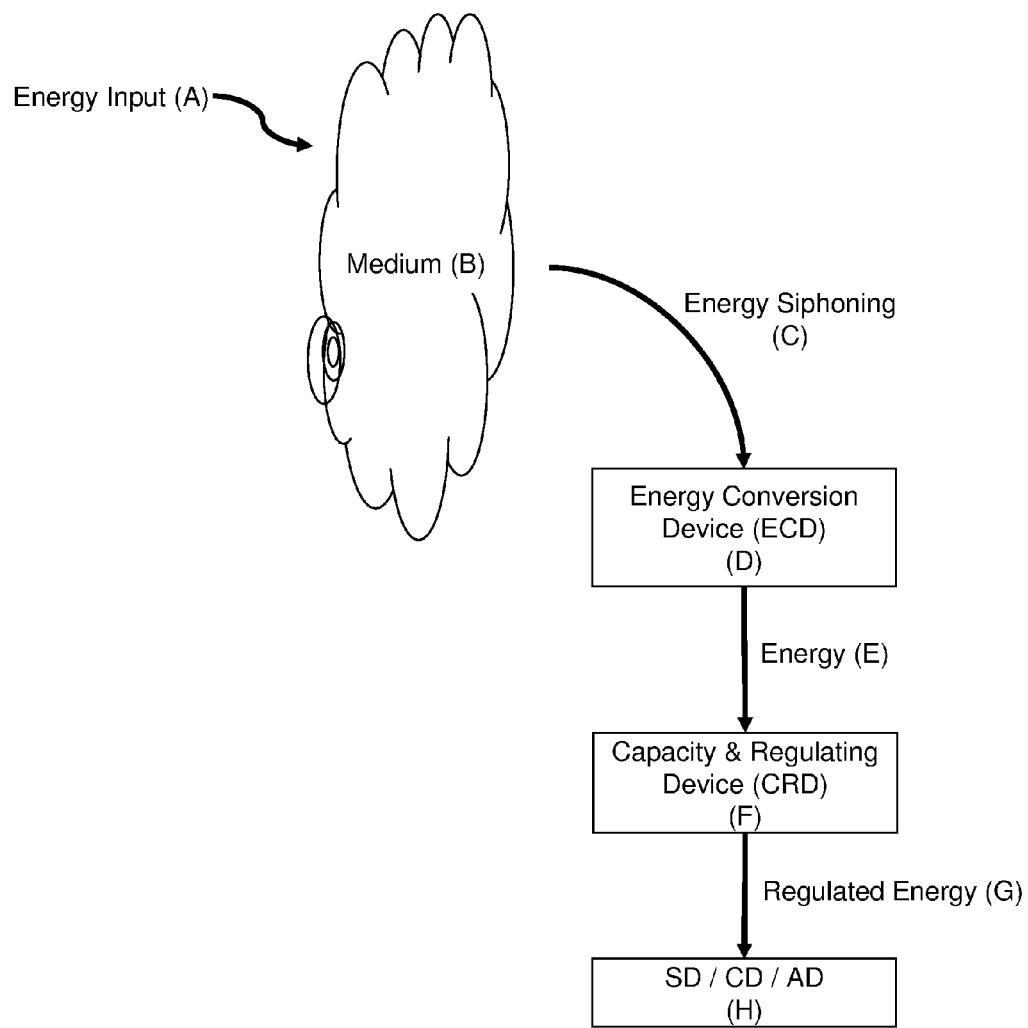
Figure 7- Schematic Diagram of New Process

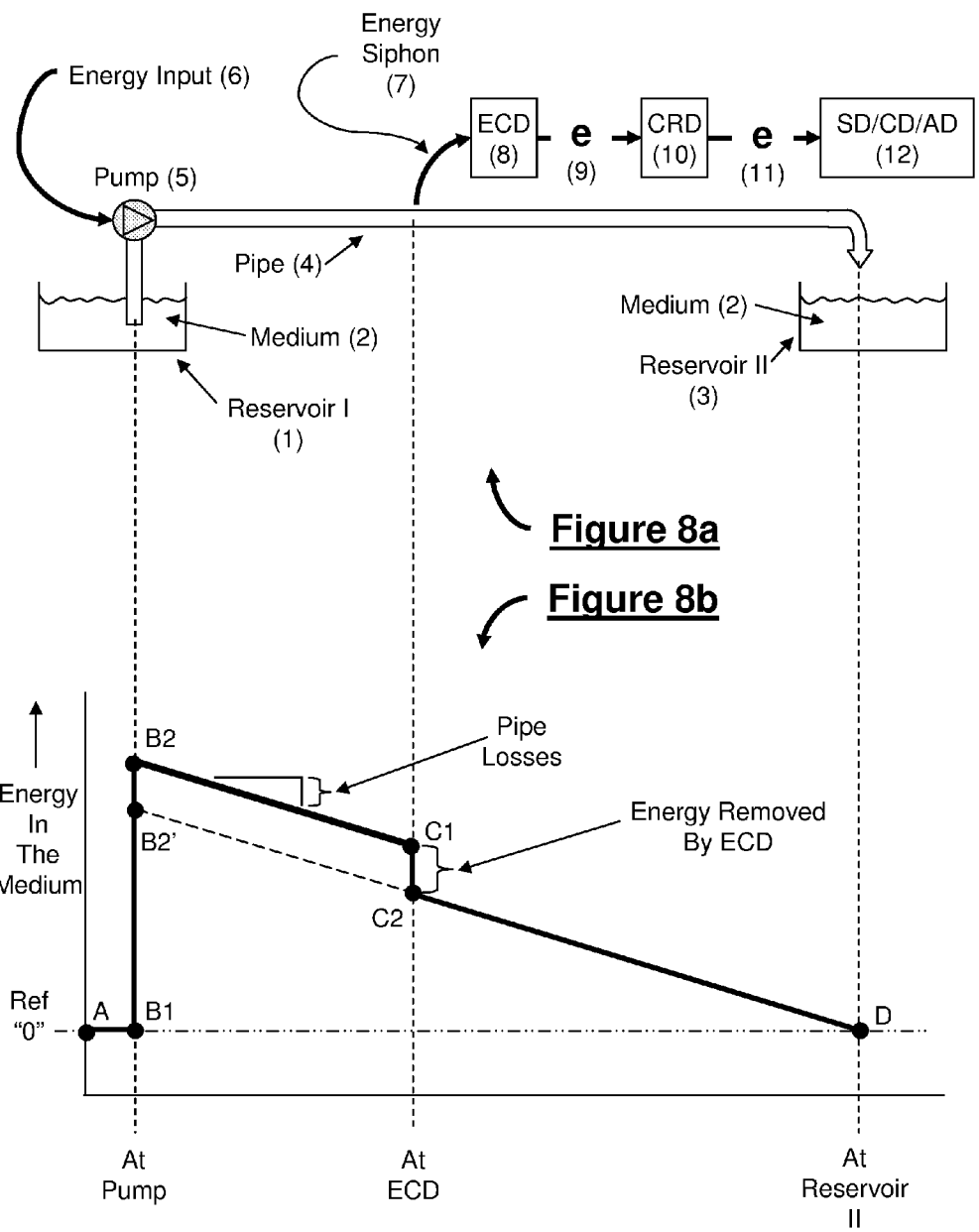
Figure 8 - Example of Siphoning Process

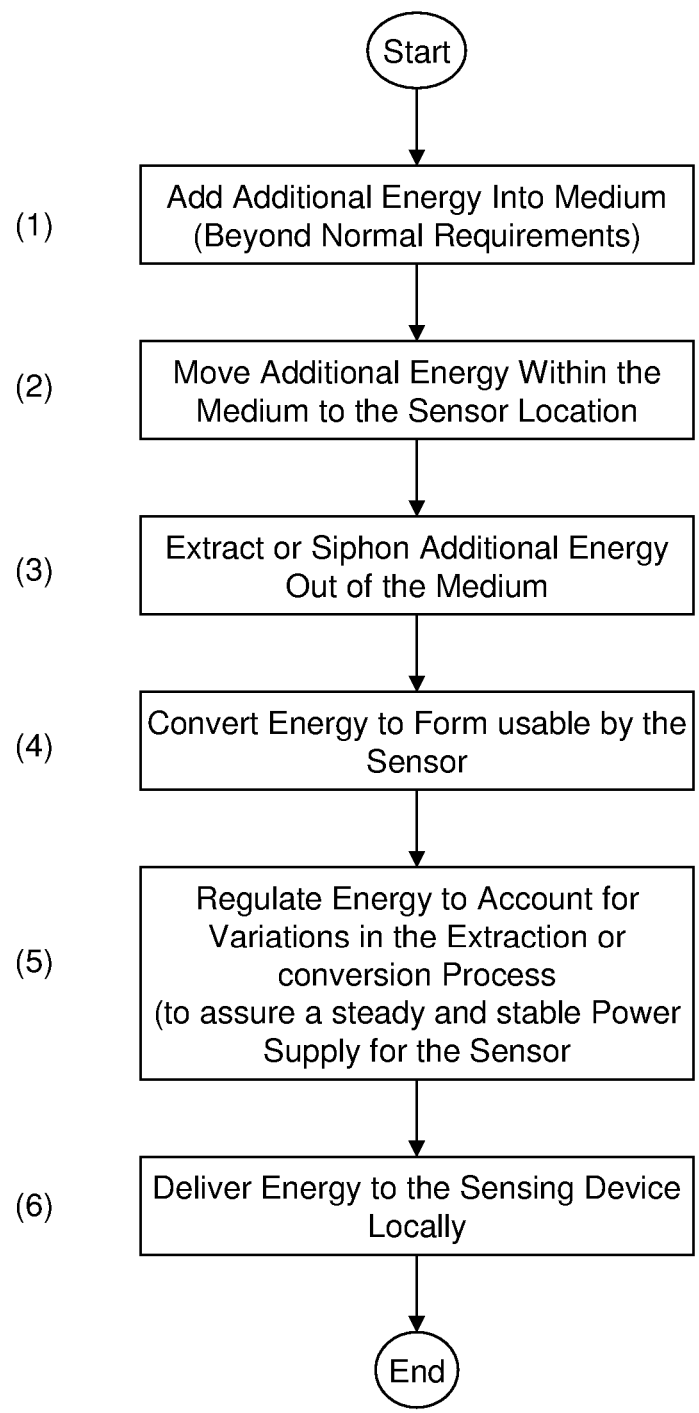
Figure 9- Flowchart for Preferred Embodiment

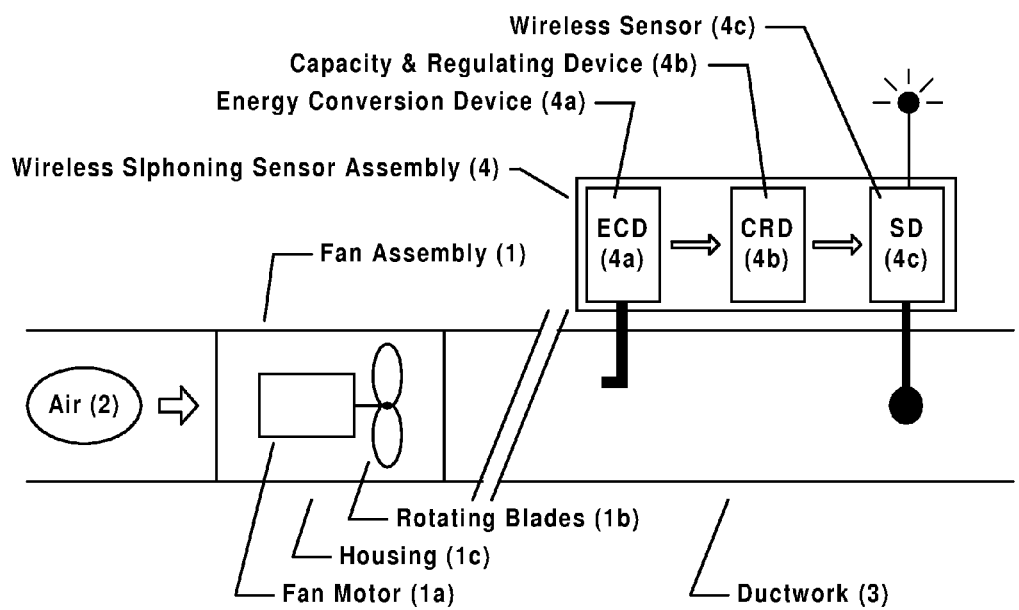
Figure 10- Preferred Embodiment-Key System Components

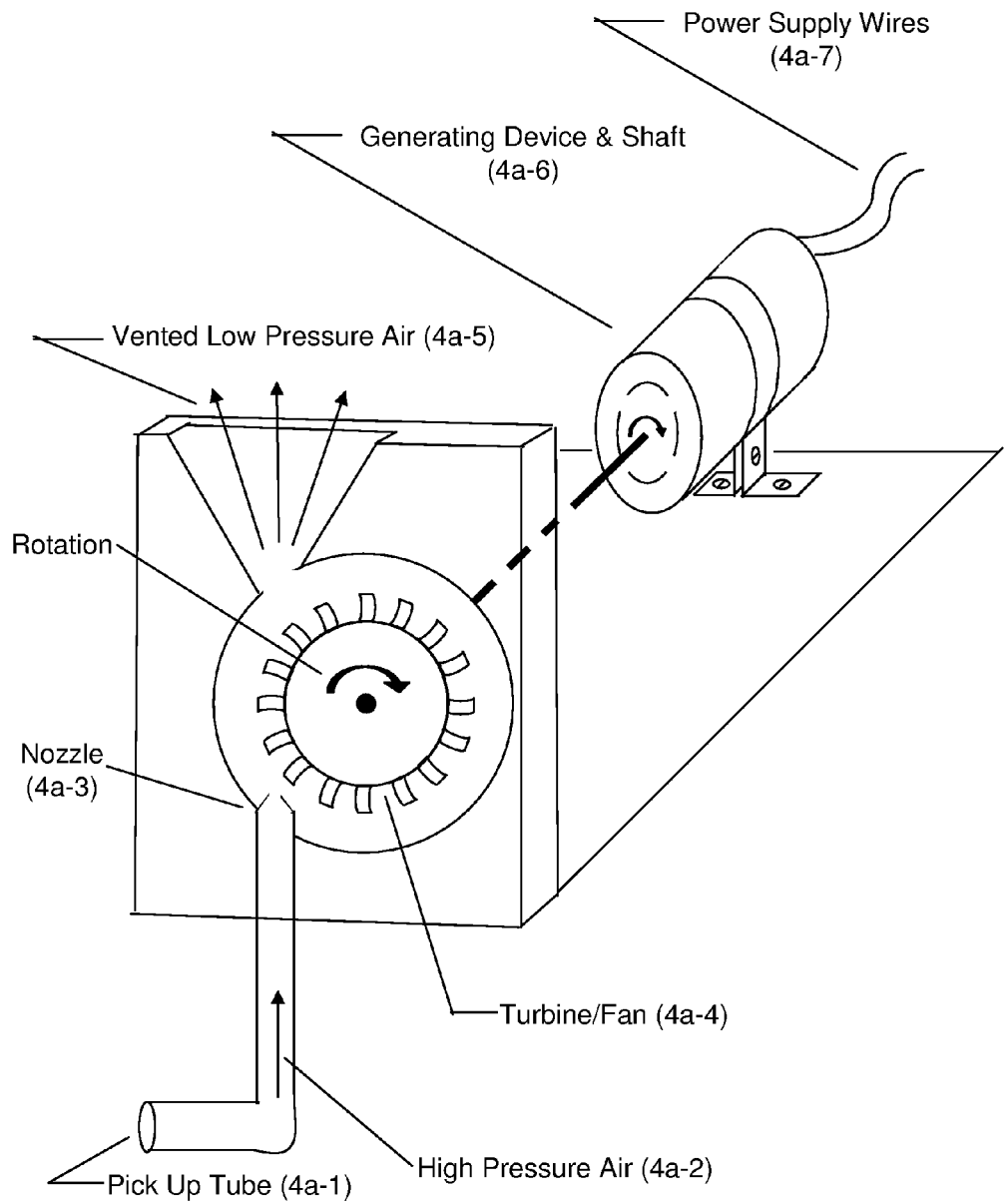
Figure 11-Energy Conversion Device (ECD) (4a)

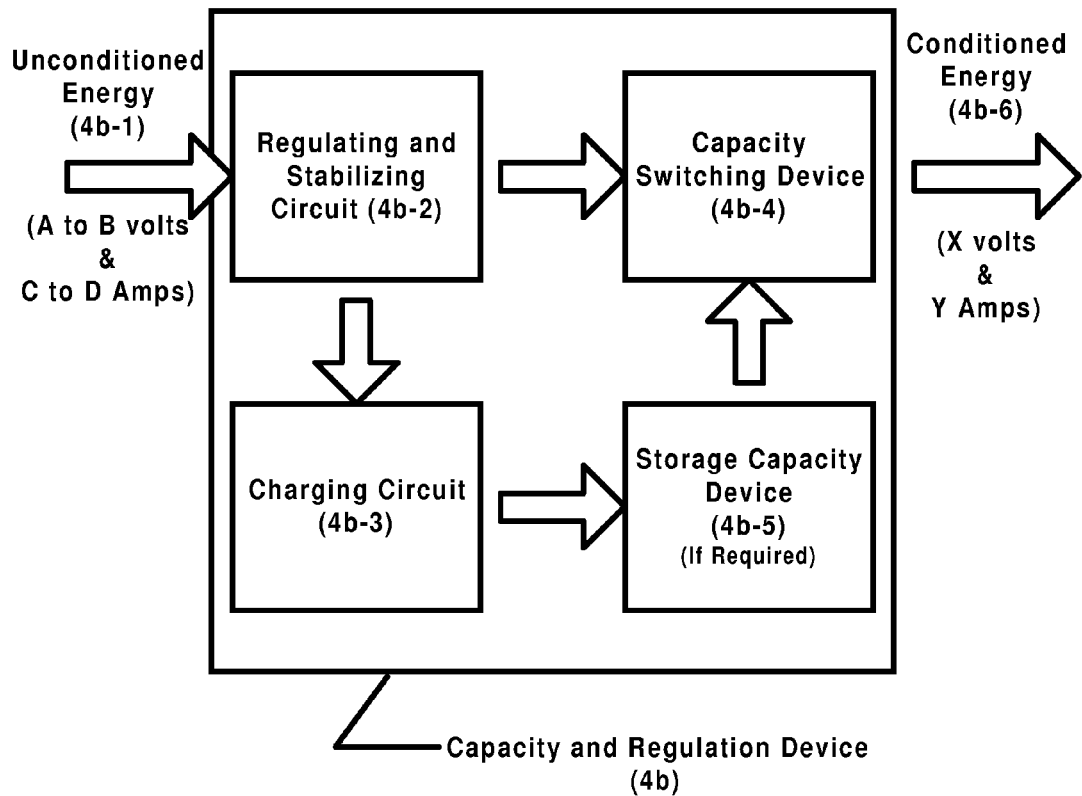
Figure 12- Capacity and Regulation Device (CRD) (4b)

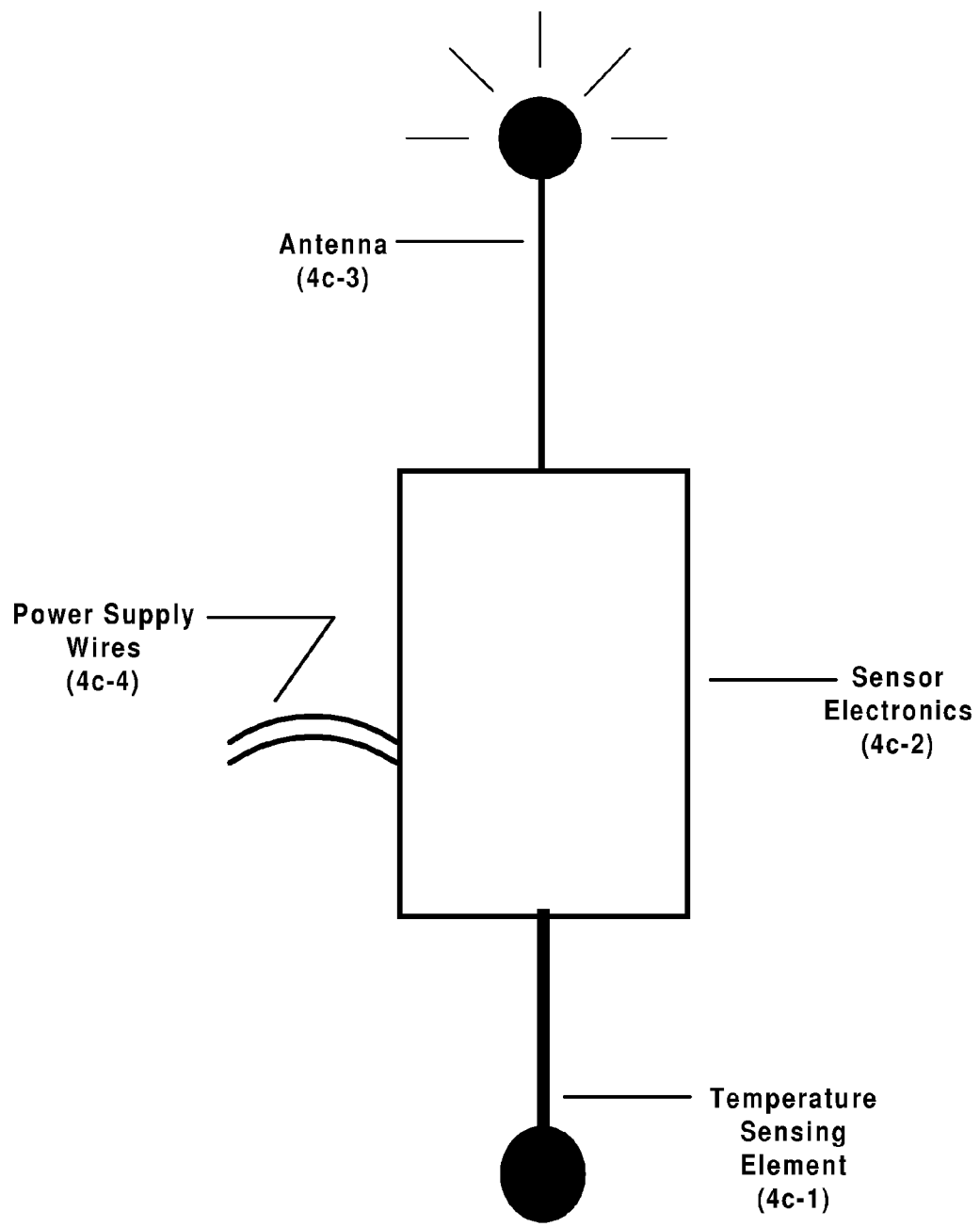
Figure 13- Wireless Sensing Device (SD) (4c)

Figure 14- Prior Art – Wireless Temperature Sensor Operation

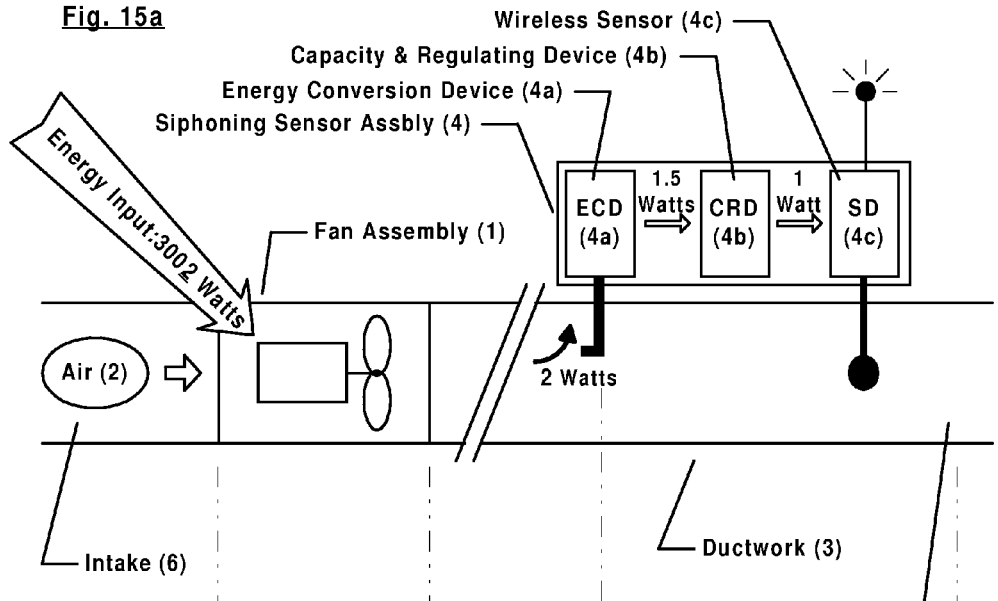
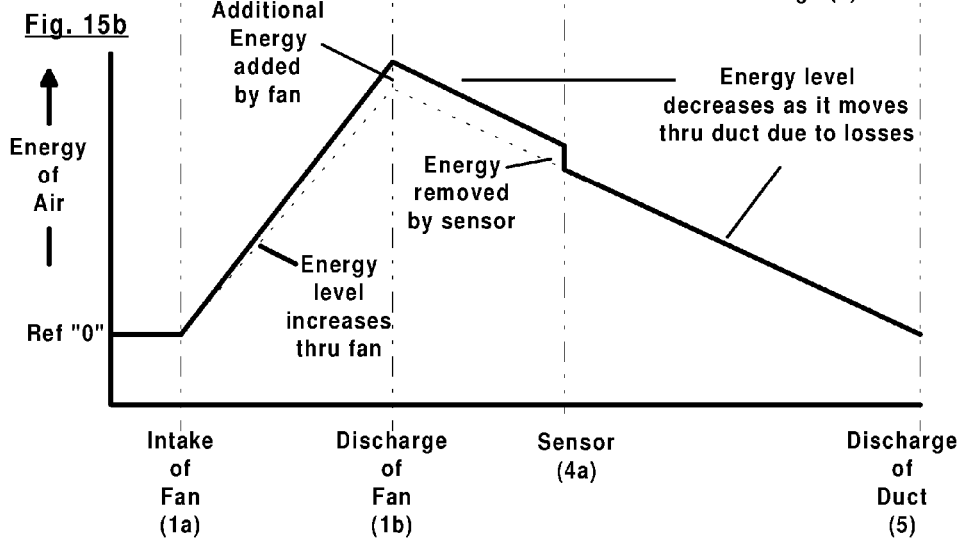
Figure 15- Preferred Embodiment- Energy Flow in System

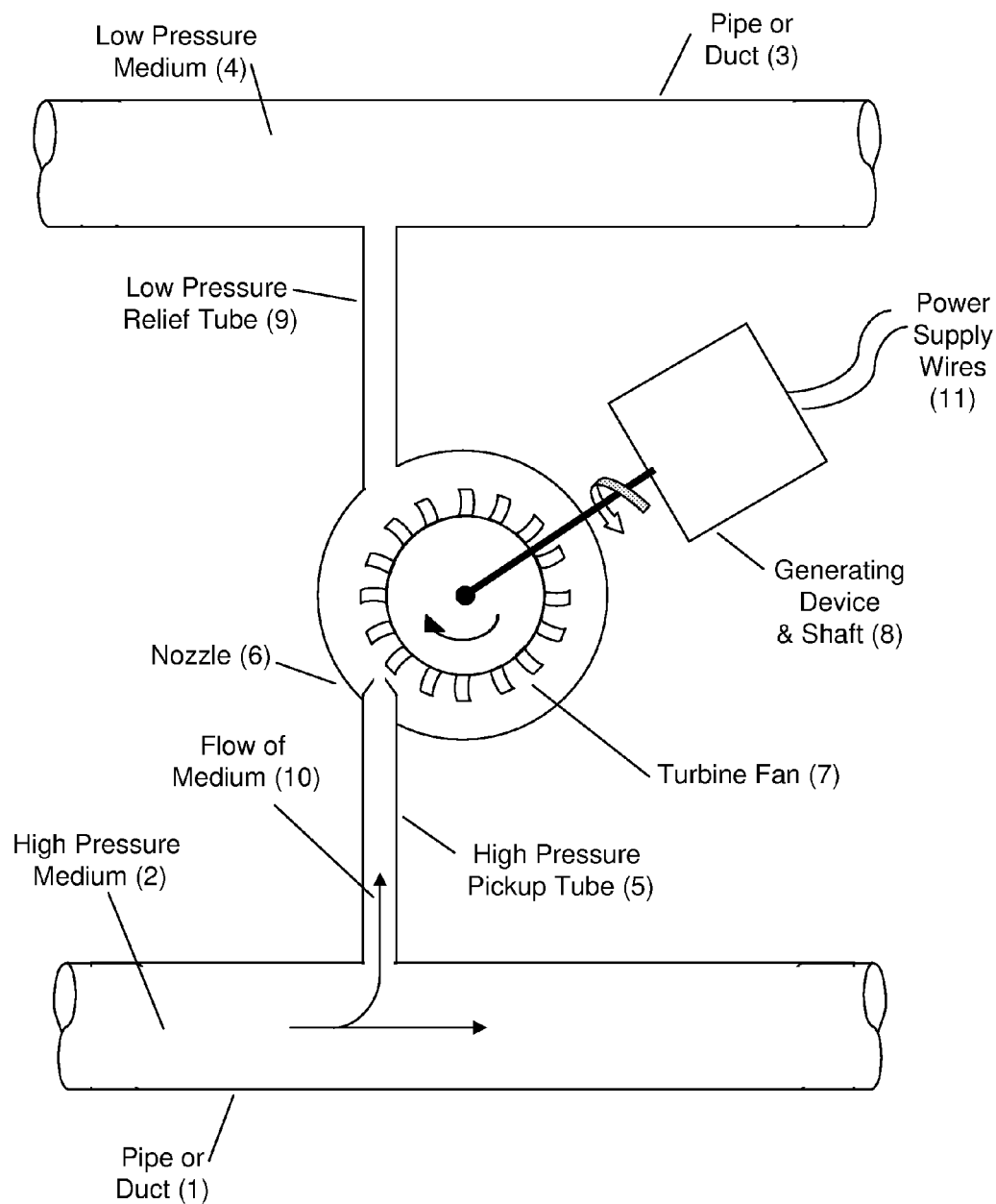
Figure 16- Alt.-Pressure Bleed Generation

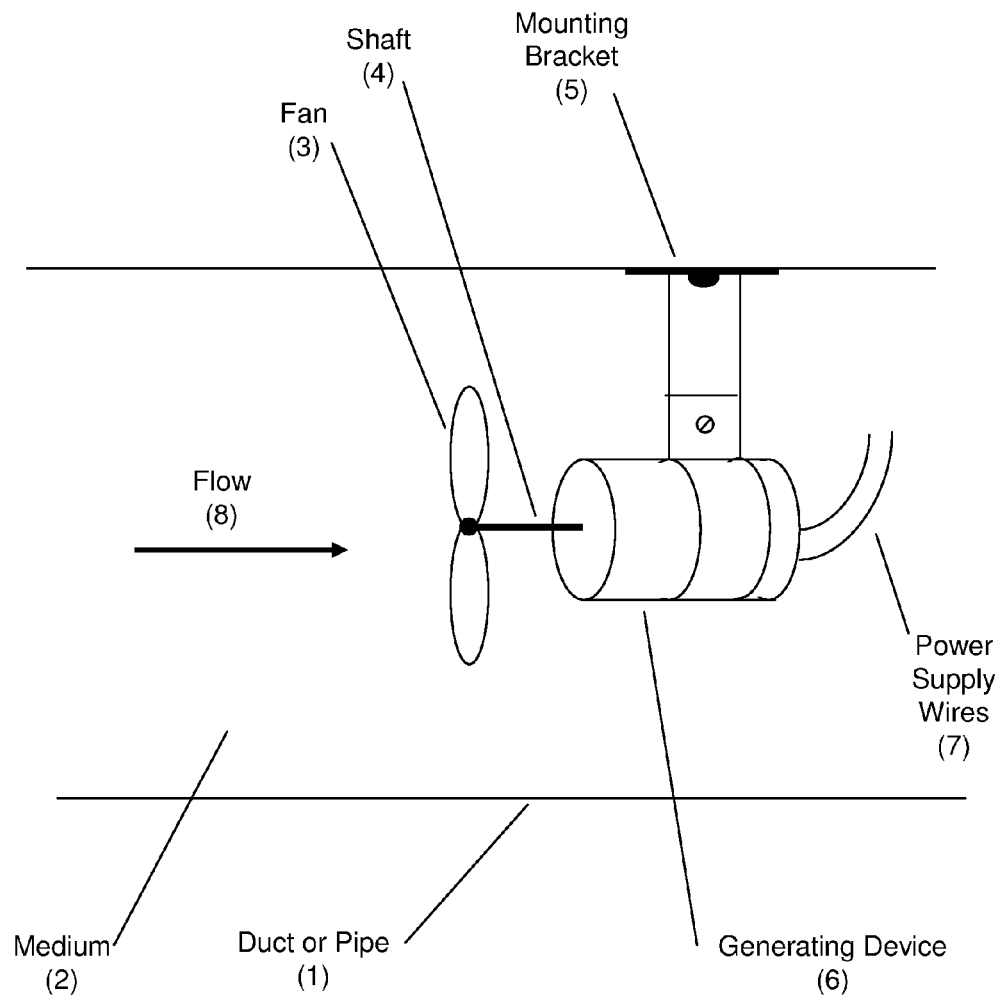
Figure 17- Alt.-Inline Generation (Ex.1)

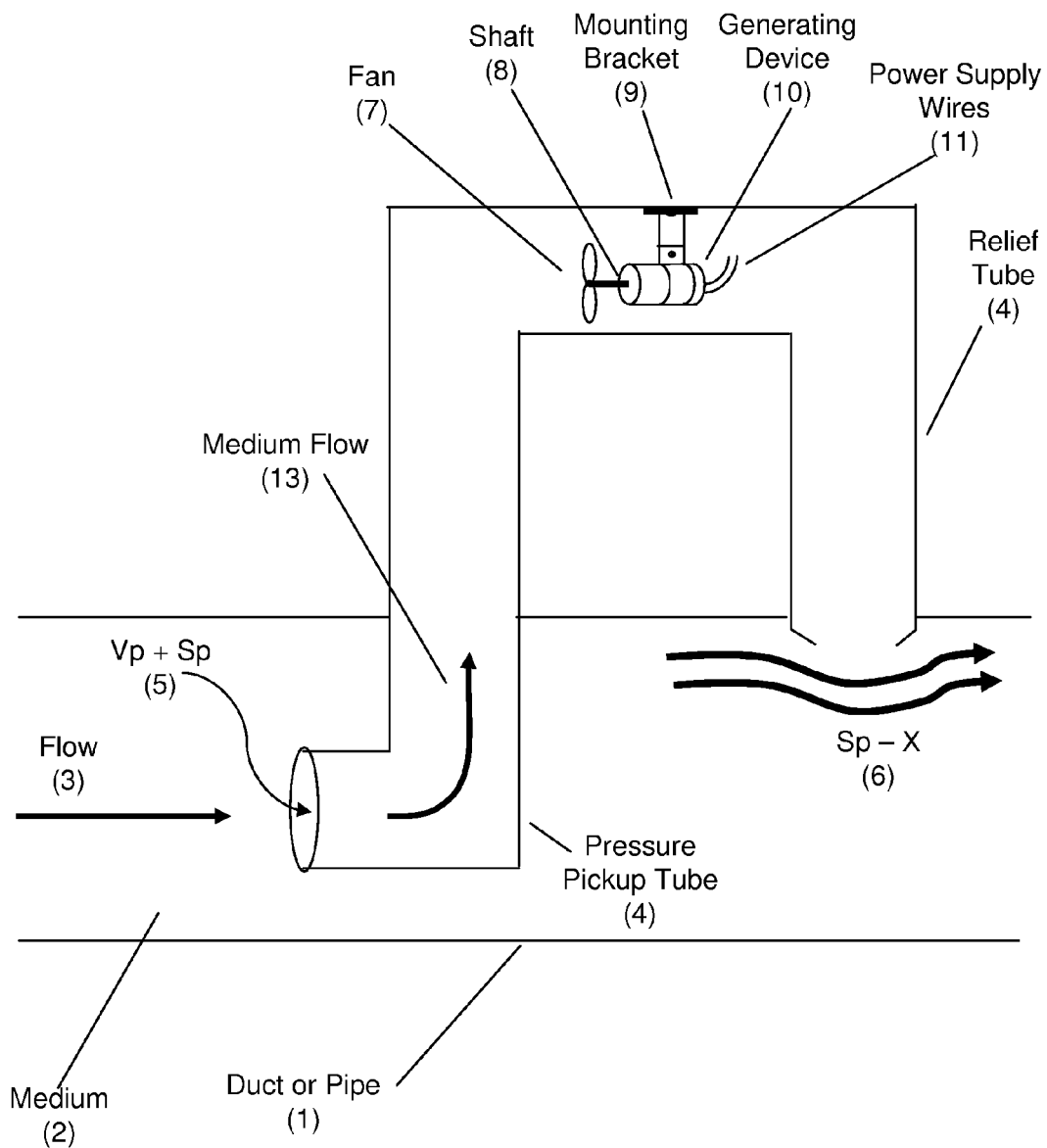
Figure 18- Alt.- Inline Generation (Ex.2)

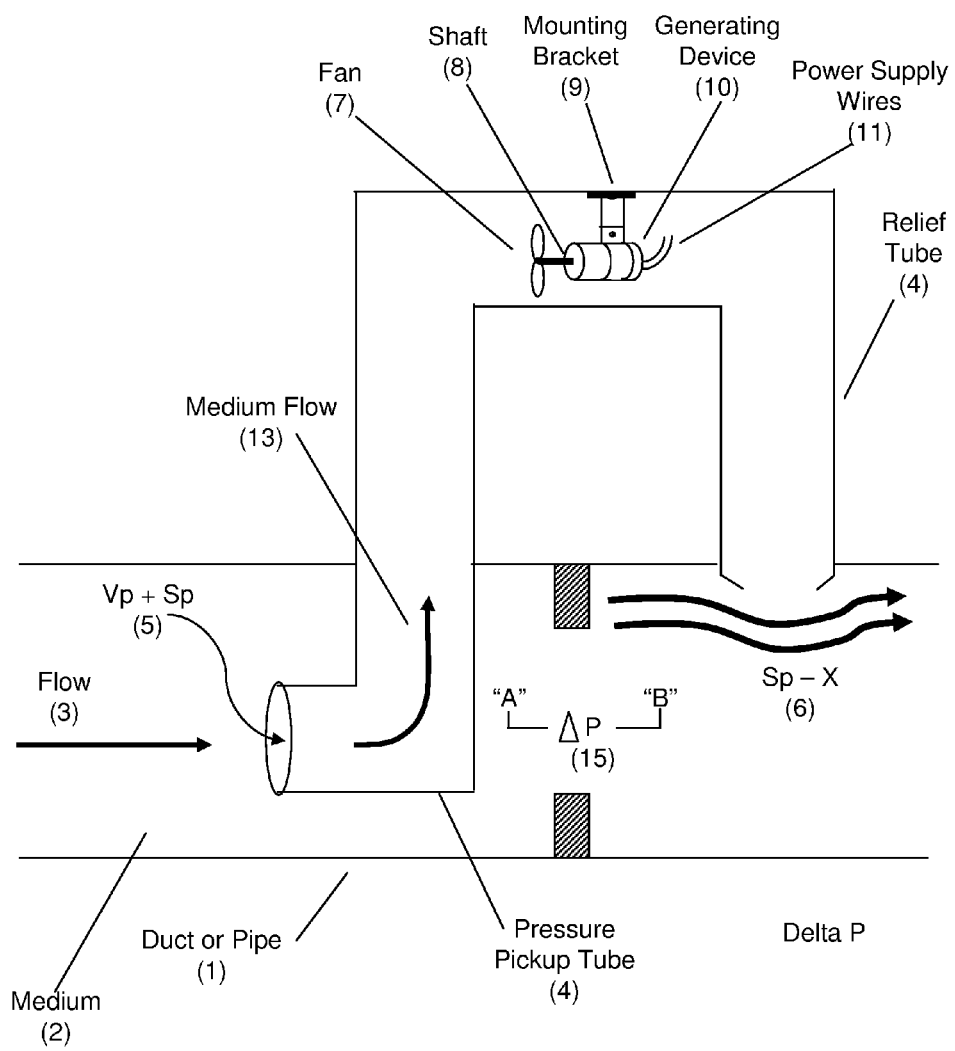
Figure 19- Alt.- Inline Generation (Ex.3)

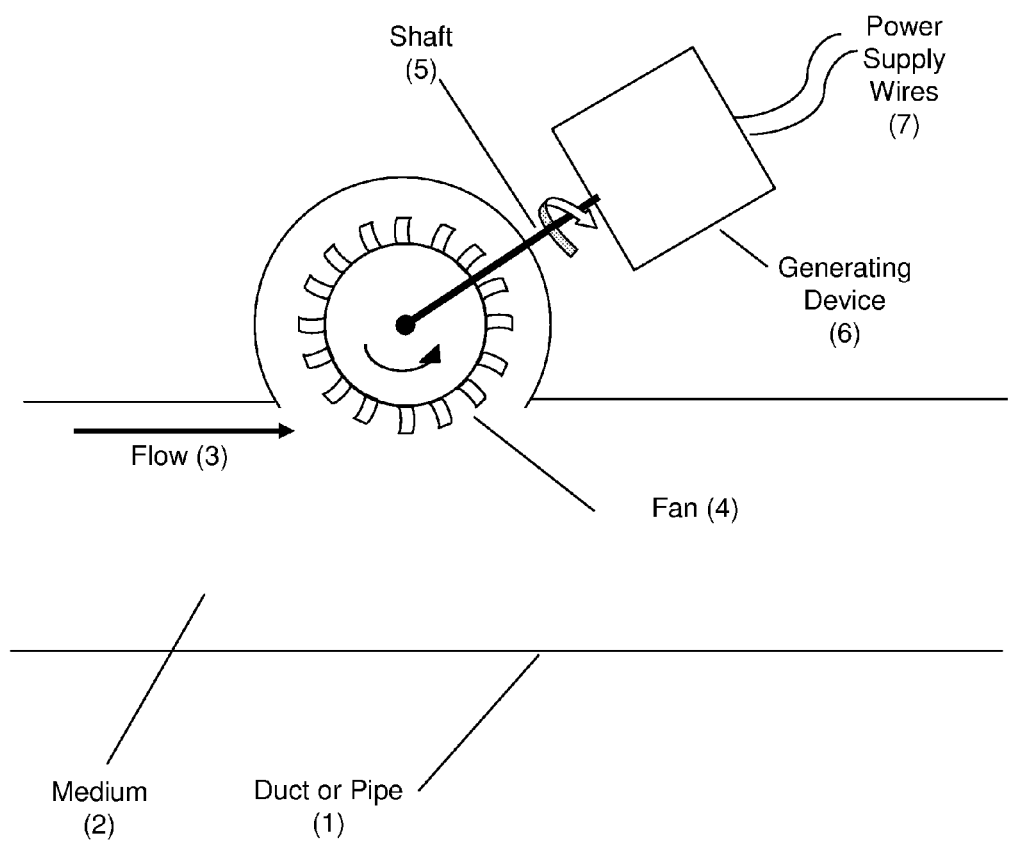
Figure 20- Alt.- Inline Generation (Ex.4)

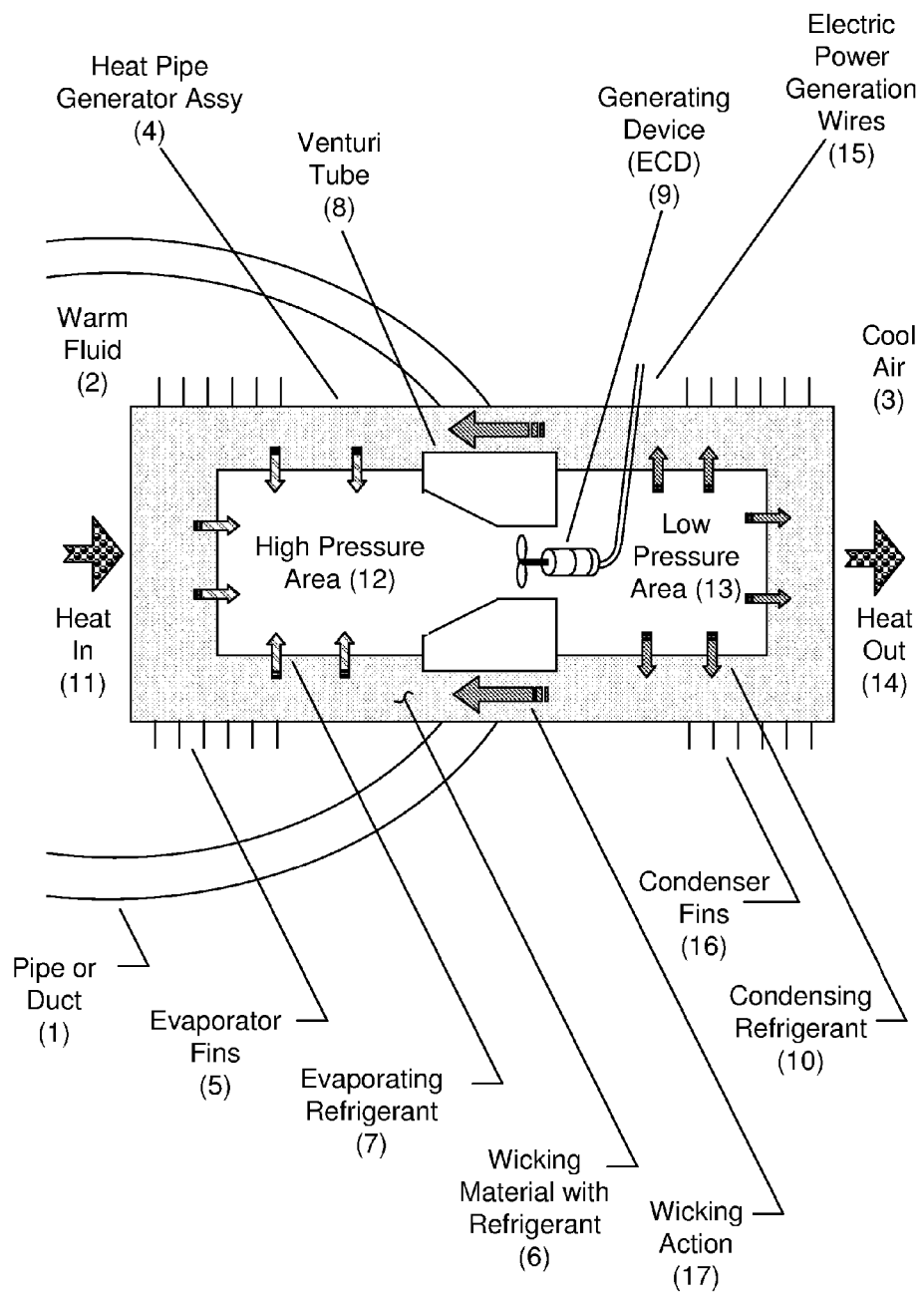
Figure 21- Heat Pipe Generator ECD

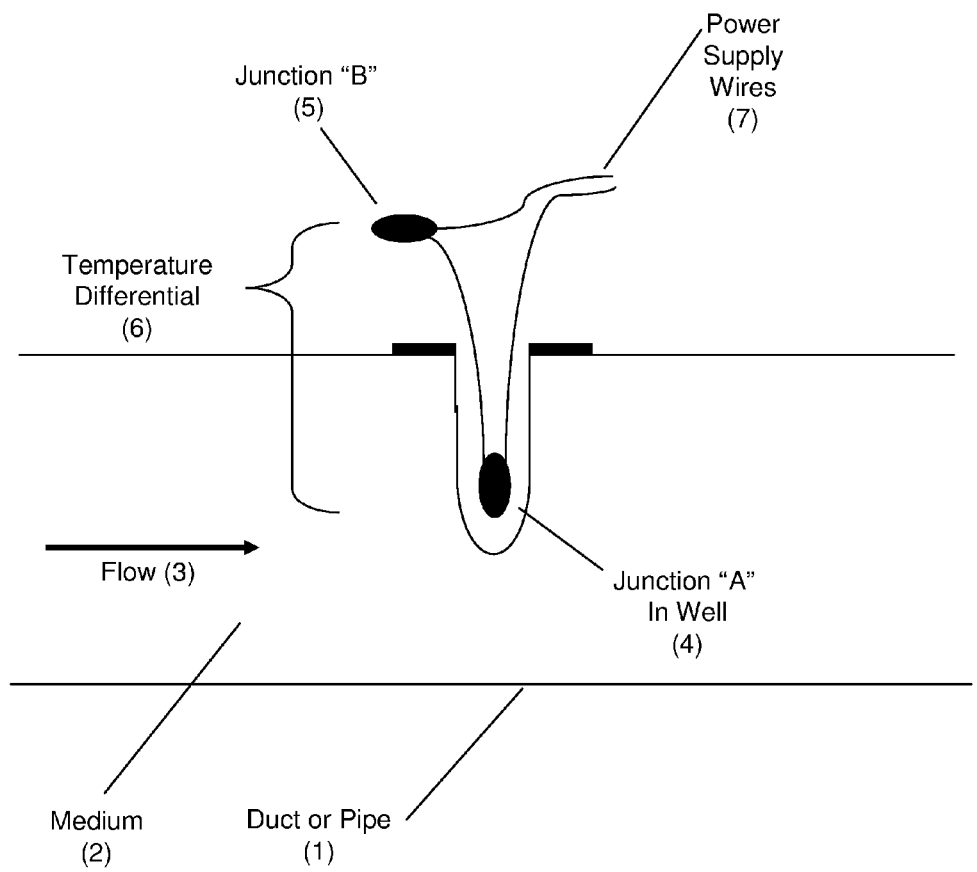
Figure 22- Alt.-Temp. Difference Generation

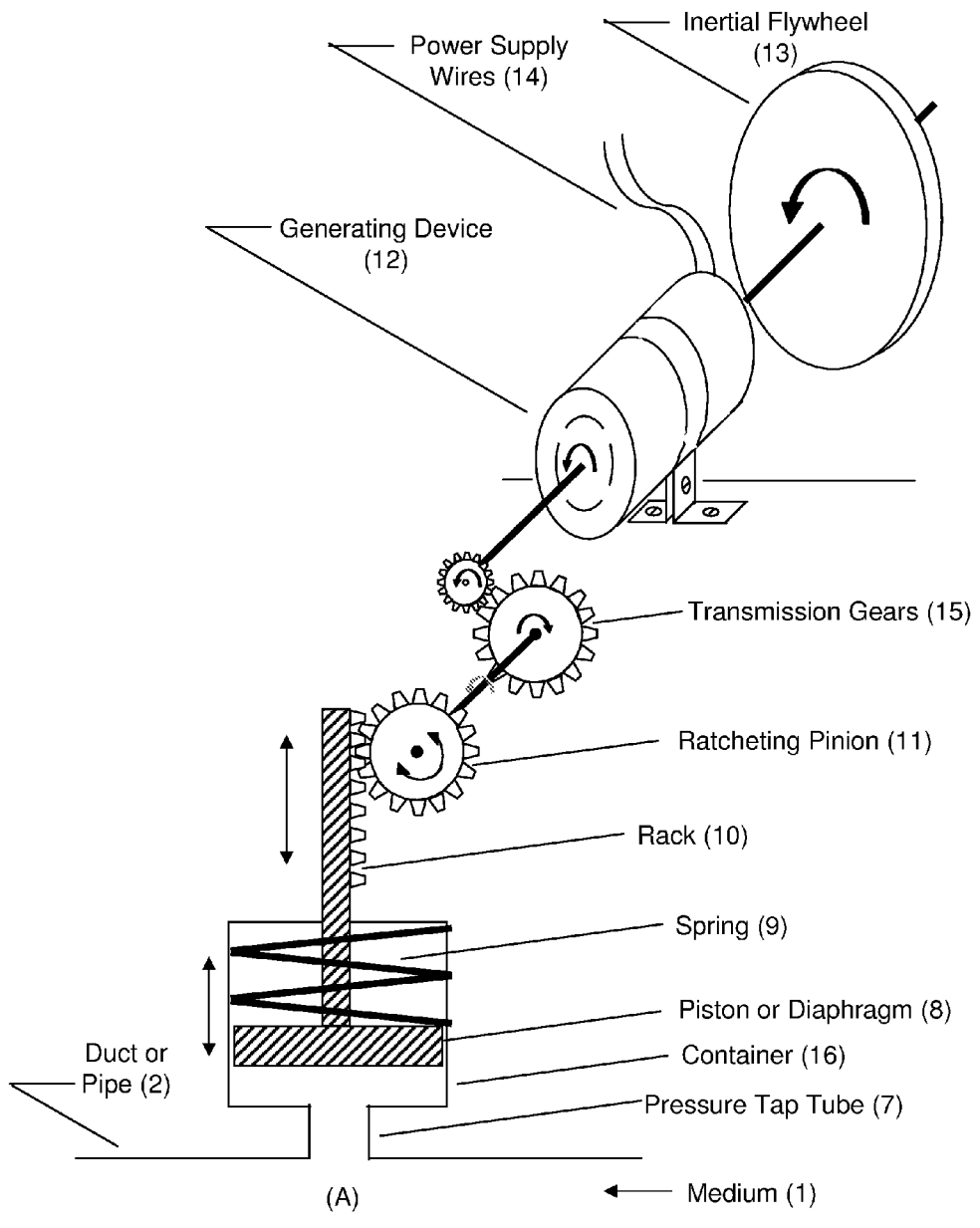
Figure 23- Alt.-Pressure Change Generator

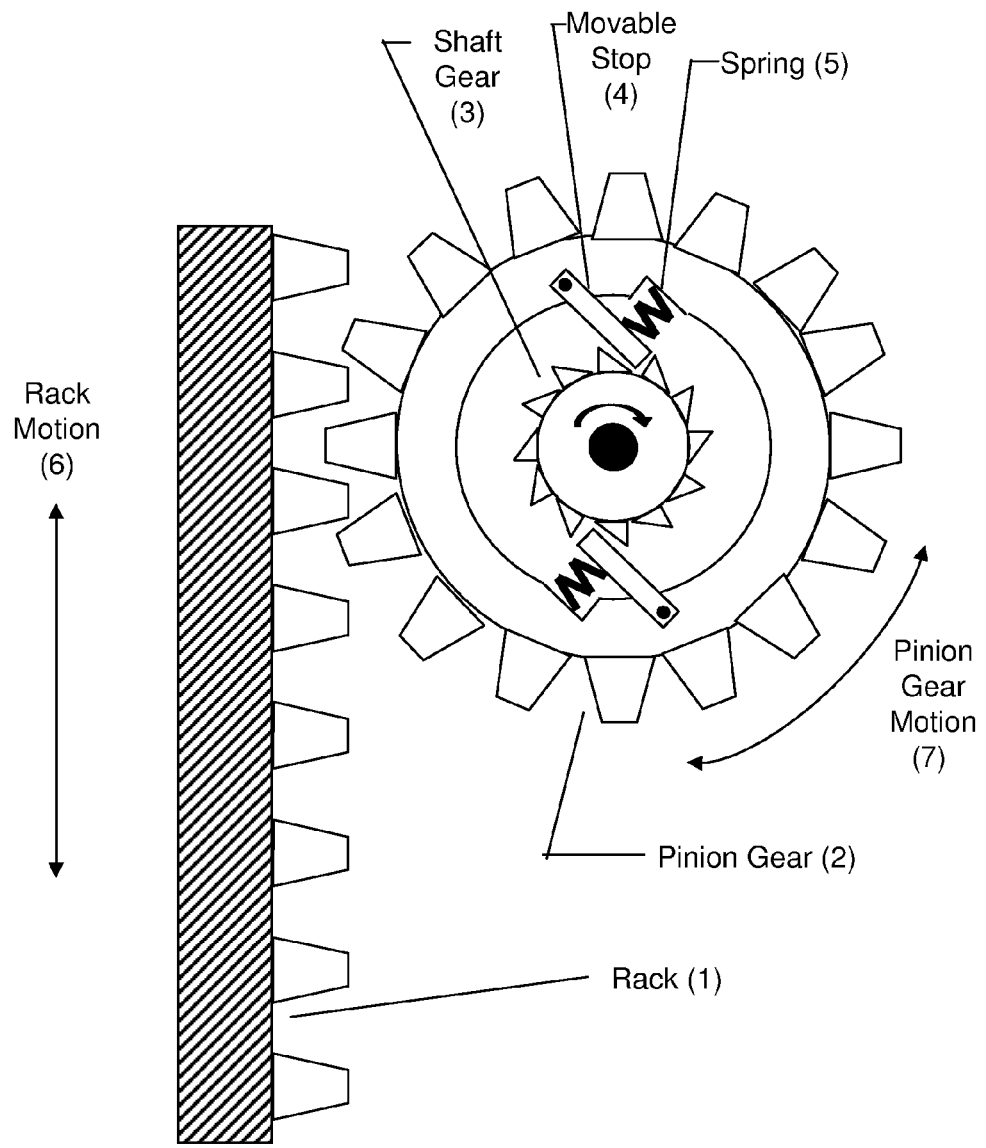
Figure 24- Ratcheting Pinion

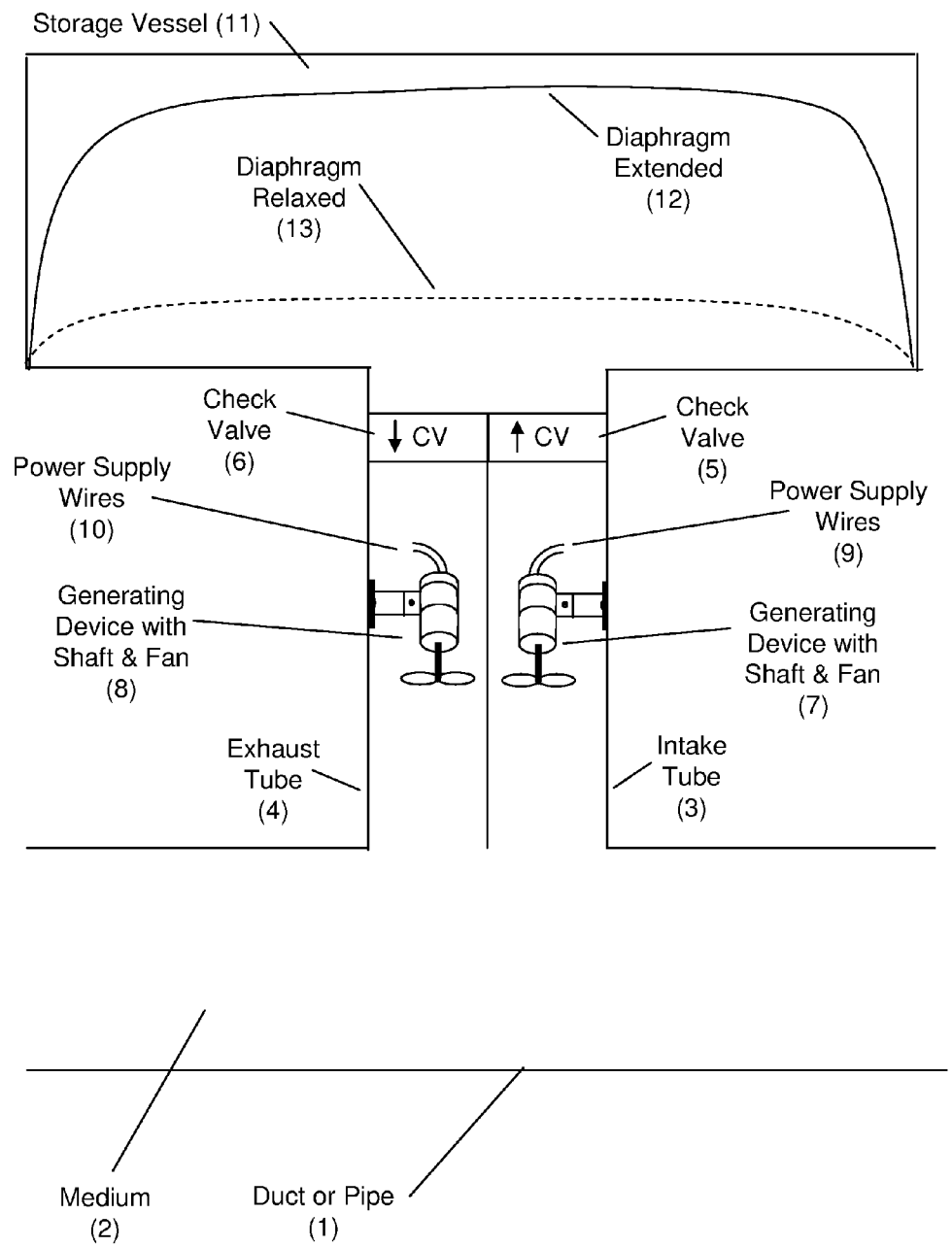
Figure 25- Alt.- Pressure Change Generation (Ex.2)

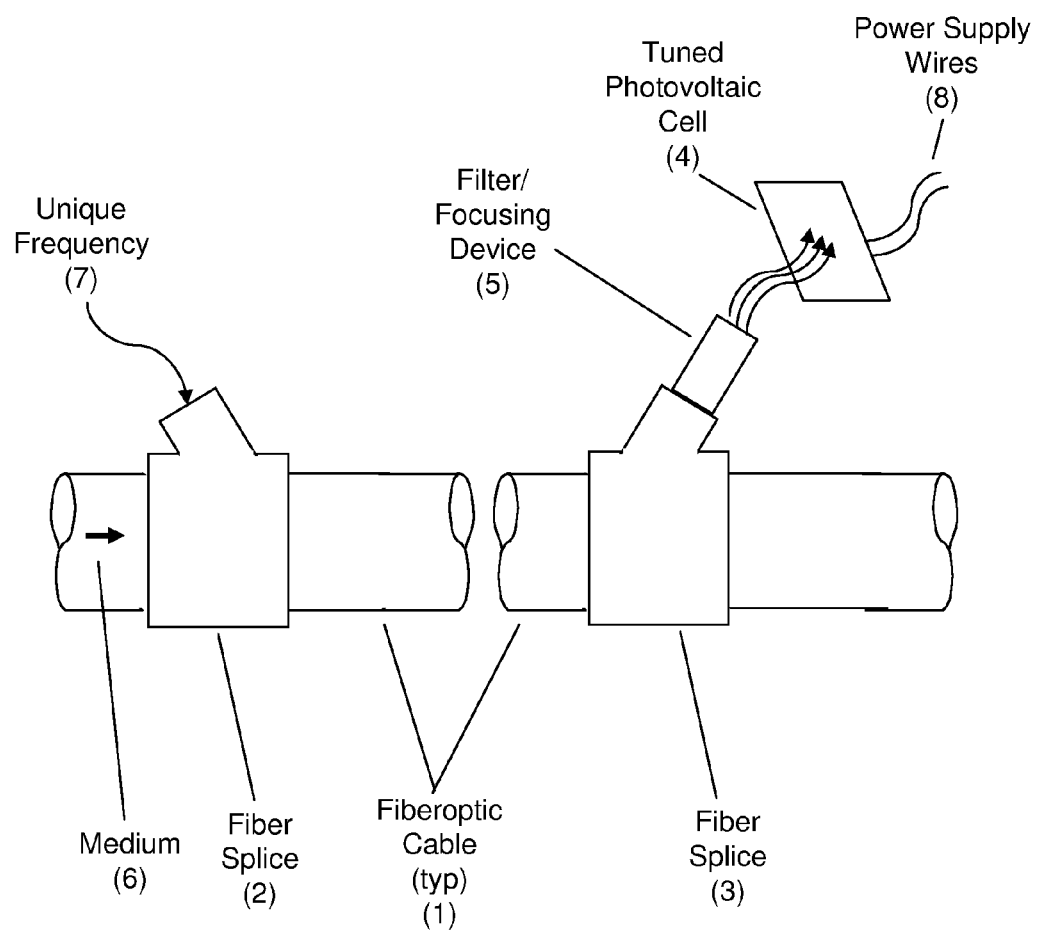
Figure 26- Alt.- Optical Bleed Generation

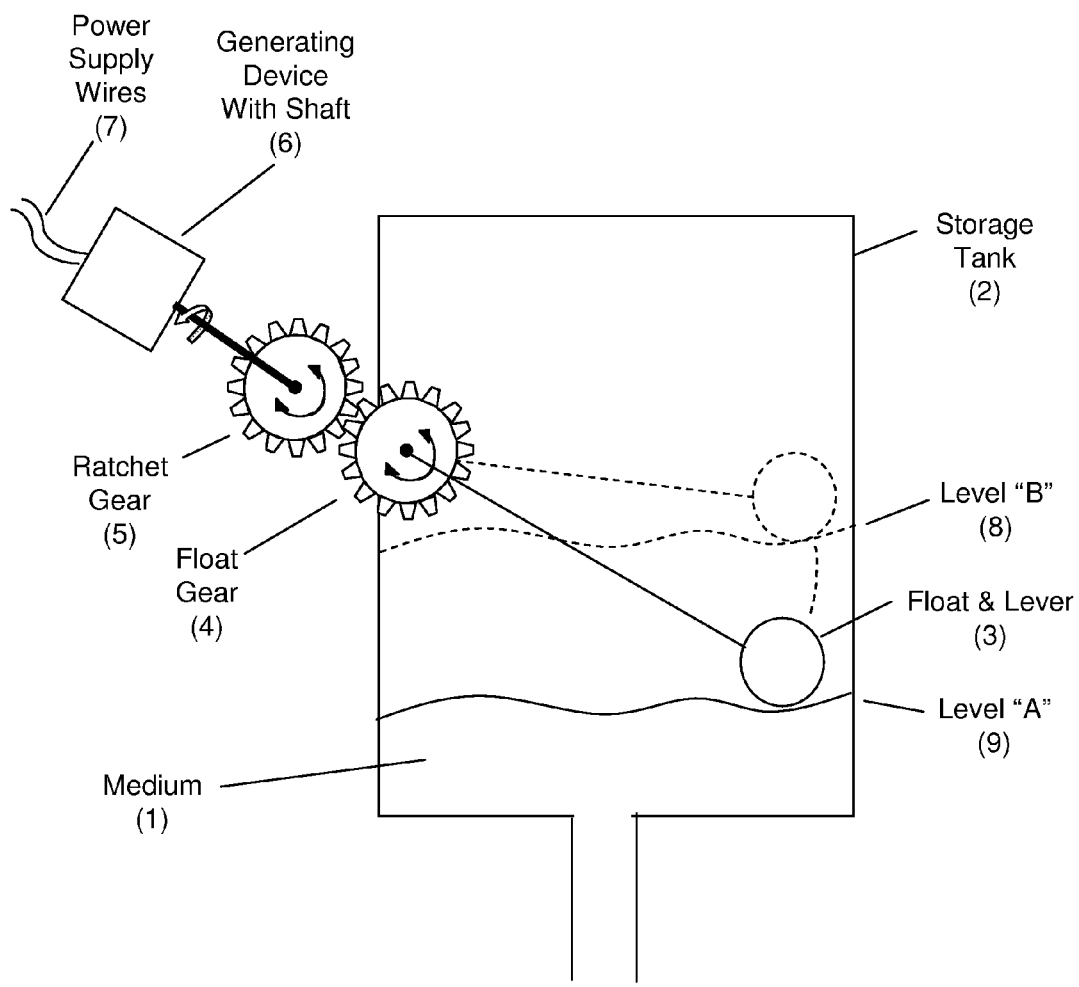
Figure 27- Alt.-Level Change Generation

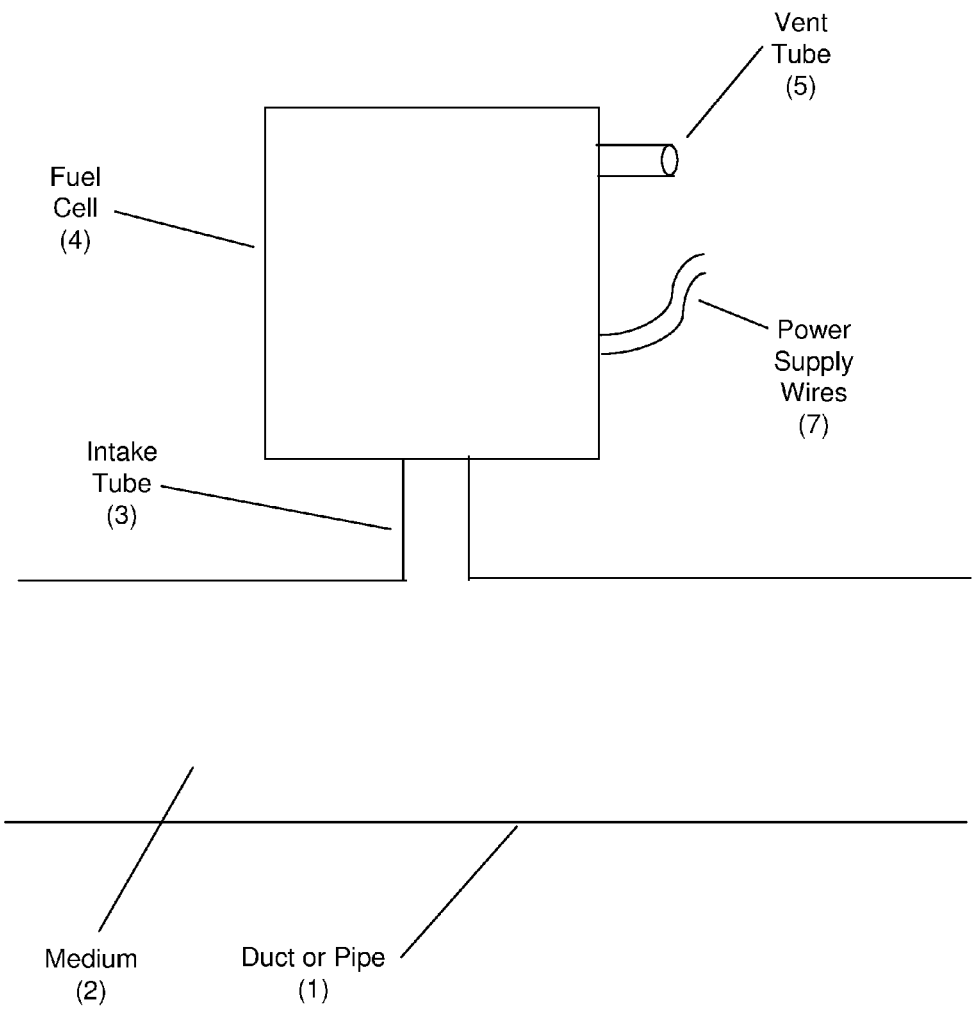
Figure 28- Alt.-Chemical Bleed Generation

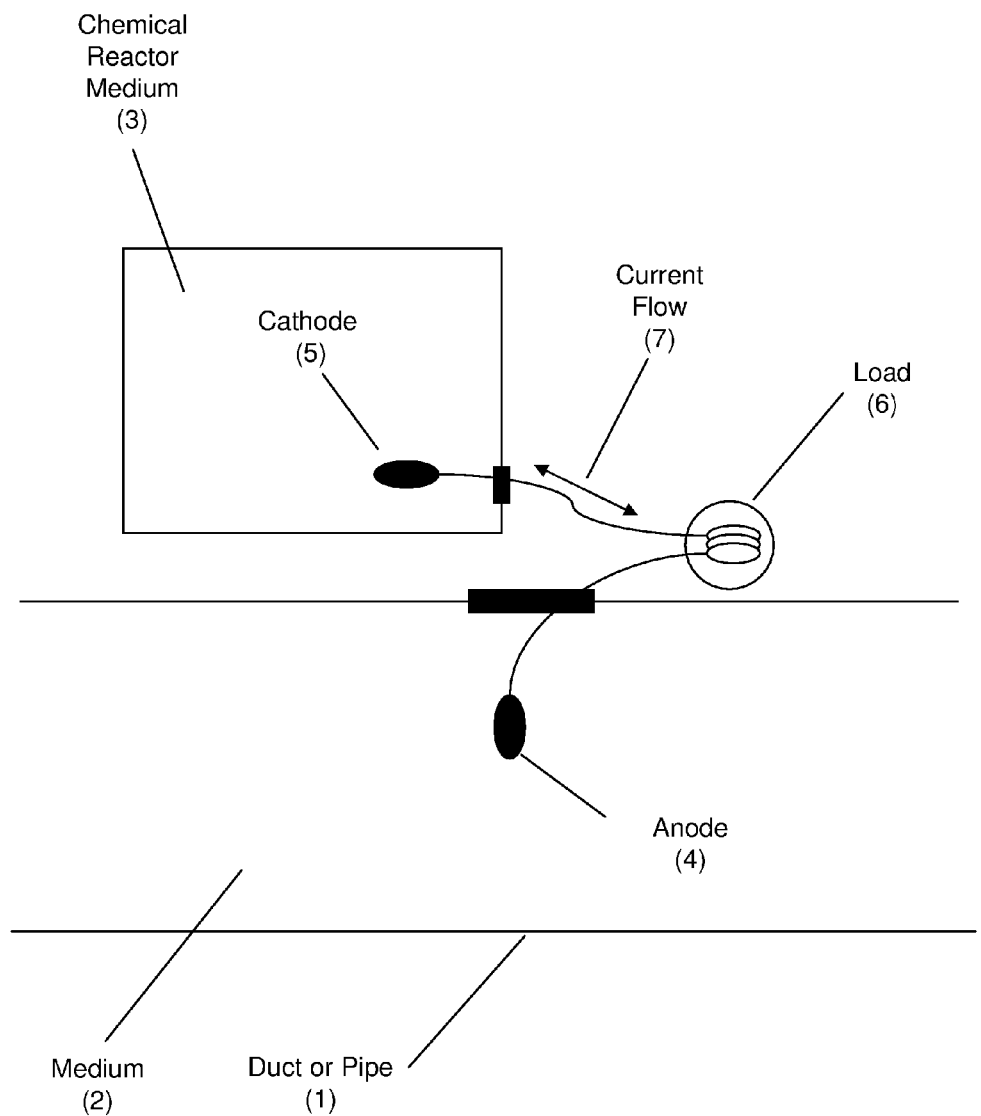
Figure 29- Alt.-Non-Bleed Chemical Generation

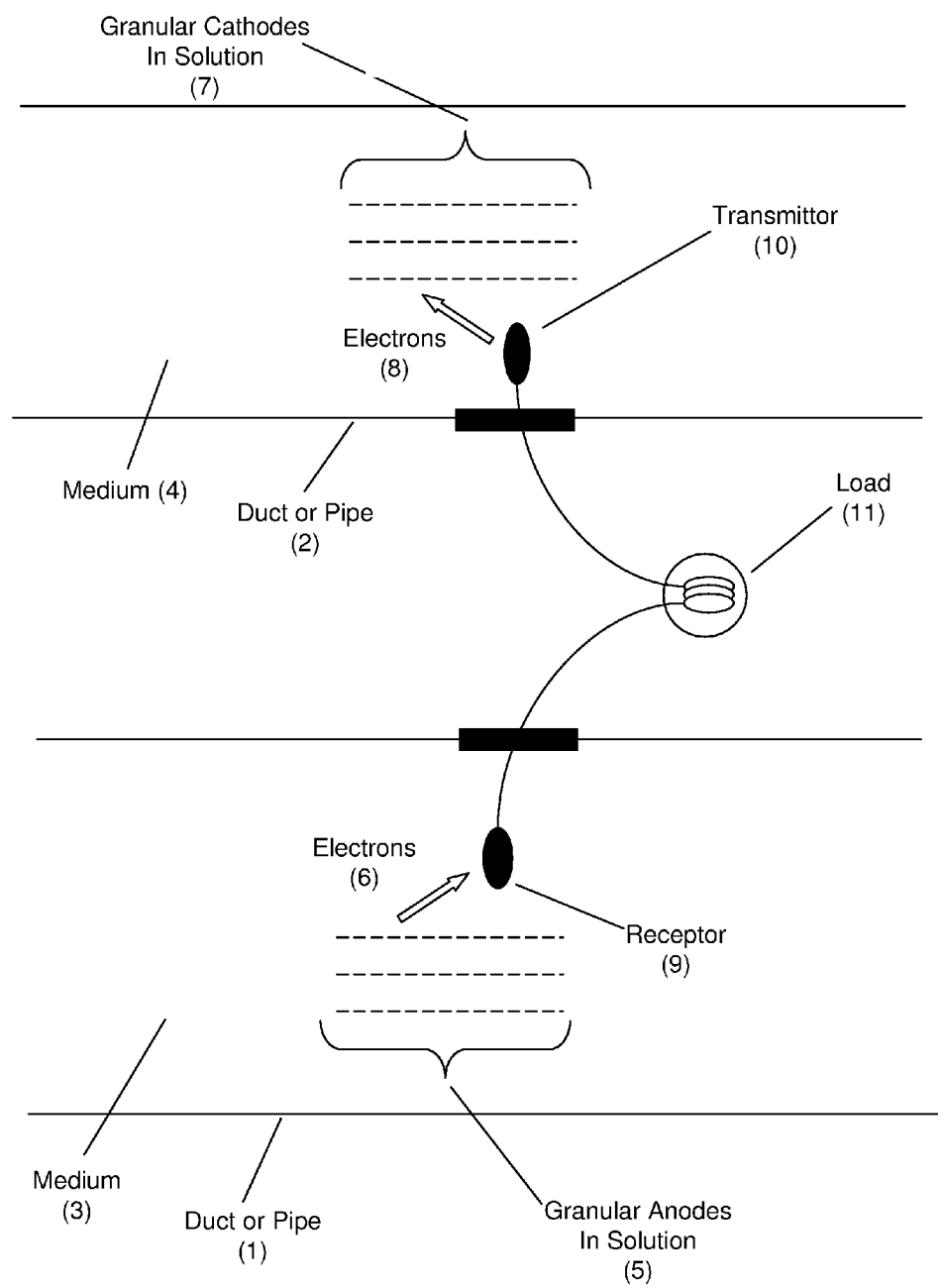
Figure 30-Alt.-Non Bleed Chemical Generation (Ex.2)

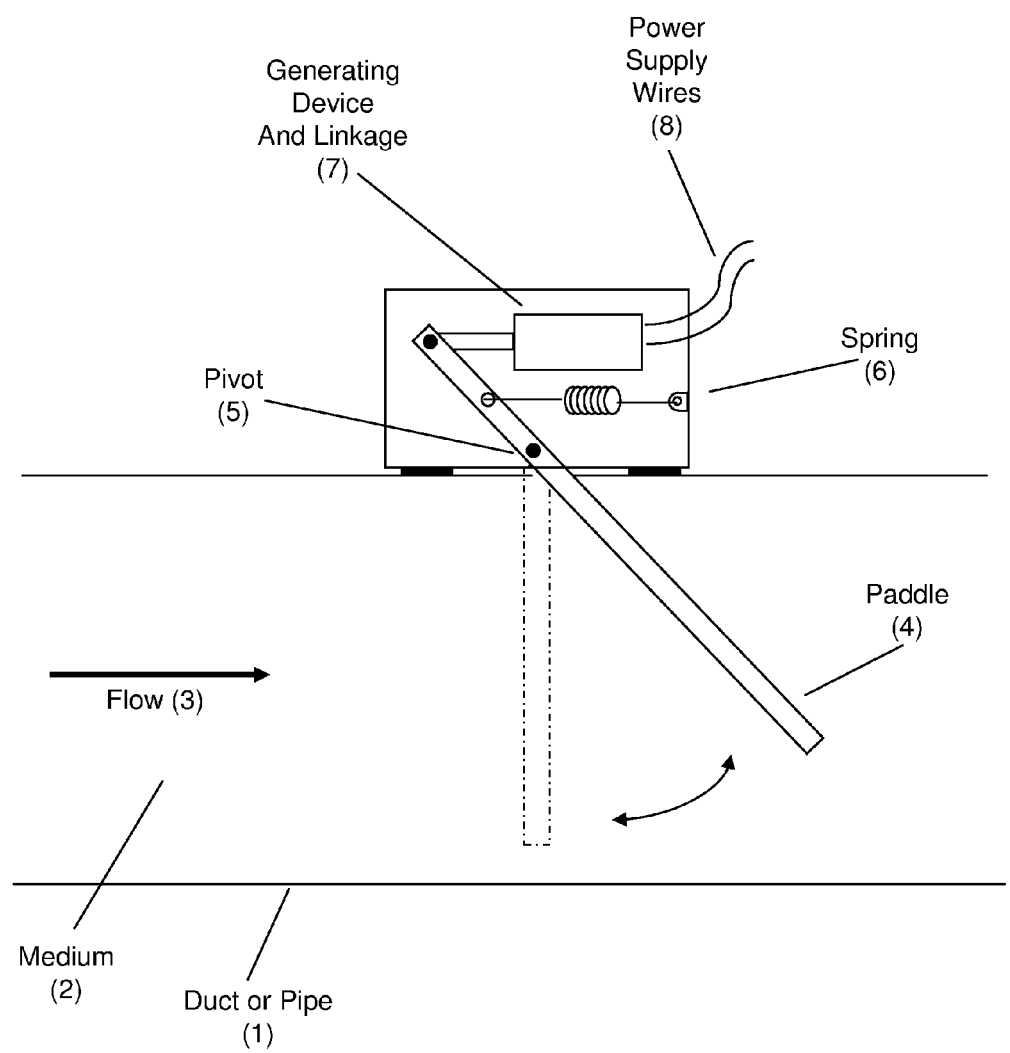
Figure 31- Alt.- Inline Wave Generation

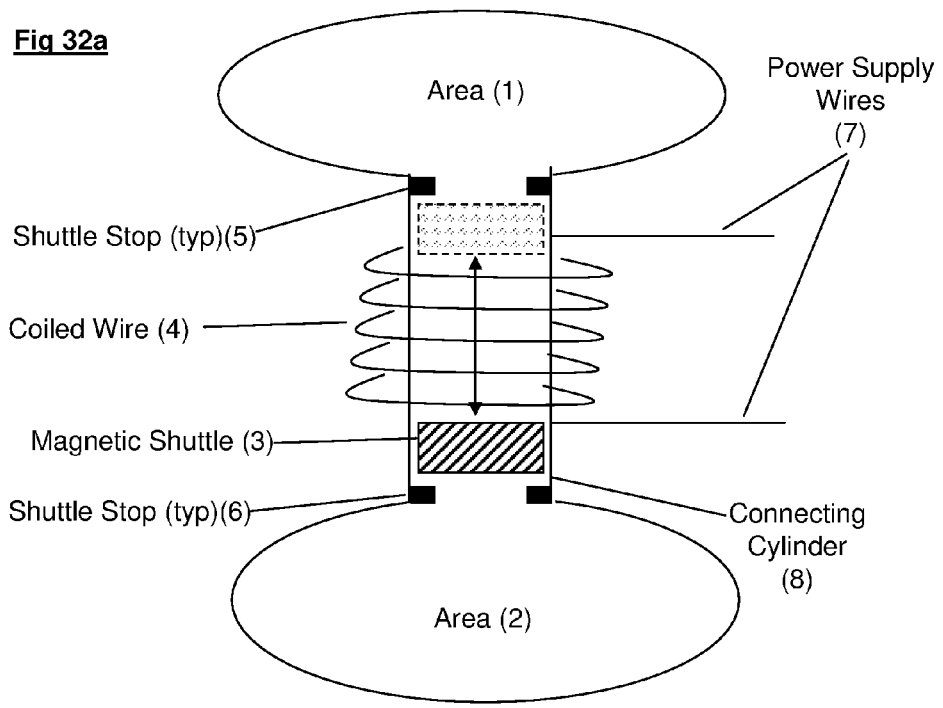
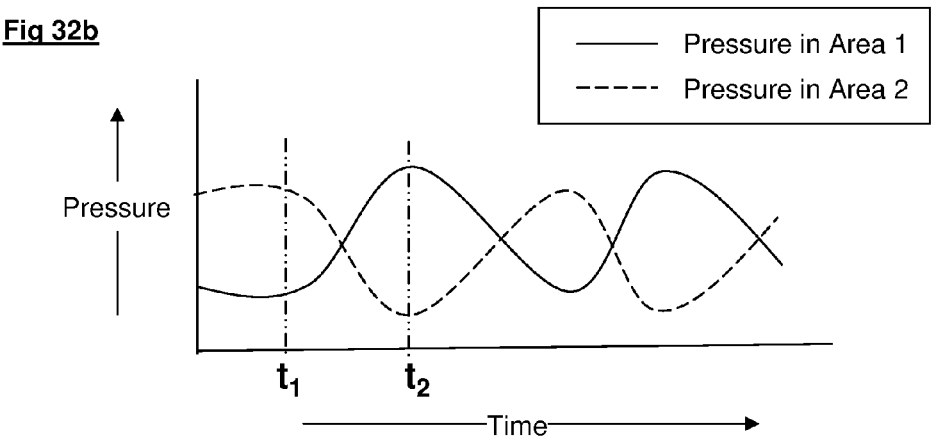
Figure 32a & b-Alt.-Cavitation Induced Generation (Ex.1)

Figure 32c & d- Alt.-Cavitation Induced Generation

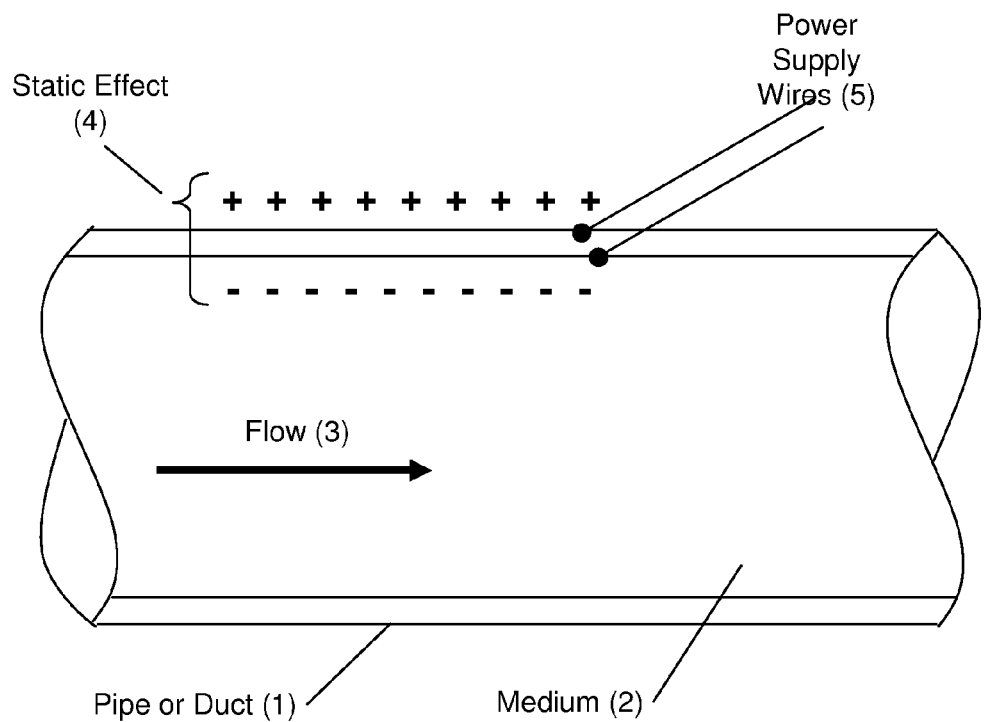
Figure Figure 33- Alt.- Static Generation

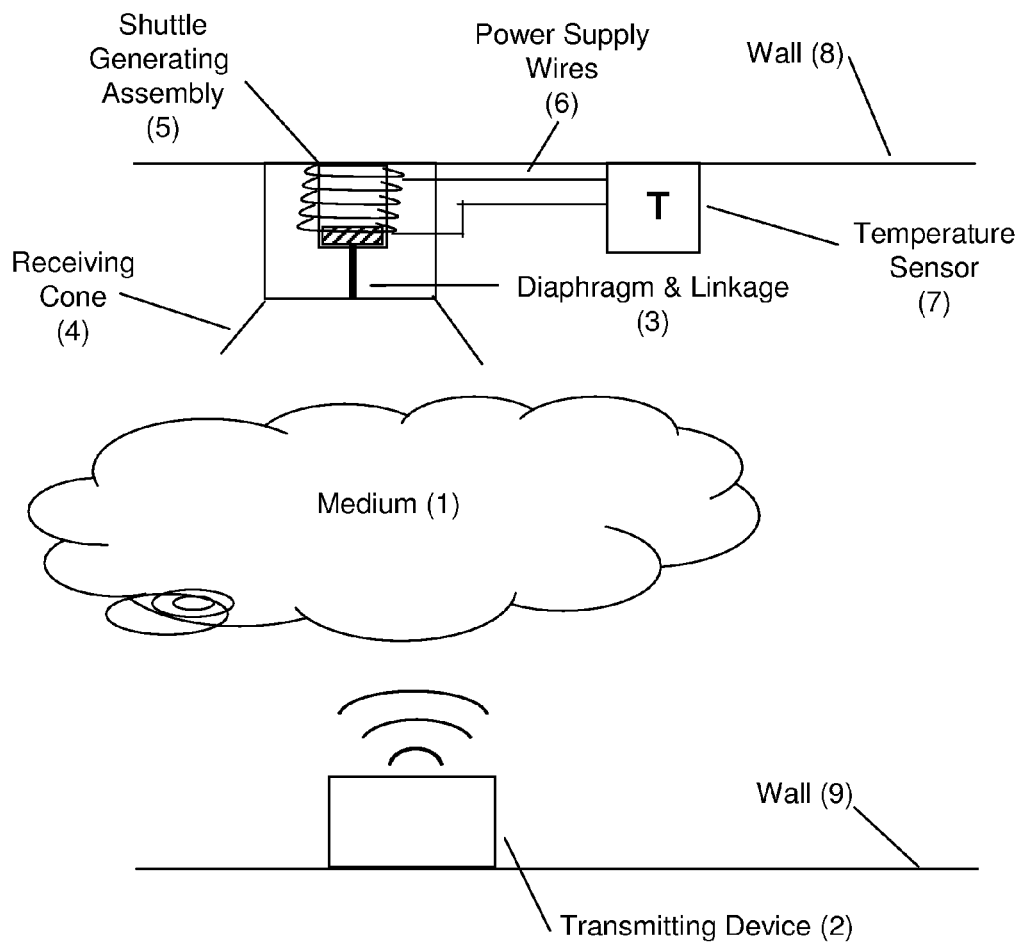
Figure 34- Alt.- Sound/Wave Powered Generation

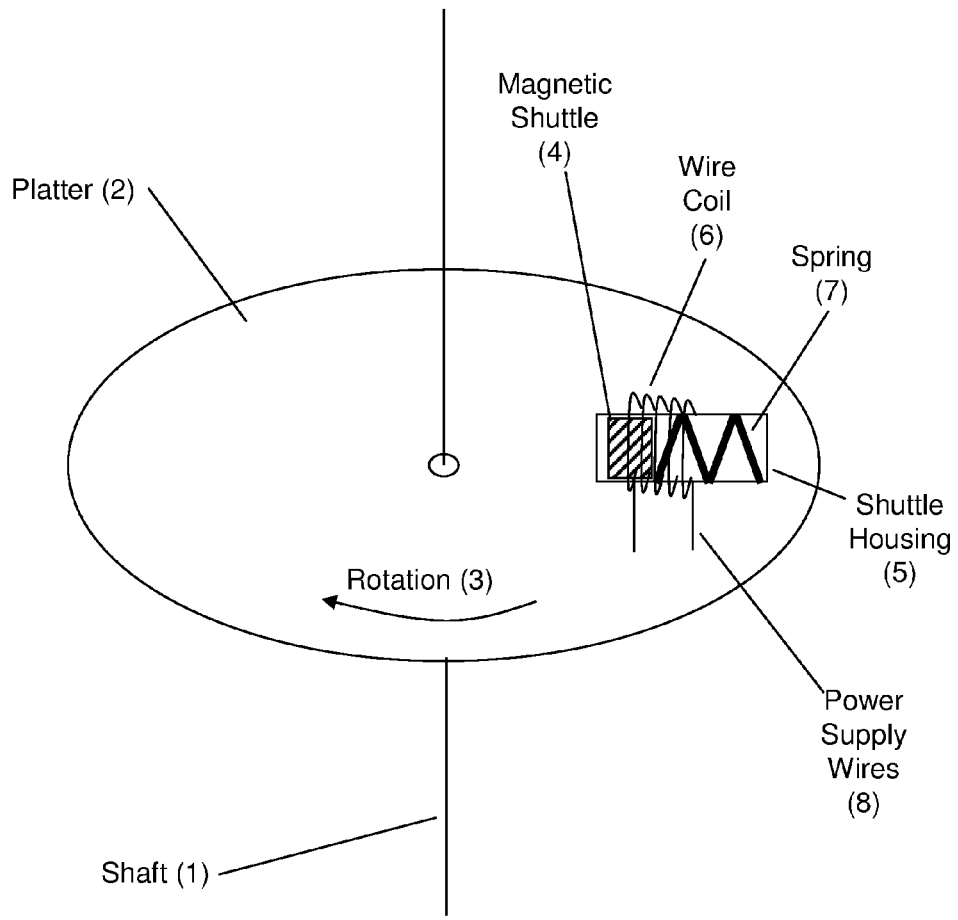
Figure 35- Alt.- Centrifugal Generation

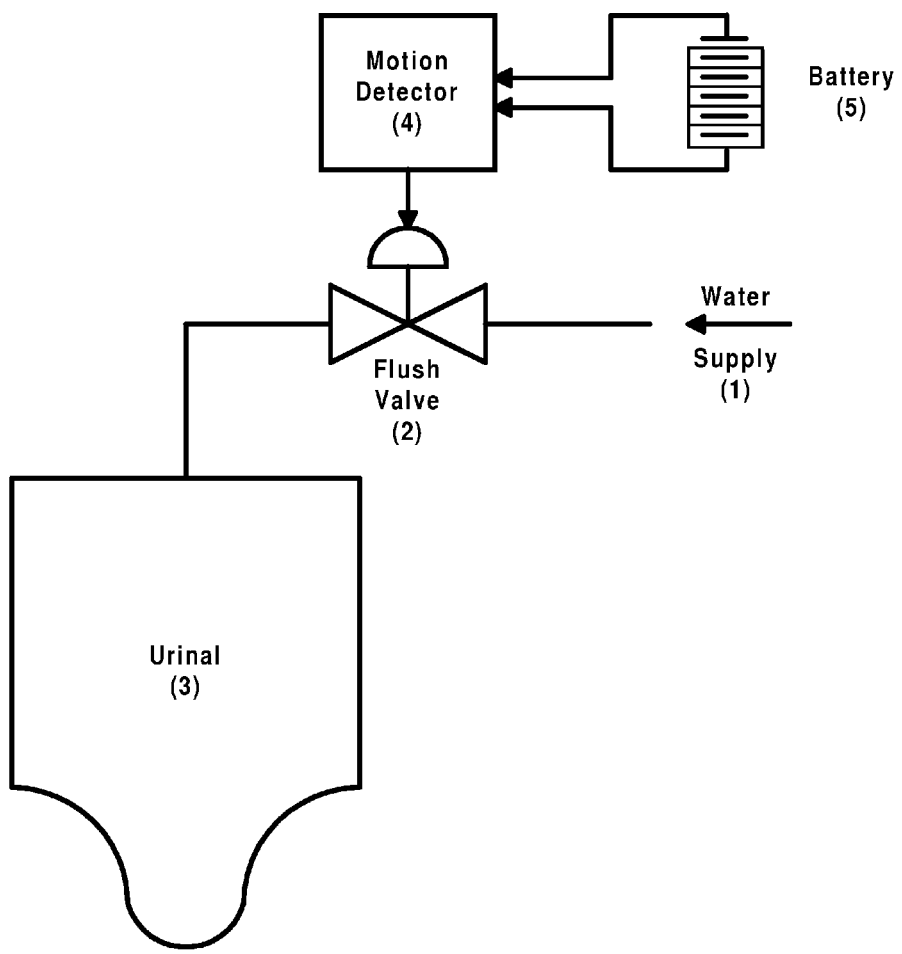
Figure 36- Prior Art- Battery Operated Flushvalve

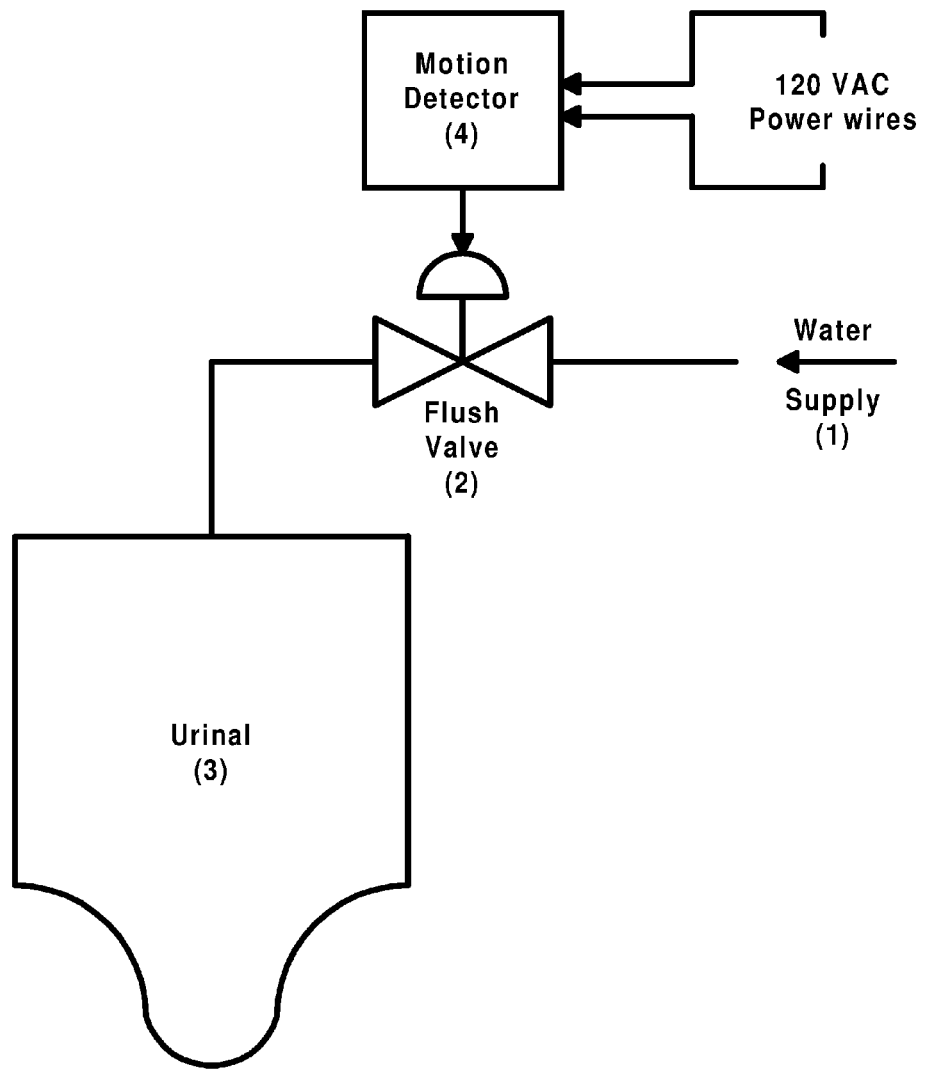
Figure 37- Prior Art- 120 Volt AC Operated Flushvalve

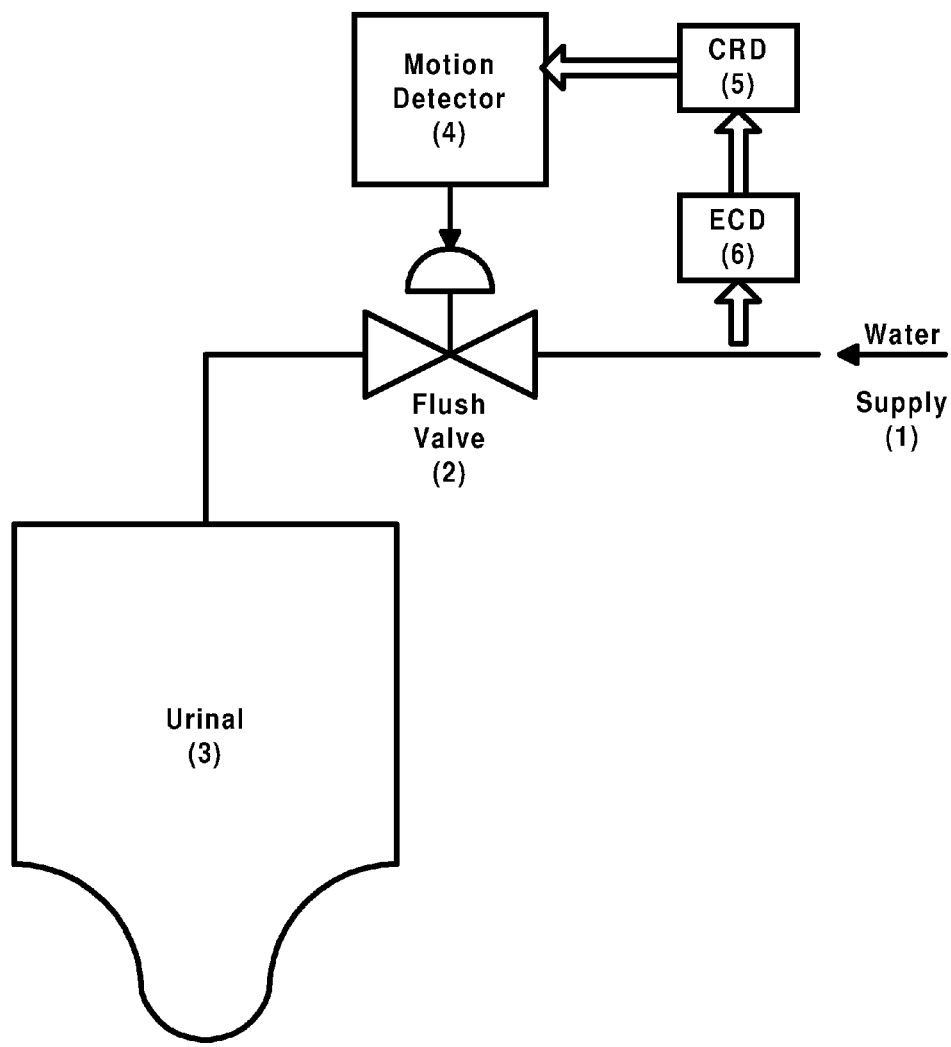
Figure 38- Present Invention Applied to Auto Flushvalve

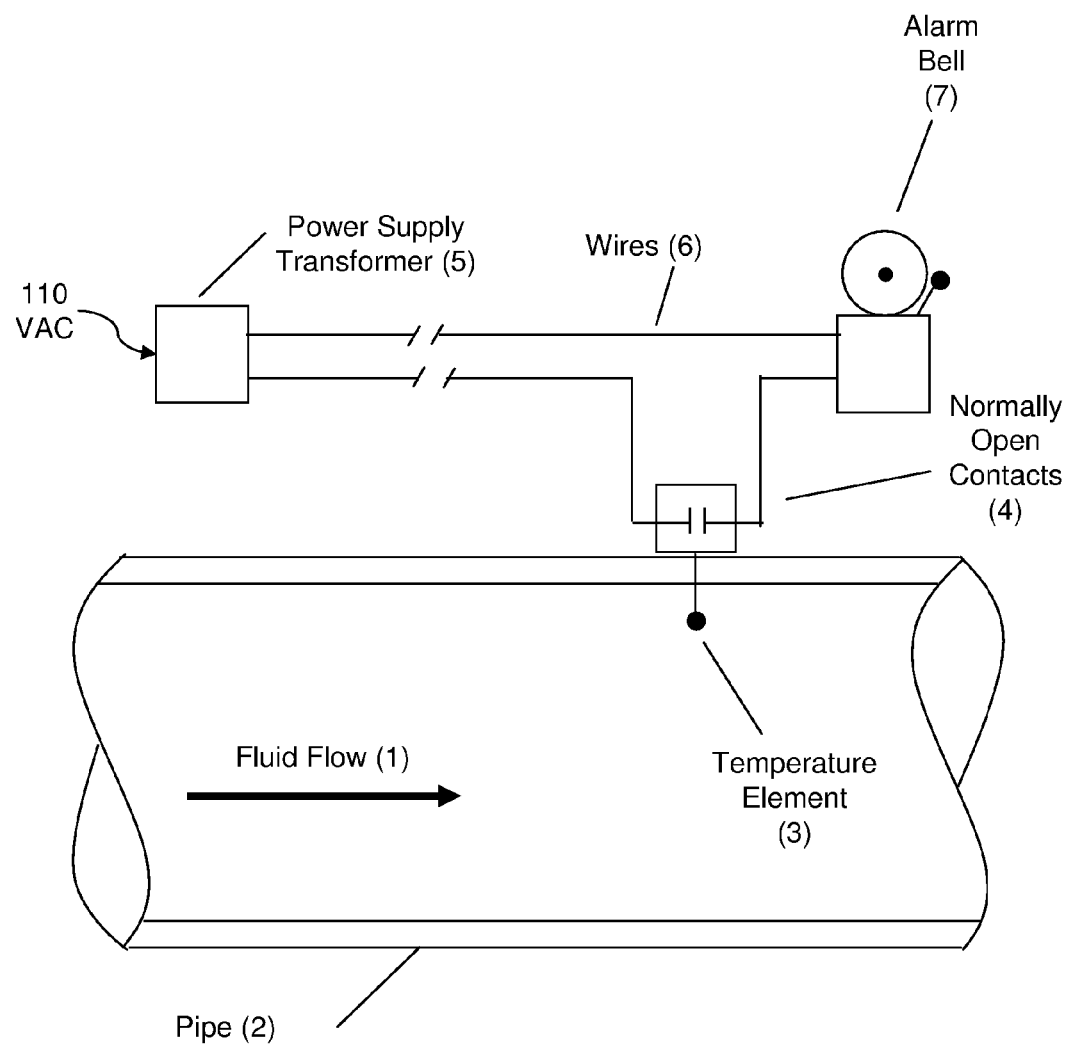
Figure 39- Alt.-Prior Art-Sensing/Alarming Device

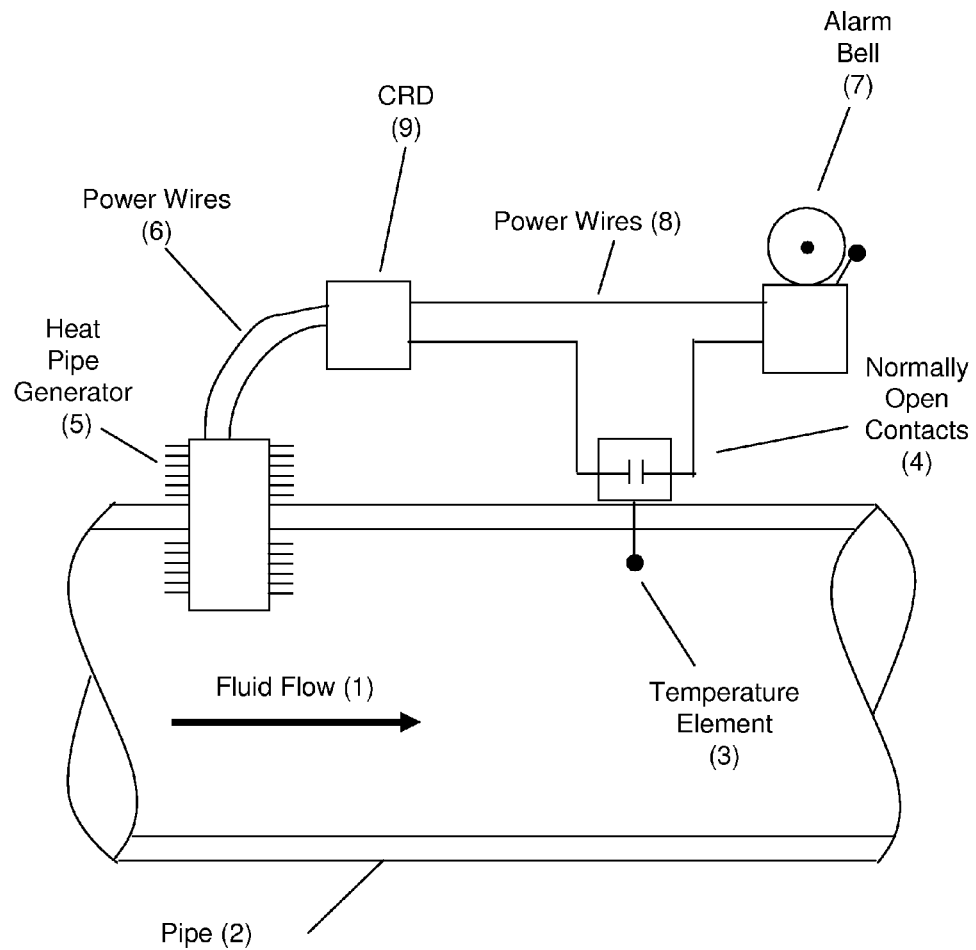
Figure 40- Alt.-Sensing and Alarming Device Example

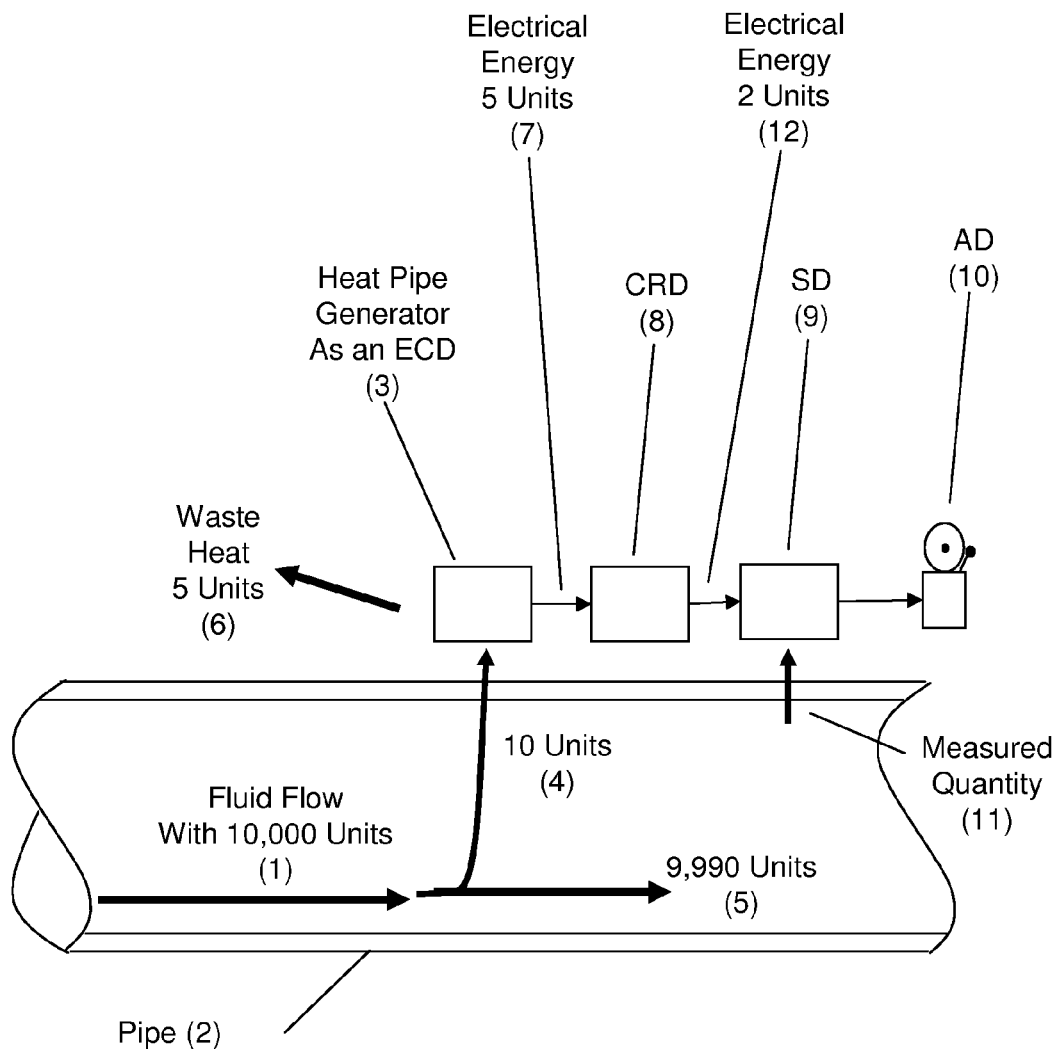
Figure 41- Schematic Flowchart of SD/AD Example

METHOD AND APPARATUS FOR POWERING REMOTE DEVICES

STATEMENT OF RELATED CASES

This case claims priority of U.S. Provisional Patent Application 60/351,258, which was filed on Jan. 23, 2002 and is incorporated by reference herein.

FIELD OF THE INVENTION

The present invention relates to remotely-operated devices, including, without limitation, sensors, controllers and alarms.

BACKGROUND OF THE INVENTION

Sensors, actuators/controlling devices (hereinafter "controllers"), and alarms are used for a variety of purposes and in many different applications, both industrial and consumer. There are many different types of sensors, controllers and alarms. And some of such devices have a singular function (i.e., sensing, controlling, or alarming). Others perform multiple duties, such as sensing and controlling, sensing and alarming, or sensing and alarming and controlling.

These devices are typically positioned at a variety of locations throughout a system in order to acquire data, take or control some action, or provide an alarming function. Usually, the devices are at "remote" locations; that is, they are sited at a location that is remote from a central monitoring area, etc.

Regardless of their functionality, almost all of these remotely-located devices require a power supply to operate properly. Sensors require power to change a native signal that they measure into a more conveniently-transmittable signal. Controllers and alarms require significantly more power than is usually available in the transmitted signal to either control the media or create an alert signal.

The current state of power requirements for sensors, controllers, and alarms are summarized as follows:

SENSORS: a few examples of sensors include current sensors, energy sensors, flow sensors, humidity sensors, light sensors, particle sensors, pressure sensors, proximity sensors, radiation sensors, temperature sensors, velocity sensors, voltage sensors, weight sensors.

Two important purposes of sensors are (1) to determine a specific characteristic of matter and (2) to transmit information regarding this characteristic to another device (e.g., a central processing system or a controller/alarm, etc.).

Typically, the matter being measured is a solid, liquid, gas, or mixtures thereof. The characteristic being measured is often a property of the matter, such as temperature, flow, or weight. But a sensor might alternatively be measuring a more intangible quality, such as, without limitation:

The amount of a particular chemical in a certain volume of air.
The speed of a particle relative to another particle.
The amount of radiation being emitted from an item.
The intensity of light landing on a surface.
The amount of a substance passing by or through a location.

Sensors utilize various methods of transforming the measured quantity into a transmittable signal. They all start with a "native" measuring characteristic, then often change this to a "transmittable" characteristic if the native characteristic is not well suited for transmission to the monitoring system and/or controller and/or alarm.

Typically, signal(s) from a sensor are converted into a voltage, current, or frequency output and conveyed over a transmission medium (e.g., wires, fiber, etc.) to a processing system or other device. The signal(s) can alternatively be transmitted wirelessly via various methods, such as by using radio waves, microwaves, light waves, sound waves, and the like. In some cases, the native signal is not converted; rather, it is amplified for transmission. In some cases, the signal is digitized for transmission.

This conversion from "native" to the "transmittable" signal requires a power source of some type, which is situated either local to the sensor or remote from it. A few examples follow to demonstrate certain issues pertaining to native and transmittable signals.

EXAMPLE 1

Thermocouple

A typical temperature sensor can include a thermocouple, which is two dissimilar metals joined together mechanically and electrically. The characteristics of these dissimilar metals create a known voltage potential at their junction, wherein the voltage potential can be correlated to a temperature. By measuring this very small voltage, the temperature at the junction of the dissimilar metals can be accurately determined. (See, FIG. 1)

The native measured characteristic of this type of sensor is the voltage created at the junction. This voltage potential is very small and has limitations. In particular, the voltage cannot be transmitted very far without degradation and it is not in a form that can be transmitted wirelessly.

A typical solution to these limitations is to provide a transducer for converting the very small native voltage signal proportionately into a higher voltage signal, a current signal, or a wireless signal (such as RF or IR). This transducer requires a source of power to amplify the voltage and/or change its form.

EXAMPLE 2

RTD

Another example of a temperature sensor is an RTD, or Resistance Temperature Device. This type of sensor utilizes a material having a known electrical resistance at a specific temperature. When placed in a location at which temperature measurement is desired, the resistance of the sensor changes as a function of the temperature. By measuring the resistance, the temperature at the sensor can be determined. (See, FIG. 2)

The native measured characteristic of this type of sensor is resistance. But "resistance" is not a signal that can be transmitted—it's a property of the sensor. The resistance must be measured and transduced before it can be transmitted.

A common solution to this limitation is to pass a known voltage across the sensor and measure the resultant current flow through the sensor. This current flow is proportional to the resistance (and therefore the measured temperature) and becomes the transmittable signal. This process requires a power source to create the known voltage and, in many cases, to either amplify the voltage or to convert it further to a signal that can be transmitted wirelessly.

EXAMPLE 3

Humidity Sensor

A humidity sensor measures the amount of moisture in air. Some humidity sensors use a "CAB" element. The resistance of a CAB element changes as a function of the moisture content in an air stream. Once again, the native resistance characteristic—resistance—must be transduced and a power supply is required.

EXAMPLE 4

Photovoltaic Sensor

A photovoltaic sensor measures the amount of light striking a surface. The sensor uses a light-sensitive element, which creates a voltage and current flow that is directly proportional to the amount and intensity of the light striking its surface. This current source is often insufficient for direct transmission, so it is converted to another form or amplified.

CONTROLLERS: a few examples of controllers include baffles, control dampers, control valves, filters, lenses, magnetic devices, restrictors, rheostats, variable frequency drives.

An important purpose of a controller is to vary, modulate or change a specific characteristic of matter based upon a signal of some type from a processing system or a sensing device. The matter being controlled is a typically a solid, liquid, gas, or mixtures thereof. The characteristic of the matter that is being controlled is often a property of the matter, such as its temperature, flow, or weight. But a controller might alternatively be controlling a more intangible quality, such as:

The amount of a particular chemical in a certain volume of air.

The speed of a particle relative to another particle.

The amount of radiation being emitted from an item.

The intensity of light landing on a surface.

The amount of a substance passing by or through a location.

A controller typically receives a signal from a sensor or other device. The signal is then "transformed" into a controlling action. In most cases, the form of the signal being sent is not well suited to performing the controlling action. Consequently, it is usually converted from an easily transmittable form to a form that is better for controlling.

This conversion from a "transmittable" signal to a "usable" signal requires a power source of some type, which is situated either local to the controller or remote from it. Consider the following example involving a typical process-control valve.

The typical function of a process-control valve is to modulate a flow of a fluid. The valve typically receives a signal over wire, fiber, or the air. The transmittable signal is typically one of the following signals: a 0-10 volt, low current signal, a 4-20 mA low voltage signal, a PWM (Pulse Width Modulated) low power signal, an RF signal, or an IR signal.

The energy required to properly control the fluid is usually far greater than any of these "transmittable" signals can supply. Consequently, a local power supply and transducer is typically provided on the valve for converting the transmittable signal to a "usable" signal.

For instance, in a typical application, a digital RF signal is received at the valve. The power of this signal is very small, and cannot operate the valve. But the signal can, however, be used to control the flow of a larger power source, which then operates the valve.

ALARMS: a few examples of alarms include bells, electronic alarms, lights, noisemakers, opaquing devices, strobes, temperature-changing devices, vibrations, whistles and the like.

A key purpose of an alarm is to alert a person or another device responsive to a signal of some type from a processing system or a sensing device.

The alarm typically receives a signal from a sensor or other device. The alarm then transforms the signal into an alerting function. In most cases, the signal that is received by the sensor is in a form that is not well suited to performing the alerting function. As a consequence, the received signal is advantageously converted from an easily transmittable form to a form that is more suitable for carrying out the alerting function.

This conversion from a "transmittable" signal to a "usable" signal requires a power source of some type, which is sited either local to the alarming device or remote from it. Consider an alarm bell as an example of an alarming device.

An alarm bell is typically used to alert people to a specific condition that has been measured by a sensor. The alarm bell usually receives a signal either over wire, fiber, or wirelessly. The transmittable signal is typically one of the following signals: a 0-10 volt, low current signal, a 4-20 mA low voltage signal, a PWM (Pulse Width Modulated) low power signal, an RF signal, or an IR signal.

The energy required to properly ring the bell is usually more than any of these "transmittable" signals can supply. Consequently, a local power supply and a transducer are provided, which converts the received signal to a "usable" signal of sufficient power.

For instance, in a typical application, a digital RF signal is received at the bell. The power of this signal is very small so that it cannot be used to operate the bell. But, this signal can be used to control the flow of a larger power source, which then operates the bell.

COMBINATION DEVICES: In some cases, either one, two, or three of the types of devices described above are combined into a single device. Examples include, without limitation, a sensor with a built-in alarm, a sensor with a built-in controller, a sensor with a built-in controller and alarm. In all of these cases, it is rare that the native measuring characteristic of the sensor will be able to power either the control device or the alarm device without some type of conversion, amplification and an additional power source.

One of the following methods is typically used in the prior art for supplying power to remotely-located sensors, controllers and alarms.

1. Independently Hard Wired

In this arrangement, power is delivered to the device using an independent power-distribution system. The distribution system is often run alongside the signal wires in wired applications. In wireless applications, the power-distribution wires are run alone. See FIG. 3 (wired application) and FIG. 4 (wireless application).

In FIG. 3, a sensor assembly (1) measures temperature using an RTD (1a), which has a resistance value that is proportional to the ambient temperature. The Data Gathering Panel (2) sends a voltage to the sensor on power supply lines (3). The voltage is used by the sensor electronic package (1b) to amplify and transduce the resistance signal into a transmittable signal. The transmittable signal is returned to the data gathering panel (2) along signal wires (4).

In FIG. 4, a sensor assembly (1) measures temperature using an RTD (1a), which has a resistance value that is proportional to the ambient temperature. The Power Supply (4) sends a voltage to the sensor on power supply lines (3). The voltage is used by the sensor electronic package (1b) to amplify and transduce the resistance signal into a transmittable RF signal. The transmittable signal is returned to the data gathering panel (2) over the air.

The wireless sensor gains benefit from the fact that: (1) several sensors can be powered from one set of power wires; and (2) the power wires can be run from a power supply that is located closer to the sensor, rather than from a power supply at the data gathering panel; and (3) no wires are required for sending the signal back to the data gathering panel. All of these attributes reduce the amount of wiring required, thereby lowering the installation cost.

The cost to install the power-supply wire in both of these cases is, however, still of great significance. In fact, the cost of providing power-supply wires to a sensor is usually in excess of 5 to 20 times the cost of the sensor itself.

Additionally, the quality of the signal being transmitted can be adversely affected when power wires and signal wires are run together. Also, many municipal codes have more costly requirements for running power-source wiring as opposed to signal wiring.

2. Signal/Power Combination

In this scenario, power is supplied to the device over the same wire(s) as the transmitted signal is returned. See FIG. 5. A sensor assembly (1) measures temperature using an RTD (1a), which has a resistance value that is proportional to the ambient temperature. The Data Gathering Panel (2) sends a voltage to the sensor on combination power/signal lines (3). The voltage is used by the sensor electronic package (1b) to amplify and transduce the resistance signal into a multiplexed signal. The multiplexed signal is returned to the data gathering panel (2) along the same wires that supplied the power to the sensor (3).

While this scenario is less costly, in terms of wiring, than the independently hardwire method described above, the cost and complexity of both the sensor and panel is substantially increased since both power and signal are being multiplexed on the same set of wires. Additionally, as in scenario "1" above, many municipal codes have more costly requirements for running power source wiring as opposed to signal wiring, and classify this as power wiring.

3. Local Battery

An alternative method of supplying power to remote sensors and controlling/alarm devices is to provide a local battery in the device, which powers the transducers and transmitters. See, FIG. 6.

In this scenario, a sensor assembly (1) measures temperature using an RTD (1a), which has a resistance value that is proportional to the ambient temperature. The local battery (1c) sends a voltage to the sensor electronic package (1b) for amplifying and transducing the resistance signal into a transmittable RF signal. The transmittable RF signal is returned to the data-gathering panel (2) over the air.

Advances in technology have enabled sensors and some controlling/alarms to have lower power requirements, making this technology more feasible. Yet, batteries have a finite storage capacity and need to be changed regularly. Additionally, they add weight and size to the device.

As discussed above, all sensors, controllers and alarms need a source of power to operate. In some cases, the power is for converting a signal to a more transmittable or usable form. In others, the power is required to run an on-board microprocessor for scaling or other functions.

When power is brought to a device using wires, there are many problems which arise. In particular:

Significant additional cost is incurred—The cost to provide power wires to a typical air temperature sensor on an HVAC system is usually in excess of 5 to 20 times the cost of the sensor itself. This cost factor greatly increases as the complexity of the area being wired increases. For example, the cost of wiring is substantially increased when wires must be run in explosion-proof areas or in a human body.

Interference and Noise—When power wiring is run together with signal wires, the quality of the signal that is being transmitted can be adversely affected. This can be mitigated by adding shielding to the wire and the devices, but at an additional cost.

Chance of infection—When wires are run through a living body, there is a substantial risk of complications.

Loss of Flexibility—When a device is powered by wires, its location cannot be easily changed since to do so, wires would have to be re-routed. In many cases, moving a sensor a few feet can be extremely expensive due to the wiring. In other cases, movement of a wired sensor might not be possible without a facility shutdown due to unique characteristics of the environment, such as in the case of an explosion proof location.

Time to install—When a device must be powered by wires, it takes significant additional time to install. The mounting of the device is usually a very small portion of the total time to install, while the wiring is the major portion of time.

An alternative currently being used to eliminate the power distribution network is to provide a storage battery in the device, as noted in scenario "3-Local Battery" above. This, however, introduces many other problems, such as:

Costly Maintenance requirements—Batteries have a short life, and must usually be changed several times per year. Even with advanced battery technology, the cost of the labor required to visit each sensor or controlling/alarming device in large systems on a regular basis usually makes this solution economically unfeasible. Additionally, the lifespan of a battery in a sensor, controlling device, or alarming device is irregular, since the load on the battery is not always uniform. This can lead to failures at random times, potentially causing unexpected shutdowns in the equipment being controlled or monitored.

Costly and Large battery size—High power requirement devices need very large batteries to store ample power for long periods. This is both costly and can be prohibitive in applications where size is critical.

Dangerous and/or disruptive to change batteries—In many locations, it is not desirable to visit the sensor, controller, or alarming device due to dangerous conditions. For example, going into a living organism to change the batteries on a device is not desirable. Similarly, entering into certain process areas is undesirable, such as "hot zones" of biological research areas or nuclear facilities.

A more desirable sensor, controller and alarm would be one which:

Does not require power wires.

Does not require extensive maintenance (such as frequent battery changes).

Does not take up an inordinate amount of space (such as from a large storage battery).

Is not heavier than required (such as from a large storage battery).

SUMMARY OF THE INVENTION

An apparatus and method for powering remote devices are disclosed. In some embodiments, the remote devices are used to providing sensing, controlling or alarm functions (or combinations thereof) in conjunction with a system (e.g., hvac, etc.). In accordance with the present invention, power for the remote devices is transmitted through the medium (e.g., air, etc.) that the devices are sensing, controlling or alarming. This is quite different from the prior art, wherein a separate energy transmission system or on-board power supply is typically used to provide energy to the remote device.

For the purposes of this specification, the phrase "perform (ing) an action associated with the medium," is used to refer to remote devices such as, without limitation, sensors, controllers, and alarms that interact with the medium or to refer to the functionality that they perform, such as, without limitation, sensing a characteristic of the medium (e.g., pressure, temperature, flow rate, etc.), controlling an element that affects a characteristic of the medium (e.g., a control valve, a damper, etc.), and sending an alarm when a value of a characteristic of the medium exceeds, falls below or otherwise deviates from a desired value or range of values (e.g., a high or low temperature alarm, a low flow alarm, etc.).

In the illustrative embodiments, energy is input (as required) into the system in a form that is easily transmitted by the medium, withdrawn near the point of use (i.e., near the remote device), and converted (as required) into a usable form. Furthermore, in some embodiments, the energy flow to the remote device is regulated, such as by storing energy in a capacitance device or by flowing energy through a regulating device to account for fluctuations in the conversion rate.

An apparatus and method in accordance with invention significantly reduces first costs and ongoing maintenance costs relative to devices and method currently being used to provide power to remote devices.

The present invention takes advantage of the fact that most sensors, controllers and alarms are located in or near the medium that they are sensing, controlling, or alarming. Most of these mediums already contain several different forms of energy. The energy is present as a consequence of (1) the inherent characteristics of the medium itself; or (2) being inserted into the medium to be transported; or (3) being specifically added to the medium at one point to be removed later. A few examples of the types of energy found in these mediums include:

Kinetic Energy
Potential Energy
Mass Energy
Heat Energy
Wave Energy
Nuclear Energy
Photo-electric Energy
Chemical Energy
Magnetic energy
Temperature
Sound Power
Gravitational energy
Centrifugal energy
Pressure
Velocity Energy can be readily added to the medium to supply power to a remote device. For example, in systems in which the medium is air or water: (1) static pressure can be added to the system; (2) additional volume of the medium can be added; (3) temperature can be increased, etc. The added pressure, volume and temperature can be readily removed at some other location, providing power for the remote device, while otherwise enabling the system to operate properly. The addition of energy can be similarly accomplished in systems that transmit any fluid or gas, light (fiber optics), sound, heat, chemical energy, etc.

Some embodiments of an apparatus and method in accordance with the illustrative embodiment are capable of:
  adding "surplus" energy into the system in one location;
  moving the surplus energy within the medium to another location; and
  removing the surplus energy.

This is illustrated schematically in FIG. 7. In operation (A), energy is added to medium (B) that the remote device is sensing, controlling, or alarming. This energy can be in any form and can be added to the medium at any convenient location, which is not necessarily near the remote device.

Typical reasons for adding energy to the medium are to move it, store it more compactly or safely, protect it from breaking down, etc. Alternatively, energy can be purposefully added during this operation solely to be removed later at another location to power the remote device. The energy, as added to the medium, is most likely not in a form that is usable to the sensor, controller or alarm. The energy must be in a form and present in a quantity that does not substantially affect the functioning of the system that surrounds the medium.

In energy-removal operation (C), a small amount of the added energy is removed from the medium. Energy removal advantageously occurs at a location that is near to the remote device (H). The removed energy is delivered to energy conversion device (D), which configured to accept energy of the type offered by the medium and convert it to a form of energy (E) that is usable by the remote device. The converted energy (E) is transmitted to capacity and regulation device (F), which removes any fluctuations and otherwise provides regulated energy (G) to the remote device (H).

For illustrative purposes, FIG. 8a shows how the inventive apparatus and method can be used in conjunction with an otherwise conventional pumping system for moving a medium (i.e., water in this example) from one location to another. Reservoir I (1), which contains water as a medium (2), is connected to another reservoir II (3) via a length of pipe (4). Pump (5) adds energy (6) to medium (2) to move it through pipe (4) from reservoir I to reservoir II.

Energy conversion device (8) is connected to pipe (4) about halfway between the two reservoirs. The energy conversion device removes a small amount of energy (7) from the water and converts it into a usable form of power (9). This unregulated power (9) is sent through a capacity and regulation device (10), which provides a regulated, stable supply of power (11) for a remote device (12).

By way of analysis, consider the relative energy content of the medium as it moves through the system. In reservoir I and II, the water has a "zero" reference energy level; it contains no relative kinetic energy because it is not moving and no relative potential energy because it is at the same pressure and height in both reservoirs. Pump (5) adds potential and kinetic energy to the water. In particular, pump (5) increases the pressure of the water in the pipe and gives it velocity, moving it towards reservoir II.

FIG. 8b depicts the relative energy levels in the pipe. As shown in that Figure:

Between points A and B1, the water is at reference zero, in reservoir I.

Between points B1 and B2, the pump is adding energy to the water.

Between B2 and C1, the resistance of pipe (4) (e.g., due to the roughness of the interior surface, etc.) gradually converts at least some of the energy that is inserted into the water by the pump into other forms, such as heat, noise, etc. The energy loss is linear in this example because the pipe is assumed to be straight, with no obstructions, bends, or changes in height, and no changes in roughness.

Between C1 and C2, energy is removed from the water and directed to energy conversion device (8).

Between C2 and D, the pipe losses once again bring the energy level down to reference zero, where the medium leaves the pipe and enters reservoir II.

It is notable that the energy removed between points C1 and C2 does not affect the movement of the water through the system because that additional amount of energy was added to the medium in the pump. If energy conversion device (8) were not present in the system, pump (5) would have only been required to move the energy level of the water from point B1 to point B2' in order for it to have had enough energy to move to reservoir II.

The illustrative embodiment of the present invention eliminates the need for a separate power distribution system for supplying power to sensors, controllers and alarms. This provides many advantages over the prior art. In particular:

1. First costs are significantly reduced compared to hard-wired implementations of the remote devices, since a power distribution system is no longer required.
2. Wireless implementations of the remote devices become economically feasible because their extensive maintenance requirements are reduced. There is no need to change batteries and costs associated with unexpected maintenance due to early battery failure are eliminated.
3. The size of wireless implementations of the remote devices is reduced.
4. The likelihood of noise entering the remote device is reduced or substantially eliminated. When using the power distribution systems of the prior art, stray interference can be picked up from "noisy" devices or wires that are encountered over the long runs of the power distribution system.
5. Moving the sensors, actuators, or alarms as might be required, is much easier, since the power distribution system no longer exists.
6. The time required to install sensors, controllers, and alarms is significantly reduced, since wiring the power distribution system (in prior art systems) is the major component of time required for the installation of these devices.
7. Devices located in hazardous areas need not be serviced regularly, unlike the battery-operated devices of the prior art.
8. In applications where components are placed into a living organism, infection can sometimes be a problem with wires, and battery-operated devices add a maintenance burden. Embodiments of the invention overcome both these drawbacks. In particular, a wireless sensor, controller or alarm that is powered in accordance with the present teachings utilizing, for example, the bloodstream as a power distribution media, would require less maintenance than a battery operated device and no wires would be required to penetrate the organism's skin.
9. As applied to micro-electromechanical systems ("MEMS") technology, the present teachings can be used to reduce the space required for a MEMS device and its associated power source. Eliminating battery sources, large power distribution systems, and multiple points of power input, in favor of inputting energy in one location and distributing energy as part of an existing transport network, can significantly reduce space and weight.

BRIEF DESCRIPTION OF DRAWINGS

FIG. 1—Thermocouple Example (Prior Art)
FIG. 2—RTD Example (Prior Art)
FIG. 3—Hard Wired Sensor (Prior Art)
FIG. 4—Wireless Sensor with Power Wires (Prior Art)
FIG. 5—Sensor with Multiplexed Power and Signal (Prior Art)
FIG. 6—Wireless Sensor with Local Battery (Prior Art)
FIG. 7—Method and Apparatus in accordance with the illustrative embodiment of the present invention
FIG. 8a—Illustrative embodiment of the present invention
FIG. 8b—Energy diagram for the embodiment of FIG. 8a
FIG. 9—Method in accordance with the illustrative embodiment of the present invention
FIG. 10—Apparatus in accordance with the illustrative embodiment of the present invention
FIG. 11—Illustrative energy conversion device in accordance with the illustrative embodiment of the present invention
FIG. 12—Illustrative capacity and regulation device in accordance with the illustrative embodiment of the present invention
FIG. 13—Illustrative wireless sensor in accordance with the illustrative embodiment of the present invention
FIG. 14a—Conventional wireless sensor and its operation
FIG. 14b—Energy diagram for the conventional wireless sensor of FIG. 14a.
FIG. 15a—Energy flow in an apparatus in accordance with the illustrative embodiment of the present invention
FIG. 15b—Energy diagram for the apparatus depicted in FIG. 15a
FIG. 16—Illustrative embodiment for adding energy to the system: pressure bleed generation
FIG. 17—Illustrative embodiment for adding energy to the system: inline generation (Ex. 1)
FIG. 18—Illustrative embodiment for adding energy to the system: inline generation (Ex. 2)
FIG. 19—Illustrative embodiment for adding energy to the system: inline generation (Ex. 3)
FIG. 20—Illustrative embodiment for adding energy to the system: inline generation (Ex. 4)
FIG. 21—Illustrative embodiment for extracting energy from the system: heat pipe
FIG. 22—Illustrative embodiment for extracting energy from the system: temperature difference
FIG. 23—Pressure Change Generation (Ex. 1)
FIG. 24—Ratcheting Pinion
FIG. 25—Pressure Change Generation (Ex. 2)
FIG. 26—Optical Bleed Generation
FIG. 27—Level Changing Generation
FIG. 28—Chemical Bleed Generation
FIG. 29—Non-Bleed Chemical Generation (Ex. 1)
FIG. 30—Non-Bleed Chemical Generation (Ex. 2)
FIG. 31—Inline Wave Generation
FIG. 32a—Cavitation Induced Generation—Schematic
FIG. 32b—Cavitation Induced Generation—Pres. Chart
FIG. 32c—Cavitation Induced Generation—Equipment 1
FIG. 32d—Cavitation Induced Generation—Equipment 2
FIG. 33—Static Generation FIG. 34—Sound/Wave Powered Generation
FIG. 35—Centrifugal Generation
FIG. 36—Battery Operated Flush Valve
FIG. 37—120 VAC Operated Flush Valve
FIG. 38—Auto Flush Valve
FIG. 39—Conventional sensor/alarm
FIG. 40—Sensor/alarm in accordance with the illustrative embodiment of the present invention
FIG. 41—Schematic flowchart for the sensor/alarm of FIG. 40

DETAILED DESCRIPTION

A First Illustrative Embodiment

Figure 14A:
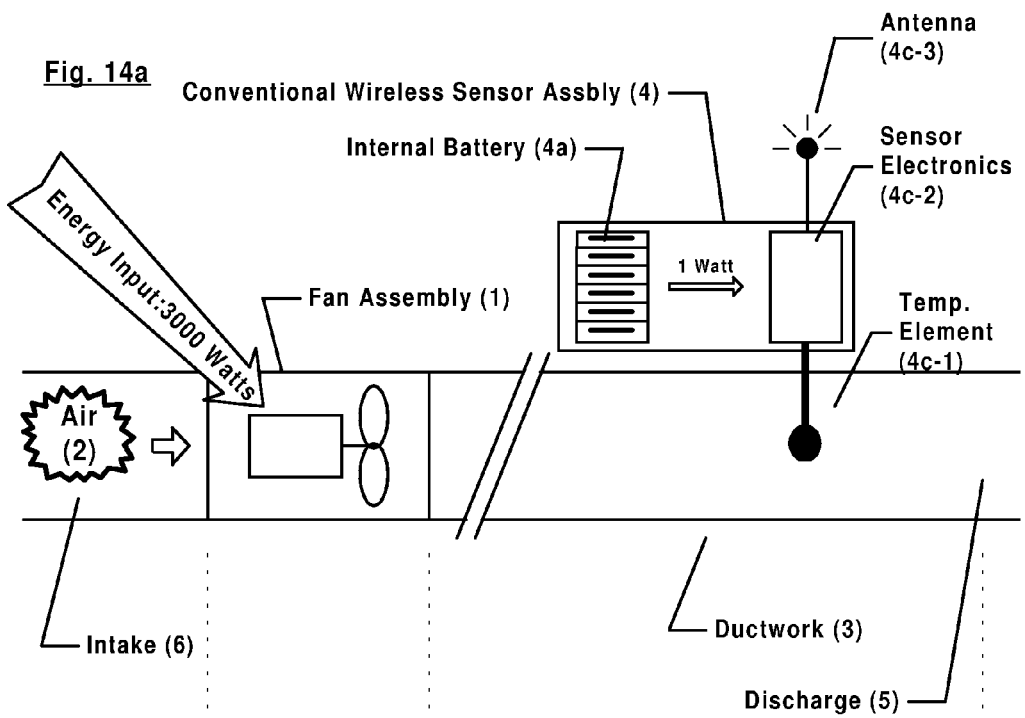

A first illustrative embodiment of the present invention is an apparatus and method for:
transporting the energy needed to power a duct-mounted, wireless, air-temperature sensor through the medium it is sensing (air); and
locally converting the energy to a form usable to the sensor.
A flow chart depicted in FIG. 9 describes the process. In operation (1) a small amount of additional energy is input into the medium (air). In this embodiment, energy addition is performed by increasing the amount of static pressure applied to the air in the duct in order to move it along the duct.

In operation (2), the energy is moved along the duct in the medium, until it reaches the point of withdrawal. In this embodiment, the additional static pressure is retained in the air until it reaches the point of withdrawal, local to the sensor.

In operation (3), the additional energy is withdrawn from the medium (air). Energy loss at this point is possible due to the inefficiencies of the energy-withdrawal device. In this first illustrative embodiment, energy withdrawal takes place by permitting some of the air in the duct to vent, thereby reducing the static pressure in the duct back to a level where it would have been had the additional static pressure not been introduced at the fan.

In operation (4), the energy removed is converted to electricity at a voltage equal to that required by the sensing device. In this embodiment, conversion is performed by impinging vented air against a turbine/fan to create rotation and drive a small generating device.

In operation (5), the energy from the generating device is regulated to assure that the sensor receives a steady supply of energy, regardless of any fluctuations in the energy withdrawing process or the energy conversion process. In this embodiment, the energy conversion is performed by running the current through a regulating circuit and a storage capacitor, well known to those skilled in the art.

In operation (6), energy is delivered to the sensor in the form that the sensor requires for use in its internal processes. In this embodiment, the energy is in the form of electrical energy supplied by local wires.

Four components required for accomplishing this process are depicted in FIG. 10:
1. A fan assembly (1) as an energy input device, comprising:
   fan motor (1a);
   shaft and Rotating Blades (1b); and
   fan Housing (1c).
2. Air (2) as the medium being sensed.
3. Ductwork (3) as the container of the medium.
4. The Siphoning Sensor Assembly (4) consisting of the following components
   duct-mounted Energy Conversion Device (4a);
   capacity and Regulating Device (4b); and
   wireless Temperature Sensing Device (4c).

The fan assembly (1) consists of a fan motor (1a), shaft/rotating blades (1b), and a housing (1c). Power input into the motor causes the blades to rotate in the housing, which in turn causes the air to move through the fan. The static pressure of the air at the outlet of the fan has been increased in this process. The construction and design of fans is well known to those skilled in the art.

Air (2), the medium, moves through the fan and ductwork, always at a slightly different static pressure. Ductwork (3) is a constraining mechanism consisting usually of a rigid sheet metal designed to control the direction of the airflow. It is well known to those skilled in the art.

The siphoning sensor (4) is located at the desired point of temperature measurement. In some embodiments, siphoning sensor (4) includes three main components: energy conversion device (4a), capacity and regulating device (4b), and wireless sensor (4c).

The energy conversion device (4a) is depicted in FIG. 11. In the illustrative embodiment, energy conversion device (4a) includes pickup tube (4a-1), which penetrates through the duct so that it can extract, or siphon, some energy out of the air stream. The material for pickup tube (4a-1) and the housing must be capable of withstanding the duct pressure design, as well as the other design conditions of the duct such as temperature, humidity level, etc.

In some embodiments, this device siphons energy from the air stream by removing a small volume of air at a high static pressure (4a-2) and allowing it to expand through a nozzle (4a-3) and slow to a lower pressure air (4a-5) against a turbine fan (4a-4). This causes the fan to spin, subsequently causing the generating device (4a-6) to spin and generate a voltage/current source in power supply wires (4a-7). The design of the nozzle, vent port, fan, and generating device would be chosen to create a voltage and current source consistent with the needs of the temperature sensor, in known fashion.

The manufacture and application of nozzles, vent ports, turbine fans, and generating devices of this type are well known to those skilled in the art. It will be understood that the shape and dimensions of the nozzle and turbine fan can vary (e.g., propeller-type fan, squirrel cage, etc.). That is, any design that is capable of venting the air from the duct to achieve the requisite rotational speed of the generating device to satisfy the power requirement of the specific sensor can suitably be used.

FIG. 12 depicts an illustrative embodiment of capacity and regulating device (4b). This device includes devices and circuits that regulate the flow of voltage and current to a set parameter, which in this case is the exact requirements of the sensor being powered.

Unconditioned energy (4b-1) from energy conversion device (4a) enters capacity and regulating device (4b) and is directed to the regulating and stabilizing circuit (4b-2), which limits fluctuations in the energy. "Clean" energy is supplied to both charging circuit (4b-3) and capacity switching device (4b-4). The charging circuit fills storage capacity device (4b-5) when excess energy is present from the regulating circuit (4b-2). The capacity switching device (4b-4) determines if there is sufficient power coming from the regulating circuit (4b-2) to meet the output requirements. If not, it augments the output by using energy from the storage device (4b-5) to maintain its set-point. Conditioned energy (4b-6) at X volts and Y amps is provided at an output from capacity and regulating device (4b).

The manufacture and design of this combination of devices is well known to those skilled in the art. Once again, voltages, stabilizing rates, capacity requirements, etc., can all vary as long as they are sized to assure that the goal of providing conditioned energy at the required voltage, current, and tolerances is achieved.

FIG. 13 depicts wireless sensing device (4c). The wireless sensing device includes a temperature-sensing element (4c-1). The temperature-sensing element penetrates through the ductwork so that it can measure the temperature of the air in the duct. The sensor also contains sensor electronics (4c-2) for performing various functions (e.g., converting the native measured signal—temperature—into a transmittable signal (RF), scaling the signal, processing calculations, etc.), and antenna (4c-3) for sending the transmittable signal to a receiving device.

The sensor electronics require X volts and Y amps of power to operate. The power is delivered to the sensor electronics over power-supply wires (4c-4). The manufacture and design of this device is well known to those skilled in the art. The materials and temperature/electrical characteristics utilized to create this device can all vary as long as the end result of a sensed temperature being transmitted is accomplished.

In some embodiments, sensing element (4c-1) does not penetrate the duct, but is rather located in the vented air stream. This reduces installation requirements.

Comparison of the Operation of the First Illustrative Embodiment of the Invention with the Prior Art

EXAMPLE 1

Sensing Device

This example compares the operation of a wireless temperature sensor located in an air duct, as implemented in the prior art, with the operation of a wireless temperature sensor in accordance with the illustrative embodiment of the present invention.

FIG. 14a depicts a typical temperature sensor application in the prior art. It is assumed that 3000 Watts of energy is input into fan assembly (1). A portion of this energy is transferred to the air (2) in the duct—it increases the kinetic and potential energy of the air by increasing its pressure and velocity. This causes the air in the duct to move toward the discharge (5). In our example, 3000 watts is just enough power to make 10,000 Cubic Feet per Minute (CFM) of air move from the intake (6) to the discharge (5).

The conventional sensor assembly (4) has a temperature element (4c-1) which protrudes into the air stream and measures the temperature of the air in its native measuring characteristic. It is assumed that temperature element (4c-1) is a thermistor and its native characteristic is a slightly varying resistance that is proportional to the temperature sensed.

Sensor electronics (4c-2) converts the resistance signal into a more transmittable, digitized, RF signal. It is assumed that the sensor electronics use 1 Watt of electricity at X volts and Y amps, which is supplied from internal battery (4a). The resultant RF signal is transmitted to a remote receiver through antenna (4c-3).

This sensor application is costly to maintain because the battery will need to be changed often. Increasing the size of the battery can increase the length of time between servicing, but it will also disadvantageously increase the sensor cost, size, and weight.

Figure 14B:
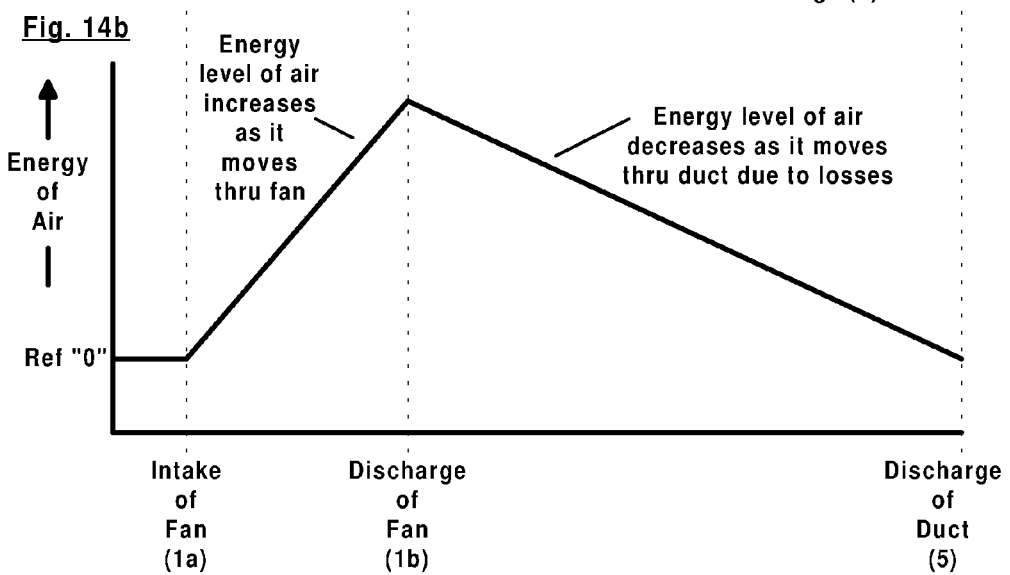

FIG. 14b depicts a chart of the kinetic and potential energy in the air for the application shown in FIG. 14a. Assume that the air is at reference zero energy at intake of the fan. It can be seen that energy is added to the air as it travels through the fan, low at the intake of the fan (1a), and high at the discharge of the fan (1b). Then, as the air moves along the duct, the level drops until it reaches its original level (reference zero) at the discharge of the duct (5).

FIGS. 15a and 15b shows a similar sensor application in accordance with the illustrative embodiment of the present invention. In this example, 3002 Watts of electricity is input into Fan Assembly (1), which moves air through the duct. This is slightly more power (i.e., 2 watts) than is required to move the 10,000 CFM of air from the intake (6) to the discharge (5).

The siphoning sensor assembly (4) has a temperature element (4c-1) that protrudes into the air stream and measures the temperature of the air in its native measuring characteristic, resistance. Sensor electronics (4c-2) convert the resistance signal into a more transmittable, digitized, RF signal, which is transmitted to a remote receiver through antenna (4c-3). An embodiment of wireless sensor (4c) is shown in detail in FIG. 13.

The sensor electronics use 1 Watt of electricity at X volts and Y amps. In this case, however, the electronics are powered from energy conversion device (4a) and capacity/regulation device (4b) rather than a battery.

The energy conversion device removes 2 watts of energy from the air stream and converts it into 1.5 watts of electrical energy. This 1.5 watts is fed into the capacity and regulation device (4b) which outputs 1 watt at X volts and Y amps to power the sensor electronics. Small amounts of energy are lost in the conversion and regulation process.

FIG. 11 depicts an embodiment of energy conversion device (4a). The pickup tube (4a-1) removes some high pressure air (4a-2) from the duct and directs it through nozzle (4a-3) to expand and impinge upon turbine fan (4a-4) before being vented as low pressure air (4a-5) and leaving the device as waste air. This causes the turbine fan (4a-4) to spin, driving generating device (4a-6) through a shafted connection. The generating device (4a-6) supplies 1.5 watts of power (example) on power supply wires (4a-7). This power is in an unconditioned form, from A to B volts and C to D amps for this example.

This unconditioned power travels through the capacity and regulation device and emerges as 1 watt (example) of conditioned power at X volts and Y amps, ready to power the sensor electronics. The details of an embodiment of capacity and regulation device (4b) are shown in FIG. 12.

It will be understood that energy conversion device (4a) depicted in FIG. 11 is but one example of an energy conversion device. Many others implementations of an energy conversion device, some of which are described the alternative embodiments section of this specification, are within the anticipated scope of this invention. It will be appreciated that all wattage figures are provided for pedagogical reasons only, and that actual system and sensor requirements will vary, as will the efficiencies of the energy conversion device and the capacity and regulation device.

FIG. 15b shows a representation chart of the energy in the air. As before, energy is added to the air as it travels through the fan from point 1a to point 1b. This is a direct result of the 3002 watts added. Then, as the air moves along the duct, the level drops due to losses in the duct. When the air reaches the sensor (4a), a small portion of energy is removed to power the energy conversion device, 2 watts in our example. This is reflected in the energy drop at point 4a on the graph. As the air continues toward the discharge (5), its energy level continues to decline until it reaches its original level at the discharge of the duct.

The additional 2 watts of energy added to the air at the fan (1) were removed by the sensor (4), making the air the distribution network for the power supply to the sensor. Since the additional 2 watts were removed before the air left the duct at the discharge, the same 10,000 CFM of air will be delivered to the discharge.

Additional energy was added to the medium (air) to overcome the draw presented by the sensor. In practice, this might not be required if the power requirements of the remote device are very small compared to the total energy contained in the medium or if variations in the energy of the media are not critical.

Furthermore, many mediums and/or systems already contain a significant amount of energy. This energy is either contained within the chemical composition of the medium or present because of some unique physical attribute of the system/material. For instance, some water distribution systems rely on gravity to move the water. Gravity has created a potential energy within the system that can be used as a power source.

The first illustrative embodiment describes the use of this process to:
 a. Input additional energy into an air system in one location using a fan.
 b. Transport that energy to a location near a wireless sensor in the form of static pressure in the air.
 c. Remove that energy and convert it to electricity using a particular energy conversion device.
 d. Regulate the flow of the electricity.
 e. Deliver the electricity to the wireless sensor.

It is to be understood that in some embodiments, it will not be necessary to input additional energy, or to convert it from a first form to a second form, or to regulate its flow, or any combinations thereof.

Additional Illustrative Embodiments in Accordance with the Present Invention

It will be understood that there are numerous other embodiments of the present invention, since the process of inputting energy into a medium in one location, transporting it, and withdrawing it at another location can be applied to many different types of systems. The variations or differences between the embodiments primarily arise in:
 The method of inputting the energy into the medium.
 The medium being used to transport the energy.
 The method and energy conversion device being used to extract and convert the energy.
 The method of conditioning the energy such that it is ready for steady supply to the device.
 The type of device being powered, such as a sensing device, controlling device, alarming device, etc.

Regardless of implementation details, in each embodiment in accordance with the present method:
 energy is transmitted through the medium; and
 energy is removed from the system and delivered to a device that is performing an action associated with the medium (e.g., sensing, controlling, alarming, etc.) This advantageously occurs at a location that is very near to the device.

In some embodiments in accordance with the present method, the following additional operations or tasks are conducted:
 energy is input into a system (typically remote from the device that it's intended for);
 energy is converted into a form of energy that is usable by the device; and
 energy is regulated in some fashion to provide a steady supply of power to the device.

Alternative Types of Energy Added to the Medium

In the first illustrative embodiment, a pump was used to add energy to the system by increasing the static pressure of the air in the system. But many other types of energy can be added to the medium including, without limitation:

Kinetic Energy
Potential Energy
Mass Energy
Heat Energy
Wave Energy
Nuclear Energy
Photo-electric Energy
Magnetic energy
Temperature
Sound Power
Gravitational energy
Centrifugal energy
Velocity
Chemical energy The type of energy that is selected for input must be compatible with the medium and the method of energy removal. For example, when adding magnetic energy, the medium must be one that will conduct and transport magnetic energy. Additionally, an energy removal system suitable for removing magnetic energy must be used. There are various methods for adding energy to a system and they are well known to those skilled in the art.

Alternative Mediums for Transporting the Energy

Many alternative mediums can be used to transport energy. To the extent that a medium other than air (as in the first illustrative embodiment) is used, the method of input of energy and the method of removing energy might need to be suitably adjusted.

For example, when using a light wave to transmit energy to the sensor, energy can be added by increasing the power to one band using a laser. The added energy can be filtered out at the siphoning point using, for example, filters and a photocell.

The following are a few non-limiting examples of other mediums that are suitable for transporting energy: gas, liquid, solid, multiphase (liquid/gas; solid/liquid; solid/gas; etc.) and an energy wave (e.g., sound, electromagnetic waves, etc.)

Alternative Methods for Energy Removal

There are various well-known methods and means for removing energy from a medium. Any such method or means can be suitably used in conjunction with the illustrative embodiments of the present invention. The process or means for energy removal must be compatible with the medium and the method of energy input.

A few, non-limiting examples of ways in which energy can be extracted from the medium and converted to a useful form are provided below.

Pressure Bleed Generation
 In this case, a small portion of the medium is "bled off" from the source. As it bleeds, it moves from a point of high energy (either kinetic or static) to a position of lower energy, and energy is liberated. This is converted to the energy form required by the sensor, controller or alarm. One example was demonstrated in the first illustrative embodiment (FIG. 11) and another example is shown in FIG. 16.
 FIG. 16 is an example in which the medium cannot be bled directly to the atmosphere for any reason. In this case, the medium is bled to a position of lower energy within the system itself. The process and operation is the same as that in the first illustrative embodiment, except that the medium is returned to the system.

In FIG. 16, the medium is at a high pressure (2) in pipe or duct (1). A High pressure Pickup tube (5) allows some of the medium to flow through a nozzle (6) where it expands and impinges on the blades of a turbine fan (7). The medium then travels through the Low Pressure Relief Tube (9) back into the system at a point of lower pressure (4). This flow causes the turbine fan (7) to rotate and the generating device and shaft (8) to spin creating an electrical power source on supply wires (11). The design of the nozzle, tubes, fan, and generating device are all specific to the medium and power required and are all well known to those skilled in the art.

In some variations, the fan and generating device that are shown in the example could be in the stream of the fluid. FIG. 17 depicts an alternative embodiment of a fan assembly, including fan (3) and generating device (6).

Inline Generation

In some embodiments, the bleed-type component for energy removal is replaced by an inline generation device. When using such a device, none of the medium leaves the system. In this case, a generating device is inserted into the flow stream of the medium and converts the medium's kinetic energy into an energy form required by the sensor, controller, or alarm. This is the same as in the first illustrative embodiment, except that the medium is not vented. Four examples are shown in FIGS. 17, 18, 19, and 20.

In FIG. 17, a system duct or pipe (1) contains a medium (2) which is moving in the direction of flow (8). The flow of the liquid impinging upon the fan (3) causes it to rotate the shaft (4) and the generating device (6) causing it to generate electrical power at the power supply wires (7).

In FIG. 18, the medium (2) is flowing in one direction (3) inside pipe or duct (1). A pickup tube (4) penetrates the pipe or duct (1) and is faced into the direction of flow so it is exposed to the total pressure of the medium, equal to both the Velocity Pressure and the Static pressure (Vp+Sp) (5). A relief tube (12) penetrates at a right angle to the direction of flow, causing it to only be exposed to the static pressure. Additionally, the relief tube protrudes slightly, causing flow to travel around it and cause a slight venturi effect. The resultant pressure on the end of the relief tube is Sp-X (6) [Static pressure minus "X" caused by the venturi action]. Since the pressure at the pickup tube is greater than that at the relief tube, Medium Flow (13) is induced in the pickup tube. This flow causes fan (7) to rotate shaft (8) and the generating device (10), generating electrical power on power supply wires (11).

FIG. 19 is exactly the same as FIG. 18, however an orifice plate (14) has been placed into the pipe or duct (1) to cause a greater pressure drop (15) between points "a" and "b". This orifice can be a new device, can be a component already in the system which creates a pressure drop, such as a valve, or the generating device, accessories, and pickup/relief tubes can be built into the device with the orifice.

In all of these examples, the fan, shaft, and generating device are held directly in the medium stream by a bracket. A similar effect can be obtained by using the arrangement shown in FIG. 16 or wherein equipment protrudes partly into the pipe or duct, as shown in FIG. 20.

In FIG. 20, as the medium (2) flows in one direction (3), it turns the fan (4), shaft (5) and generating device (6) which creates electrical power at the power supply wires (7).

The design and manufacture of fans, linkages, orifice plates, mounting brackets, and devices which convert a rotating motion into electrical energy are all well known to those skilled in the art.

Temperature Difference Generation

In this case, the temperature difference between the medium and the surrounding area can be used to extract power. All other aspects of the process are similar to the first illustrative embodiment, except that the additional energy is input into the system in the form of heat (at a convenient location), moved to the point of extraction, then that heat is siphoned off. Some examples are shown in FIG. 21 and FIG. 22.

In FIG. 21, a heat-pipe generating device (heat pipe fitted with a generating device) is used to remove energy from the system. A detailed view of the heat pipe generator is shown inserted into a pipe or duct for illustrative purposes. Pipe or duct (1) contains a warm fluid (2) traveling through it, passing over one portion of the heat pipe generator assembly (4). The other side of the heat pipe generator is located outside of the pipe in cooler air (3). The penetration of the pipe or duct is well known to those skilled in the art.

The heat pipe generator consists of two chambers [high pressure area (12) and low pressure area (13)] surrounded by a wicking material (6) saturated with refrigerant. The two chambers are separated by a venturi tube (8) which has a generating device (9) placed in the venturi. Evaporator fins (5) and condenser fins (16) surround the high and low-pressure areas respectively. The refrigerant is chosen such that it will evaporate at the temperature expected to be encountered in the pipe or duct (1) and then condense in the expected ambient condition (3). All materials must be designed to accommodate the pressures and temperatures both inside the heat pipe and outside.

As the warm fluid travels over the evaporator fins (5) on the heat pipe generator, heat is absorbed (11) and the refrigerant in the wicking material (6) begins to evaporate or boil (7). This increases the pressure in the High Pressure Area (12), causing the refrigerant to flow through the venturi tube (8) and across the generating device (9) into the low-pressure area (13). This flow causes the generating device to send power out of electric lines (15).

Once in the low-pressure area (13), the refrigerant loses heat (14) through the condenser fins (16) and condenses back into the wicking material (10). Once in the wicking material, it is drawn back into the evaporator section through a wicking action (17) to repeat the process.

The design and manufacture of a heat tube (or similar device such as a thermosyphon) is well known by those skilled in the art. Of course, the typical use for such devices is to remove heat. In this application, the device, along with some modifications such as the addition of a generating device and venturi tube, is used to convert this movement of heat into an electric power source.

It should be noted that the fan and generating device are shown in the example in the stream of the fluid. In some other embodiments, a turbine type fan and nozzle as shown in FIG. 16 are used. The design and manufacture of fans, generating devices, mounting brackets, etc. are all well known to those skilled in the art.

In FIG. 22, the thermocouple effect of multiple junctions at different reference temperatures can be used to extract the energy from the system. A medium (2) at a different temperature (either higher or lower) than the surroundings is flowing in a pipe or duct (1). There is a temperature difference (6) between junction "A" (4) and Junction "B" (5) which generates a voltage which can be transmitted over power wires (7).

The design and manufacture of a thermocouple junction (or similar device) is well known by those skilled in the art. Many junctions in series or parallel can be combined to create greater amounts of current or voltage.

Pressure Changing Generation

In this case, regular or irregular changes in pressure in a system are harnessed and converted to power. All other aspects of the process are similar to the first illustrative embodiment. A few examples are shown in FIG. 23 and FIG. 25, but there are many others.

In FIG. 23, medium (1) has a pressure which varies between X and Y psi at point (A). When it is at "X", this pressure is great enough to overcome the pressure of spring (9) on piston or diaphragm (8) and causes the piston to rise in the container (16). Rack (10) is driven up because it is attached to the piston and spins ratcheting pinion (11) which is connected to the generating device (12) via transmission gears (15), causing the generating device (12) and flywheel (13) to spin and electricity to be generated on power supply wires (14). When the generating device begins spinning counter clockwise, the flywheel will keep it going even when the rack and ratcheting pinion stop or change direction.

Note that the ratcheting pinion (11) serves two purposes: to drive the attached shaft clockwise and enable the shaft to continue spinning in the clockwise direction once the pinion stops or reverses direction.

Referring now to FIG. 24, rack (1) moves vertically according to rack motion (6) causing pinion gear (2) to rotate, alternating between clockwise and counterclockwise (7). When the pinion gear is rotating clockwise, springs (5) push movable stops (4) into position to engage the teeth of shaft gear (3), transmitting the rotation. When the pinion gear rotates counterclockwise, the movable stops are allowed to leave contact with the shaft gear due to deflection of the springs.

Referring back to FIG. 23, when the pressure at point (A) drops to Y psi which is not great enough to overcome the force of spring (9), the piston drops. The rack moves downward and the ratcheting pinion rotates counter clockwise, having no effect on the generating device.

When the pressure at point (A) rises back up to X psi, the cycle repeats.

In this example, the power output of the energy conversion device is usually not constant, so a capacity and regulation device is needed. In some other applications, there is constant power output, thereby eliminating the need for the capacity and regulation device. In a further alternative embodiment, power from both the up and down strokes of the rack is translated into energy, either through multiple generation devices or geared transmission assemblies.

The sizing, design, and mounting of pistons, springs, gears, shafts, flywheels, etc., noted in this specification is dependent upon the particular sensor, controller, or alarm being used, and is within the capabilities of those skilled in the art.

FIG. 25 shows a variation on this energy conversion device. Here, medium (2), which experiences regular pressure changes, is in pipe or duct (1). Two tubes, one for intake and one for exhaust, connect the pipe or duct (1) to a storage vessel (11) with a diaphragm (12 & 13). The material and design of the tubes must be able to withstand the maximum pressures that the medium will experience. Mounted within each tube is a generating device with a shaft and fan (7 & 8). Also fitted in each tube is a check valve (5 & 6). Check valve (5) allows flow only from the pipe or duct (1) to the storage vessel (11). Check valve (6) only allows flow from the storage vessel (11) to the pipe or duct (1).

To illustrate the operation, it is assumed that the pressure varies between 10 psi (low) and 60 psi (high) in the pipe or duct (1). When the pressure is at 10 psi, the diaphragm is relaxed (13). When the pressure of the medium (2) rises to 60 psi, some of the medium flows through intake tube (3) and into the storage vessel (11) causing the diaphragm to expand to an extended position (12). It does not flow through the exhaust tube because the check valve (6) does not let it flow in that direction. As the medium flows past the generating device with fan and shaft (7), it spins and generates electrical power on power supply wires (9). This continues until the storage vessel (11) is full of medium.

When the pressure of the medium returns to 10 psi (low), the extended diaphragm (12) forces the medium back to the pipe or duct (1) via the exhaust tube since check valve (5) will not allow it to travel in that direction in intake tube (3). As the medium flows past the generating device with fan and shaft (8), it spins and generates electrical power on power supply wires (10). This continues until the storage vessel (11) is empty of medium. Subsequent changes in pressure will repeat the cycle.

It should be noted that many alternatives exist in the placement of the generating devices. The same effect can be accomplished by having only one generating device connected to two fans with a linkage, one located in each of the tubes. Additionally, the device could be made with one tube that accomplishes both intake and exhaust, provided that the generating fans were properly ratcheted to prevent it from spinning in opposite directions. Fans on the generating devices can also be turbine-impingement fans as shown in FIG. 16, Turbine fan (7).

The design and manufacture of storage vessels, diaphragms, check valves, piping, fans, linkages, and devices which convert a rotational motion into electrical energy are all well known to those skilled in the art.

Optical Bleed Generation

In this case, a small amount of light is bled off from a fiber optic source and is directed toward a photovoltaic type device which generates electricity. All other aspects of the process are similar to the first illustrative embodiment, except that:

a) The additional energy is input into the system in the form of light energy.
b) The medium is light rather than a fluid or gas.
c) The light energy is removed using a filter and focusing device.
d) The energy conversion device converts the light energy to the power required by the sensor, controller, or alarm.

An example is shown in FIG. 26. The medium (6), light in this example, is traveling in a fiber optic cable (1). At a convenient point for energy insertion, a unique frequency (7) is introduced into the fiber optic cable (1) through the use of a fiber splice (2). The unique frequency travels along with the medium (6) until the point of removal, where it is removed via a fiber splice (3). A filter/focusing device (5) assures only this frequency is removed. The unique frequency is focused upon a tuned photovoltaic cell (4) which generates electrical energy on power supply wires (8).

Alternatively, the energy removal can simply remove all frequencies at the point of removal, and a general degradation of the medium would be observed. In this case, power input would not be in the form of adding a unique frequency wave form (7), but rather to amplify the entire medium signal at some location where inputting energy is convenient.

The design and manufacture of fiber optic cable, splicing devices, focusing and filtering devices, and devices which convert a light source into electrical energy are all well known to those skilled in the art.

Level Changing Generation

In this case, the changing level in a tank causes a float to rise and fall over time. The vertical motions are changed to rotation through a series of levers and gears, which in turn power a generating device. All other aspects of the process are similar to the first illustrative embodiment. An example is shown in FIG. 27.

Medium (1) begins at level "A" (9) in storage tank (2). As the medium level increases to level "B" (8), the float and lever (3) rise which in turn, rotates float gear (4). Float gear (4) spins ratchet gear (5) which rotates the generating device and shaft (6) causing power to be generated on power supply wires (7). Ratchet gear (5) is designed to only transmit rotation to the generating device shaft in one direction, and is similar to that shown in FIG. 24.

The drawings shown are schematic in nature. Additionally, a shuttle type generation device could also be utilized here. The design and manufacture of floats, linkages, ratcheting gears, and devices which convert a linear or rotating motion into electrical energy are all well known to those skilled in the art.

Chemical Bleed Generation

In this case, a small amount of the medium is bled off and it is chemically converted to an energy supply. This is ideal for mediums which have a high energy content such as natural gas, propane, radioactive materials, etc. All other aspects of the process are similar to the first illustrative embodiment, except that:
a) The additional energy is input into the system in the form of additional chemical.
b) The chemical energy is siphoned off by removing some of the chemical.
c) The energy conversion device consumes some of the chemical to create the power required by the sensor, controller, or alarming device.

One example, shown in FIG. 28, is where a small amount of natural gas is bled off from a natural gas pipeline and then fed into a fuel cell that converts this to electricity and waste products. The medium (2), natural gas in this example, is removed through intake tube (3) and delivered to fuel cell (4). In a well-known chemical conversion, the medium is converted to electricity and waste products. The waste products exit the fuel cell via vent tube (5) and the electricity is made available at the power supply wires (6).

The design and manufacture of fuel cells, pipe penetrations, and the associated mediums they can be used with to create electrical energy are all well known to those skilled in the art.

Non-Bleeding Chemical Reactive Generation

This example is when the medium itself can be utilized to react slightly with another material to create a change in energy state. All other aspects of the process are similar to the first illustrative embodiment, except that:
a) The additional energy is input into the system in the form of chemical energy.
b) The chemical energy is siphoned off using a reaction.
d) The energy conversion device converts some medium to another form while generating the electrical energy.

An example is shown in FIG. 29 and FIG. 30. In FIG. 29, a medium (2) is flowing in a pipe or duct (1). An Anode (4) is in contact with the medium (2). The anode material is chosen such that oxidation will occur when it is exposed to the medium (2). A cathode (5) is located in contact with another medium, the chemical reactor medium (3). The cathode material is chosen such that reduction will occur when in contact with the chemical reactor medium (3).

The combination of the oxidation on the anode and reduction on the cathode frees electrons and creates an electromotive force creating an electrical power supply through the load (6). This embodiment utilizes some of the chemical energy in the medium to create the electrical energy. This chemical energy would have to be input into the system in another location to assure that the medium (2) remains useful for its primary purpose, with minimal degradation from the oxidation at the anode.

FIG. 30 shows a similar embodiment. In this case, the medium (3) is flowing in a pipe or duct (1) in one area of the system and medium (4) is flowing in pipe or duct (2). An example might be supply and return cooling water lines. At a convenient point in the supply pipe, granular anodes (5) are placed into the solution. At a convenient point in the return pipe, granular cathodes (7) are inserted.

The medium (3) in the supply pipe (1) oxidizes the granular anodes (5) and electrons (6) are released. They travel into the receptor (9) and through the load to the transmitter (10). The electrons are then absorbed by the reduction process happening in the granular cathodes (7). This causes current flow in the load. The energy for the system is inputted in one location in the form of the granular anodes and cathodes, then removed in the form of electrical energy at the point of both the transmitter and receptor.

The design and manufacture of granular anodes and cathodes, solid anodes and cathodes, and the oxidation-reduction process which convert a chemical reaction into electrical energy are all well known to those skilled in the art.

Inline Wave Generation

In this case, the inconsistencies in the flow of a medium is converted to a linear motion which is then converted to the energy form required by the sensor, controller or alarm. All other aspects of the process are similar to the first illustrative embodiment. An example is shown in FIG. 31.

A medium (2) is flowing (3) in a pipe or duct (1). A paddle inserted perpendicularly to the direction of flow is pushed away from the vertical angle due to the flow and rotates around pivot (5). A spring (6) causes the paddle to stop moving when equilibrium is reached. Upon a decrease in flow rate, the spring will exert more force than the paddle and the paddle will rotate clockwise until equilibrium is once again reached. When flow increases, the paddle will move counterclockwise until equilibrium is reached with the spring. In a medium which has inconsistencies in its flow rate, the paddle will oscillate regularly.

The end of the paddle (4) outside the flow stream is connected to a generating device and linkage (7) which converts to movement of the paddle into electrical energy supplied on power supply lines (8).

The design and manufacture of paddles, linkages, and devices which convert a linear motion into electrical energy are all well known to those skilled in the art.

Cavitation Induced Generation

In this case, cavitation (either purposefully created or a normal byproduct of the medium) in the vessel containing the medium creates changes in the pressure which can be used to generate small amounts of power. This is a variation on the pressure differential generation noted earlier. All other aspects of the process are similar to the first illustrative embodiment.

An example is shown in FIG. 32a/b. Two areas which contain medium [area (1) and area (2)] are connected by a cylinder (8). The pressure in area 1 and 2 varies. In this example, the pressure varies according to the Pressure-time graph in FIG. 32b, such that at $t_1$, the pressure in area 2 is greater than area 1 and at $t_2$, the pressure in area 1 is greater than that of area 2.

At $t_1$, the difference in pressure between area (1) and area (2) causes the shuttle to move towards area (1) in the cylinder. It does not enter area (1) because of shuttle stops (5). As time progresses to $t_2$, area (1) has a greater pressure than area (2), forcing the shuttle back towards area (2). Once again, the shuttle doesn't enter area (2) because of shuttle stops (6). The continuous variations in pressure difference between the two areas cause the shuttle to move back and forth between shuttle stops (5) and shuttle stops (6). As the shuttle passes through the cylinder, it induces a current in power supply wires (7).

Figure 32C:
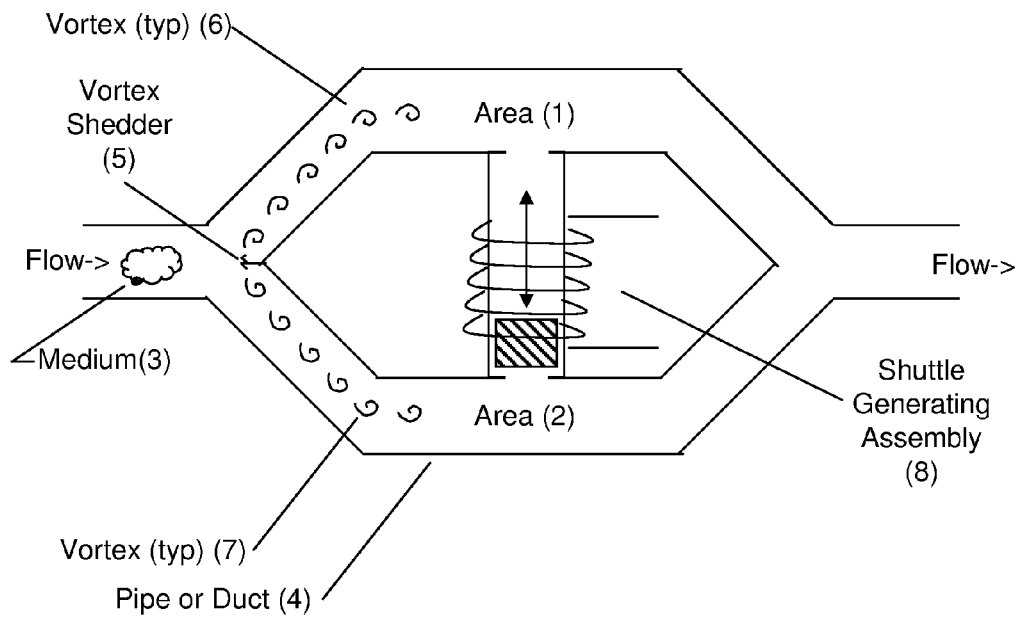

An example is shown in FIG. 32c. A set of pipes (4) generate cavitation that changes the pressure across the pipes. The medium (3) flows in the pipe (4) until it reaches the vortex shedder (5). The shedder is designed to create vortex patterns in the fluid. The presence of vortex shedding, together with vortex wakes, gives rise to increased unsteadiness, and pressure fluctuation between area (1) and (2). The design of vortex shedders is well known to those skilled in the art.

The pressure fluctuations force a magnetic shuttle back and forth to create a power supply from the shuttle generating assembly (8). Shuttle generating assemblies and vortex generators are well known to those skilled in the art.

Figure 32D:
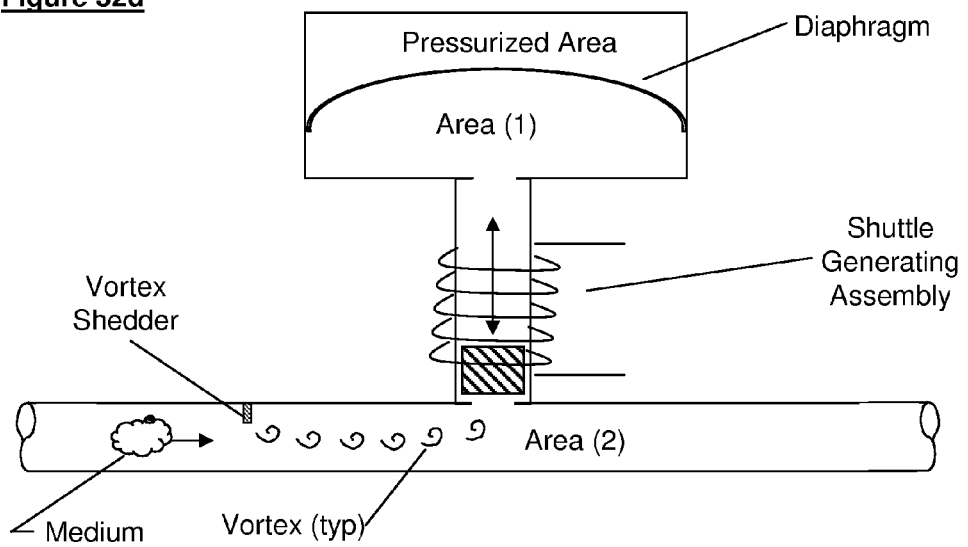

A similar alternative would have one of the areas at a fixed pressure and only shed vortexes into the other area as shown in FIG. 32d.

Gaussian or Static Generation

Energy is harvested from the skin of the vessel that is transporting the medium. All other aspects of the process are similar to the first illustrative embodiment. An example is shown in FIG. 33. A medium (2) is flowing in a pipe or duct (1). As static is generated on the shell of the pipe or duct (4), it is harvested on the power supply wires (5).

Sound/Wave Powered Generation

In this case, energy is generated from the motion created by the sound/wave of the medium being monitored. These waves can be audible or inaudible and either a byproduct of the medium or the actual medium (ie: the measurement of sound intensity). All other aspects of the process are similar to the first illustrative embodiment, except that:
a) The additional energy is input into the medium in the form of wave energy.
b) The medium is not confined in a pipe or duct and does not flow.
c) The energy conversion device converts the wave energy to the power required by the sensor, controller, or alarm.

In the example in FIG. 34, medium (1) is being measured by a temperature sensor (7) mounted on wall (8). It is assumed that the wall (8) is the wall of a large open office space in which we desire to measure the temperature of the air [the medium (1)].

A transmitting device (2) is located on wall (9) such that the waves being broadcast through the medium can be received at the receiving cone (4). The cone focus' the waves upon the diaphragm (3) which oscillates the shuttle generating assembly (5) through the linkage. Power is subsequently generated on power supply wires (6) and passed to the sensor. Many sensors can be powered from the same transmitting source, or multiple transmitting sources.

In effect, we are adding a form of energy to the medium being measured (the air) and removing it where we need it (the sensor) without using an additional distribution system. As in the first illustrative embodiment, there is an energy cost associated with this; however, it is outweighed by the reduction in first cost and ongoing maintenance costs.

Gravitational or Centrifugal Generation

Generating energy from changes or inconsistencies in the centrifugal speed or various gravitational fields of the medium being measured. All other aspects of the process are similar to the first illustrative embodiment, except that:
a) The additional energy is input into the system in the form of rotational speed.
b) The medium is a solid rather than a fluid or gas.
c) The rotational energy is siphoned off using a shuttle generating device.

For example, FIG. 35 shows a platter (2) rotating (3) on a shaft (1). A shuttle housing (5) is mounted on the platter (2) and houses a magnetic shuttle (4) being acted upon radially inward by a spring (7). As the RPM of the platter increases, the shuttle (4) will be forced against the spring and move radially outward until the centrifugal forces are equal to the spring forces. Decreases in RPM change the centrifugal forces on the shuttle, causing it to move radially inward toward the center of the platter (2). Increases in the RPM cause the shuttle to move radially outward. Inconsistencies in the speed of the platter will cause the shuttle (4) to oscillate. This oscillation through the wire coil (6) generates power at the power supply wires (8).

There are many other methods for extracting energy, which are well known to those skilled in the art, that can suitably be used in conjunction with the illustrative embodiments of the present invention.

Alternative Methods of Conditioning the Energy

Fluctuations in the power transmission rate can be smoothed out with various types of capacity storage and regulating device, if required. See FIG. 12. An alternative is to provide a conversion method that is stable enough so as not to require any conditioning.

A brief, non-limiting listing of typical methods for smoothing fluctuations includes:
  a. Using a capacitive device to store and discharge.
  b. Using a restrictive device to limit flow.
  c. Using a bypass type device to divert excess capacity to another location.
  d. Using an inductive governor to limit changes.
  e. Using a flywheel device (mechanical, electrical, thermal, etc.) to steady fluctuations.

The conditioning method is greatly dependent upon the energy type being supplied to the sensor, controller, or alarm device. The various methods possible to condition the energy are well known to those skilled in the art.

Devices that can be Powered by the Energy

The first illustrative embodiment was directed to the powering of a wireless sensor. Many other devices can be powered in accordance with the present teachings. Examples include, without limitation, controllers (e.g., dampers, actuators, valves, etc.) and alarms (e.g., high-limit signals, bells, buzzers, etc.).

The application of the present invention to these other devices is the same as for the first illustrative embodiment: energy is added to a medium at one location, the energy is then extracted, converted (as required), and conditioned (as required), and is then delivered to the device.

Additional Alternative Examples

Since there are so many potential combinations of energy for input, medium for transferring the energy, methods for extracting the energy, and devices that can be powered by the energy, a few additional examples are provided below.

EXAMPLE 2

Controller

This example compares the operation of an automatic flushing device on a urinal, as implemented in the prior art, with the operation of an automatic flushing device in accordance with the illustrative embodiment of the present invention.

FIG. 36 depicts a conventional application of an automatic flush valve controlling the water flow to a urinal. A water supply (1) is connected to a flush valve (2) and a urinal (3) via plumbing pipe. Whenever the flush valve opens, water will flow to the urinal.

A motion detector (4) mounted above the urinal is powered by a battery (5). It senses a person approaching and leaving the urinal. When the person leaves the urinal, the motion detector provides power from the battery to the flush valve for a predetermined time. Consequently, the valve opens and the urinal "flushes".

The battery is powering both the motion detector and the flush valve, so it must be either very large or changed often. An alternative in the prior art to using a battery to power these devices is to provide 120 VAC to the motion detector as shown in FIG. 37. This eliminates the higher maintenance requirements and size issues of the battery, but increases first cost substantially.

FIG. 38 depicts an apparatus for automatic flushing in accordance with the illustrative embodiment of the present invention. As before, a water supply (1) is connected to a flush valve (2) and a urinal (3) via plumbing pipe and a motion detector (4) operates the valve. The difference is in the power supply for the motion detector and the valve.

Energy conversion device (6) removes some of the energy in the water supply system and converts it to electricity. The electricity flows into the motion sensor via capacity and regulation device (5), which designed to both store and smooth fluctuations in the output of energy conversion device (6).

FIG. 23 shows an example of an energy conversion device for this application. As described earlier, a variety of methods for removing energy from the medium can suitably be used. In this example, the energy conversion device converts potential energy fluctuations in the water (in the form of pressure) to electricity.

In FIG. 23, the water supply is the medium (1) and it creates a pressure of 60 psi at point (A) when the flush valve is closed. This pressure is great enough to overcome the pressure of spring (9) on piston (8) and causes the piston to rise. Rack (10) is driven up because it is attached to the piston and spins ratcheting pinion (11), which is connected to the generating device (12) via transmission gears (15), causing the generating device (12) and flywheel (13) to spin and electricity to be generated on power supply wires (14). When the generating device begins spinning counter clockwise, the flywheel will keep it going even when the rack and ratcheting pinion stop or change direction.

Note that the ratcheting pinion (11) will serve two purposes: to drive the attached shaft clockwise and enable the shaft to continue spinning in the clockwise direction once the pinion stops or reverses direction.

Referring now to FIG. 24, rack (1) moves vertically according to rack motion (6) causing pinion gear (2) to rotate, alternating between clockwise and counterclockwise (7). When the pinion gear is rotating clockwise, springs (5) push movable stops (4) into position to engage the teeth of shaft gear (3), transmitting the rotation. When the pinion gear rotates counterclockwise, the movable stops are allowed to leave contact with the shaft gear due to deflection of the springs.

Referring back to FIG. 23, when the flush valve is opened, the pressure at point (A) drops to 10 psi which is not great enough to overcome the force of spring (9), so the piston drops. The rack moves downward and the ratcheting pinion rotates counter clockwise, having no effect on the generating device.

After a few seconds of open, the flush valve will close again, bringing the pressure at point (A) back up to 60 psi and starting the cycle over again.

This provides yet another example of how the present teachings are applied to create a new device (a pressure-changing generation device) and a new process to replace the power distribution system normally required for the flush valve and motion detector. Additional energy is added to the water at the pumping system, then extracted locally at the flush valve.

In this example, the power output of the energy conversion device is not constant, so, referring back to FIG. 38, a capacity and regulating device (5) is needed. This device operates as described in the first illustrative embodiment and as shown in FIG. 12.

The overall effect of applying the present invention to the automatic flush valve scenario is to:

Reduce first costs by eliminating power wiring to the device

Reduce ongoing maintenance costs by eliminating regular battery change maintenance to the device.

Increase flexibility of the device to allow it to be moved when needed without extensive re-wiring.

EXAMPLE 3

Combination Sensor and Alarm

This example pertains to the operation of a combination device that rings an alarm when the fluid temperature in a vessel exceeds a set maximum. This example compares the operation of the combination device, as implemented in the prior art, with the operation of a combination device in accordance with the illustrative embodiment of the present invention.

FIG. 39 depicts a conventional high-temperature alarm device. Fluid (1) is flowing in a pipe (2). Temperature-sensing element (3) penetrates the wall of the pipe to sense the temperature of the fluid. The element has a set of normally open contacts (4) that close when the temperature exceeds a set-point. For this example, that set-point is 180 degrees Fahrenheit.

12 Volt DC power is supplied, in this example, from a power supply transformer (5) which is located several hundred feet away from the sensing/alarming device. 110 VAC enters the power supply and is converted to 12 VDC. This voltage is carried on wires (6) to alarm bell (7). One of the wires is broken by the normally open contacts (4) in the temperature element (3), preventing a completed circuit.

When the temperature in the pipe exceeds 180 degrees F., the normally open contacts in the temperature element close, enabling current to flow to the alarm bell, which signals the high temperature condition.

The cost of the wires (6) is very great, especially if the distance is long or the voltage being transmitted falls into a category requiring a mechanical raceway by the local codes. Additionally, initial installation is time-consuming, and there are energy losses in the wire as well as the power transformer. Further, there is additional time, cost, and complication if the sensor/alarming device ever needs to be moved to another location, since the power supply wiring would also need to be extended.

FIG. 40 depicts a sensor/alarm in accordance with an illustrative embodiment of the present invention. As before, fluid (1) is flowing in a pipe (2). A temperature-sensing element (3) is penetrates the wall of the pipe to sense the temperature of the fluid. The element has a set of normally open contacts (4) that close when the temperature exceeds a set-point. Again, the set-point is 180 degrees Fahrenheit.

In accordance with the present invention, power is supplied locally rather than via long lengths of wires from a remote power supply. In this case, a "heat pipe generator" (5) is utilized in such a way that it takes a portion of the thermal energy present in the pipe (2) and converts it to electric power. In this example, this electric power is carried over wires (6) to capacity and regulation device (9), which sends the power to the alarm bell (7) via wires (8). The capacity and regulation device (9) might not be required, depending upon:

1. Generation capacity of the heat pipe generator.
2. Power requirement of the alarm bell.
3. Consistency in the heat transfer between inside the pipe and outside the pipe.

FIG. 21 depicts a detailed view of the heat pipe generator inserted into a pipe. Pipe (1) contains a warm fluid (2) traveling through the pipe, passing over one portion of the heat pipe generator assembly (4). The other side of the heat pipe generator is located outside of the pipe in cooler air (3).

As the warm fluid travels over the evaporator fins (5) on the heat pipe generator, heat is absorbed (11) and the refrigerant in the wicking material (6) begins to evaporate or boil (7). This increases the pressure in the High Pressure Area (12), causing the refrigerant to flow through the venturi tube (8) and across the generating device (9) into the low-pressure area (13). This flow causes the generating device to send power out of electric power generating lines (15).

Once in the low-pressure area (13), the refrigerant loses heat (14) through the condenser fins (16) and condenses back into the wicking material (10). Once in the wicking material, it is drawn back into the evaporator section via a wicking action (17) to repeat the process.

The manufacture of a heat tube (or similar device such as a thermosyphon) is well known. But the typical use is to move heat. In this application, the device, along with some modifications such as the addition of a generating device and venturi tube, is used to convert the movement of heat into a source of electric power.

As in Examples 1 and 2, a small amount of the energy in the medium being sensed/alarmed is withdrawn and converted into a usable form, which in this Example is electricity.

FIG. 41 shows a schematic representation of the process. Fluid (1) traveling in the pipe (2) contains energy, in this example in the form of 10,000 units of heat energy. Only 9,990 units of heat energy are required at the end of the pipe, however, an additional 10 units were added earlier in the system.

At the heat pipe generator or energy conversion device (3), ten units of heat (4) are drawn off and the remaining 9,990 units (5) continue down the pipe. These ten units of heat energy are converted to five units of waste heat energy (6) and five units of electrical energy (7). This energy is conditioned in capacity and regulation device (8) to remove any fluctuations, where three units are lost. The remaining two units of electrical energy are then used to provide clean, stabile power to the sensing (9) and alarming (10) devices whenever the sensing device measures the appropriate quantity (11).

Using the present invention in conjunction with the remote high temperature alarm scenario results in:

reduced first costs by eliminating power wiring to the device;

reduced ongoing maintenance costs by eliminating regular battery change maintenance to the device; and increased flexibility of the device by enabling it to be moved when needed without extensive re-wiring.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. A method comprising:
    adding energy to an actively-transported medium, wherein:
        the medium is not used to power a device; and
        the energy is added at a first location;
    transporting the energy via the medium to a second location;
    withdrawing the energy at the second location;
    delivering the energy to a device, wherein the device uses the energy to perform an action that is associated with the medium; and
    regulating a rate at which said energy is delivered to said device.

2. The method of claim 1 further comprising temporarily storing at least of portion of the energy that is intended for delivery to the device.

3. A method comprising:
    adding energy to an actively-transported medium, wherein:
        the medium is not used to power a device; and
        the energy is added at a first location;
    transporting the energy via the medium to a second location;
    withdrawing the energy at the second location;
    delivering the energy to a device, wherein the device uses the energy to perform an action that is associated with the medium, wherein the action performed by the device is to sense a characteristic of the medium.

4. A method comprising:
    adding energy to an actively-transported medium, wherein:
        the medium is not used to power a device; and
        the energy is added at a first location;
    transporting the energy via the medium to a second location;
    withdrawing the energy at the second location;
    delivering the energy to a device, wherein the device uses the energy to perform an action that is associated with the medium, wherein the action performed by the device is to provide an alarm indication responsive to a value of a characteristic of the medium.

5. A method comprising:
    adding energy to an actively-transported medium, wherein:
        the medium is not used to power a device; and
        the energy is added at a first location;
    transporting the energy via the medium to a second location;
    withdrawing the energy at the second location; and
    delivering the energy to a device, wherein the device uses the energy to perform an action that is associated with the medium, wherein:
        the operation of adding energy further comprises:
            (a) determining the amount of energy that is required by the device to perform the action; and
            (b) adding a sufficient amount of energy to the medium so that the required amount of energy is delivered to the device.

6. A method comprising:
    adding energy to an actively-transported medium, wherein:
        the medium is not used to power a device; and
        the energy is added at a first location;
    transporting the energy via the medium to a second location;
    withdrawing the energy at the second location; and
    delivering the energy to a device, wherein the device uses the energy to perform an action that is associated with the medium, and wherein the device is selected from the group consisting of a sensor, a controller, and an alarm.

7. A method comprising:
    adding energy to an actively-transported medium, wherein:
        the medium is not used to power a device; and
        the energy is added at a first location;
    transporting the energy via the medium to a second location;
    withdrawing the energy at the second location; and
    delivering the energy to a device, wherein the device uses the energy to perform an action that is associated with the medium, wherein the medium is an organism's bloodstream.

8. A method comprising:
    adding energy to a medium, wherein:
        the medium is light; and
        the energy is added at a first location;
    transporting the energy via the medium to a second location;
    withdrawing the energy at the second location;
    delivering the energy to a device, wherein the device uses the energy to perform an action that is associated with the medium.

9. The method of claim 8 wherein the medium propagates through a waveguide.

10. The method of claim 9 wherein the waveguide is an optical fiber.

11. The method of claim 8 wherein the added energy is added as light having a wavelength that is different from a wavelength of the medium.

12. The method of claim 8 wherein the energy is added via an optical amplifier.

13. The method of claim 8 wherein the energy is withdrawn via a filter.

14. The method of claim 8 wherein the operation of delivering the energy to a device further comprises converting the energy to a form in which it can be used by the device.

15. The method of claim 8 wherein the action performed by the device is to sense a characteristic of the medium.

* * * * *